United States Patent
Konishi et al.

(10) Patent No.: US 7,990,271 B2
(45) Date of Patent: Aug. 2, 2011

(54) DETECTION STABILIZING SYSTEM FOR RFID SYSTEM, DETECTION STABILIZING METHOD, AND PROGRAM FOR STABILIZING DETECTION

(75) Inventors: Yusuke Konishi, Tokyo (JP); Toshiyasu Nakao, Tokyo (JP)

(73) Assignee: NEC Coporation, Tokyo (JP)

( * ) Notice: Subject to any disclaimer, the term of this patent is extended or adjusted under 35 U.S.C. 154(b) by 614 days.

(21) Appl. No.: 11/887,913

(22) PCT Filed: Apr. 4, 2006

(86) PCT No.: PCT/JP2006/307121
§ 371 (c)(1),
(2), (4) Date: Oct. 5, 2007

(87) PCT Pub. No.: WO2006/109624
PCT Pub. Date: Oct. 19, 2006

(65) Prior Publication Data
US 2009/0051537 A1    Feb. 26, 2009

(30) Foreign Application Priority Data

Apr. 8, 2005 (JP) ................................. 2005-111571
Feb. 23, 2006 (JP) ................................. 2006-046597

(51) Int. Cl.
*G08B 13/14* (2006.01)
(52) U.S. Cl. ................. 340/572.1; 340/10.1; 340/572.4
(58) Field of Classification Search ............... 340/572.1, 340/572.4, 10.1, 10.5
See application file for complete search history.

(56) References Cited

U.S. PATENT DOCUMENTS
| | | | |
|---|---|---|---|
| 6,084,530 A | 7/2000 | Pidwerbetsky et al. | |
| 2006/0092014 A1* | 5/2006 | Onderko et al. | 340/539.13 |

FOREIGN PATENT DOCUMENTS
| JP | 06-059036 | 3/1994 |
|---|---|---|
| JP | 10-242893 | 9/1998 |
| JP | 11-136161 | 5/1999 |
| JP | 11-282977 | 10/1999 |
| JP | 2001-307052 A | 11/2001 |
| JP | 2002-170082 A | 6/2002 |
| JP | 2002-259932 A | 9/2002 |
| JP | 2002-329174 A | 11/2002 |
| JP | 2003-028954 A | 1/2003 |
| JP | 2003-058843 A | 2/2003 |
| JP | 2003-204286 A | 7/2003 |
| JP | 2004-059320 A | 2/2004 |
| JP | 2004-251736 A | 9/2004 |

* cited by examiner

*Primary Examiner* — Thomas J Mullen
(74) *Attorney, Agent, or Firm* — Foley & Lardner LLP

(57) ABSTRACT

Quantities of movements of human and matter within a detection area are detected, based on the read results of an ID holding unit arranged in the detection area or information obtained from a sensor arranged in the detection area. Parameters are decided in accordance with the detected movement quantity, and by using such parameters, whether the detecting object is within the detection area or not is detected, based on the read results of an ID holding unit attached to a detecting object. A stabilizing process is performed based on the detected movement quantities of human and matter within the detection area by employing such constitution. Thus, detection is stabilized without limiting using environment or using method.

75 Claims, 47 Drawing Sheets

FIG. 34

$$f_n(t) = \alpha_t e_n(x_t) \sum_m f_m(t-1) a_{mn}$$

$t$ : TIME $x_t$ : READ RESULT OF ID HOLDING UNIT FOR OBJECT OF DETECTION OBTAINED BY EACH ID READING UNIT AT TIME OF $t$ $f_n(t)$ : PROBABILITY THAT OBJECT OF DETECTION EXISTS IN AREA $n$ AT TIME OF $t$ (HEREINAFTER, POST-PROBABILITY)

$e_n(x_t)$ : PROBABILITY THAT READ RESULT $x_t$ IS OBTAINED WHEN OBJECT OF DETECTION EXISTS IN AREA $n$ (HEREINAFTER, PRE-PROBABILITY)

$a_{mn}$ : PROBABILITY THAT OBJECT OF DETECTION, WHICH EXISTED IN AREA $m$ AT TIME OF $t$-1, EXISTS IN AREA $n$ AT TIME OF $t$ (HEREINAFTER, STATE TRANSITION PROBABILITY)

$\alpha_t$ : NORMALIZATION COEFFICIENT (COEFFICIENT FOR ADJUSTING SO THAT SUM OF POSTERIORI PROBABILITIES IS 1 (ONE))

FIG. 36

$$\begin{cases} mov_n = 0 & : \text{IN CASE WHERE IT HAS BEEN DETECTED THAT MOVEMENT IN AREA } n \text{ IS LOW} \\ mov_n = 1 & : \text{IN CASE WHERE IT HAS BEEN DETECTED THAT MOVEMENT IN AREA } n \text{ IS HIGH} \end{cases}$$

$$\begin{cases} a_{mn} = \alpha & \text{if } mov_m = 0 \text{ and } mov_n = 0 \\ a_{mn} = 2\alpha & \text{if } (mov_m = 1 \text{ and } mov_n = 0) \text{ or } (mov_m = 0 \text{ and } mov_n = 1) \\ a_{mn} = 10\alpha & \text{if } mov_m = 1 \text{ and } mov_n = 1 \end{cases}$$

WHERE: $\sum_m \sum_n a_{mn} = 1$

FIG. 37

$$\begin{cases} r_{n,k}(t) = R_{n,k} & : \text{WHEN ID HOLDING UNIT FOR OBJECT OF DETECTION HAS BEEN READ OFF BY K-TH ID READING UNIT AT TIME OF } t \\ r_{n,k}(t) = 1 - R_{n,k} & : \text{WHEN NO ID HOLDING UNIT FOR OBJECT OF DETECTION HAS BEEN READ OFF BY K-TH ID READING UNIT AT TIME OF } t \end{cases}$$

WHERE: $R_{n,k}$ WHICH IS PROBABILITY COEFFICIENT (HEREINAFTER, OUTPUT PROBABILITY) TO BE PRE-DECIDED, SIGNIFIES PROBABILITY THAT ID HOLDING UNIT FOR OBJECT OF DETECTION CAN BE READ OFF BY K-TH ID READING UNIT WHEN IT EXISTS IN AREA $n$ $$e_n(x_t) = \prod_k r_{n,k}(t)$$

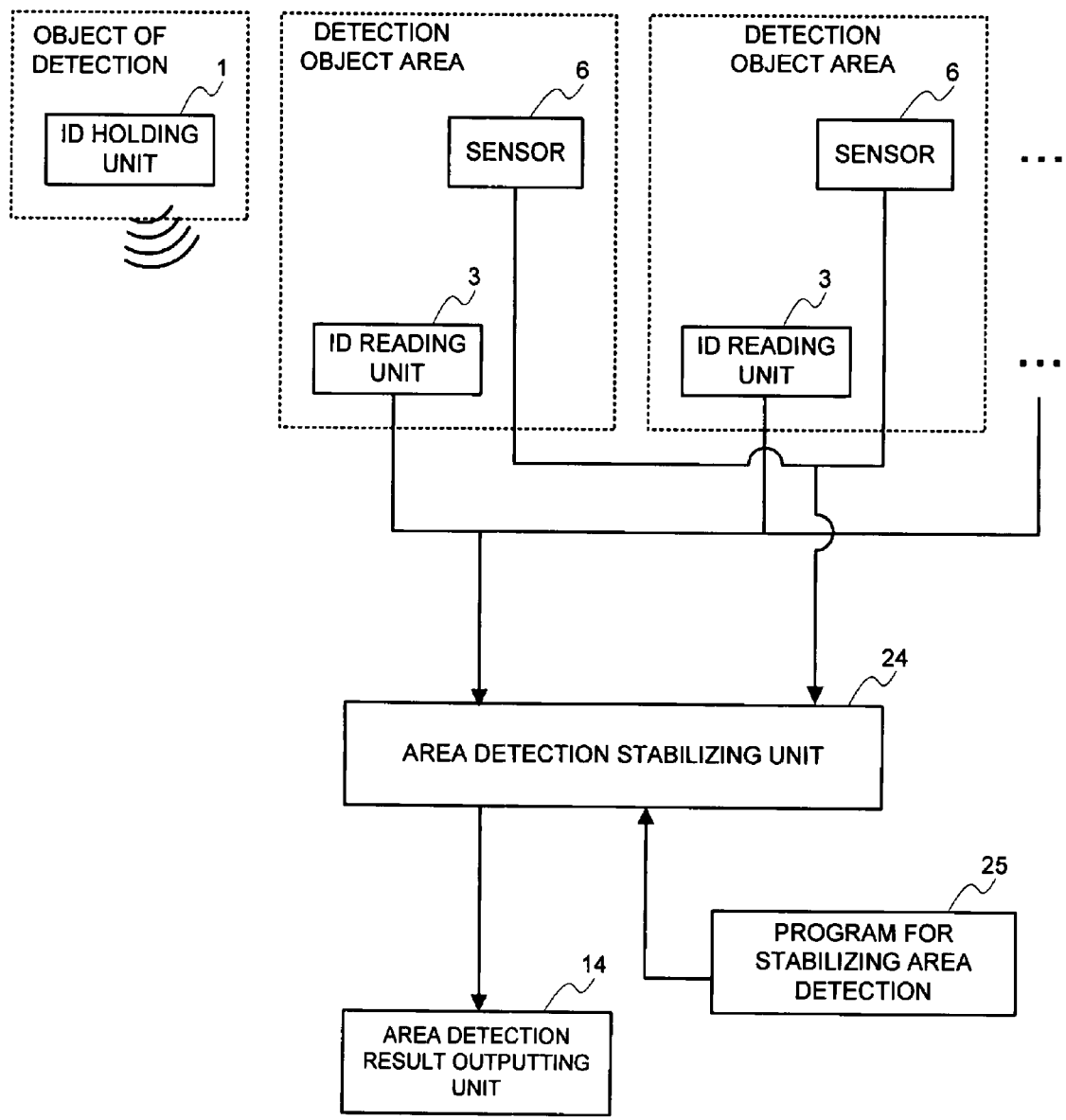

DETECTION STABILIZING SYSTEM FOR RFID SYSTEM, DETECTION STABILIZING METHOD, AND PROGRAM FOR STABILIZING DETECTION

This application is the National Phase of PCT/JP2006/307121, filed Apr. 4, 2006, which claims priority to Japanese Applications No. 2005-111571, filed Apr. 8, 2005 and No. 2006-046597, filed Feb. 23, 2006. The contents of these applications are incorporated by reference in their entirety.

APPLICABLE FIELD IN THE INDUSTRY

The present invention relates to an RFID system, and more particularly to a detection stabilizing system, a detection stabilizing method, and a program for stabilizing detection that enable its detection to be stabilized.

BACKGROUND ART

Conventionally, the RFID (Radio Frequency Identification) system, which is configured of a unit holding an inherent ID and a unit reading it, has a problem that erroneous detection and an omission of detection occur, and hence, the detection of the ID becomes unstable due to influences such as an antenna directivity of the ID holding unit and the ID reading unit, a disorder in a radio wave environment caused by a multi-path etc., a change in an antenna characteristic caused by interference due to a human body and other non-human objects to which the ID holding unit is attached, and a radio wave noise from a personal computer arranged in the circumference.

So as to decrease the erroneous detection and the omission of detection in the RFID system and to stabilize the detection, in Patent document 1, positively changing a positional relation between the ID holding unit and the ID reading unit, and simultaneously therewith, causing a plurality of the ID holding units not to positionally overlap with each other allow the situation such that a radio wave necessary for reading can be obtained and created temporarily.

Further, in Patent document 2, arranging one or a plurality of block plates for putting restrictions to an area in which the ID reading unit makes the detection allows an arrival area of the radio wave to be restricted.

In Patent document 3 and Patent document 4, housing the ID holding unit into an outer shell in a manner that the ID holding unit can be maintained in a state of being always directed to a direction suitable for reading allows the detection to be stabilized.

Further, in Patent document 5, Patent document 6, Patent document 7, Patent document 8, etc., making an improvement to the unit itself of the RFID system, for example, controlling the transmission power, managing the operating power, designing a circuit for enhancing a signal-to-noise ratio, contriving a transmission/reception antenna structure, allows the detection to be stabilized.

Further, as a general process for aiming at stabilizing the detection, there exist the time-out process in which it is determined that the object of detection has gone out of the detection area in a case where the reading thereof over a constant time was impossible with respect to a history of the read result, the average value computing process of obtaining an average radio wave intensity over a constant time or a read ratio over a constant time with respect to a history of the read result, and the threshold process in which it is determined that the object of detection has gone out of the detection area in a case where the radio wave intensity or the read ratio over a constant time has fallen below a constant value.

Patent document 1: JP-P2002-329174A
Patent document 2: JP-P2004-059320A
Patent document 3: JP-P2003-058843A
Patent document 4: JP-P2002-259932A
Patent document 5: JP-P2002-170082A
Patent document 6: JP-P2001-307052A
Patent document 7: JP-P1999-282977A
Patent document 8: JP-P1998-242893A

DISCLOSURE OF THE INVENTION

Problems to be Solved by the Invention

The first problem is that limitations have to be applied to the utilization environment or the utilization method so as to stabilize the detection of the RFID system.

The reason is that in the conventional RFID system, the erroneous detection, or the omission of detection cannot be completely eliminated in all of the various utilization environments or utilization methods, and restrictions have to be put to the utilization environment or the utilization method for a purpose of sufficiently decreasing the erroneous detection or the omission of detection in a single RFID system.

The second problem is that instability in the detection of the RFID system caused by a change in the utilization environment or the utilization method cannot be solved.

The reason is that even though an improvement to the unit itself in the conventional RFID system enables the erroneous detection or the omission of detection to be decreased in a certain utilization environment or utilization method, instability in the detection of the RFID system, which is generated when its utilization environment or utilization method has been changed, cannot be solved. Further, the reason is that it is impossible to dynamically change the technique for stabilizing the detection even though a change in the utilization environment or the utilization method exists, and it is difficult to cause stability of the detection and time responsiveness or sensitivity of the detection to be consistent with each other.

Thereupon, the present invention has been accomplished in consideration of the above-mentioned problems, and an object thereof is to provide an RFID system that enables the detection stabilization to be realized without placing limitations on the utilization environment or the utilization method.

Further, another object of the present invention is to provide an RFID system capable of solving instability in the detection caused by a fluctuation in the utilization environment or the utilization method.

Means for Solving the Problems

The 1st invention for solving the above-mentioned task, which is a detection stabilizing system for RFID, characterized in comprising: a detecting means for detecting a change in a detection environment of a detection area; and a detection stabilization processing means for, based upon said detected change in a detection environment, stabilizing a detection result of an ID holding unit for an object of detection attached to or preserved by an object of detection.

The 2nd invention for solving the above-mentioned problem, in the above-mentioned 1st invention, is characterized in that said detecting means is a movement detecting means for detecting a movement quantity of the object of detection within the detection area based upon a read result of an ID holding unit arranged in the detection area.

The 3rd invention for solving the above-mentioned problem, in the above-mentioned 1st invention, is characterized in that said detecting means is a movement detecting means for detecting a movement quantity of the object of detection in the detection area based upon information of a sensor arranged in the detection area.

The 4th invention for solving the above-mentioned problem, in one of the above-mentioned 1st to 4th inventions, is characterized in that said detection stabilization processing means comprises: a parameter deciding means for deciding a parameter, which is utilized for a detecting process, from the movement quantity obtained by said movement detecting means; and a detection processing means for stabilizing a detection result of the ID holding unit for an object of detection based upon the parameter decided by said parameter deciding means.

The 5th invention for solving the above-mentioned problem, in the above-mentioned 4th invention, is characterized in that: said parameter deciding means comprises a time-out time deciding means for deciding a time-out time for a time-out process from the movement quantity obtained by said movement detecting means; and said detection processing means comprises a time-out processing means for performing a time-out process for a read result of the ID holding unit for an object of detection based upon the time-out time decided by said time-out time deciding means.

The 6th invention for solving the above-mentioned problem, in the above-mentioned 4th invention, is characterized in that: said parameter deciding means comprises a threshold deciding means for deciding a threshold for a threshold process from the movement quantity obtained by said movement detecting means; and said detection processing means comprises a threshold processing means for performing a threshold process for a read result of the ID holding unit for an object of detection based upon the threshold decided by said threshold deciding means.

The 7th invention for solving the above-mentioned problem, in the above-mentioned 4th invention, is characterized in that: said parameter deciding means comprises: an average value computation time length deciding means for deciding an average value computation time length for an average value computing process from the movement quantity obtained by said movement detecting means; and a threshold deciding means for deciding a threshold for a threshold process from the movement quantity obtained by said movement detecting means; and said detection processing means comprises: an average value computation processing means for performing an average value computing process for a read result of the ID holding unit for an object of detection based upon the average value computation time length decided by said average value computation time length deciding means; and a threshold processing means for performing a threshold process for an output of said average value computation processing means based upon the threshold decided by said threshold deciding means.

The 8th invention for solving the above-mentioned problem, in the above-mentioned 4th invention, is characterized in that: said parameter deciding means comprises: a threshold deciding means for deciding a threshold for a threshold process from the movement quantity obtained by said movement detecting means; and a time-out time deciding means for deciding a time-out time for a time-out time process from the movement quantity obtained by said movement detecting means; and said detection processing means comprises: a threshold processing means for performing a threshold process for a read result of the ID holding unit for an object of detection based upon the threshold decided by said threshold deciding means; and a time-out processing means for performing a time-out process for an output of said threshold processing means based upon the time-out time decided by said time-out time deciding means.

The 9th invention for solving the above-mentioned problem, in the above-mentioned 4th invention, is characterized in that: said parameter deciding means comprises: an average value computation time length deciding means for deciding an average value computation time length for an average value computing process from the movement quantity obtained by said movement detecting means; a threshold deciding means for deciding a threshold for a threshold process from the movement quantity obtained by said movement detecting means; and a time-out time deciding means for deciding a time-out time for a time-out process from the movement quantity obtained by said movement detecting means; and said detection processing means comprises: an average value computation processing means for performing an average value computing process for a read result of the ID holding unit for an object of detection based upon the average value computation time length decided by said average value computation time length deciding means; a threshold processing means for performing a threshold process for an output of said average value computation processing means based upon the threshold decided by said threshold deciding means; and a time-out processing means for performing a time-out process for an output of said threshold processing means based upon the time-out time decided by said time-out time deciding means.

The 10th invention for solving the above-mentioned problem, in one of the above-mentioned 1st to 9th inventions, is characterized in comprising: a service level storing means for preserving a detection stabilizing process level; and a detection processing means having a function of changing a method of the detection stabilizing process responding to the detection stabilizing process level preserved by said service level storing means.

The 11th invention for solving the above-mentioned problem, in one of the above-mentioned 1st to 10th inventions, is characterized in comprising: a service level setting means for setting a detection stabilizing process level; and a detection processing means having a function of changing a method of the detection stabilizing process responding to the detection stabilizing process level set by said service level setting means.

The 12th invention for solving the above-mentioned problem, in one of the above-mentioned 1st to 11th inventions, is characterized in comprising: a service level setting means for setting a detection stabilizing process level; a service level storing means for preserving the detection stabilizing process level set by said service level setting means; and a detection processing means having a function of changing a method of the detection stabilizing process responding to the detection stabilizing process level preserved by said service level storing means.

The 13th invention for solving the above-mentioned task, which is a detection stabilizing system for RFID, characterized in comprising: an ID holding unit arranged in a detection area; a movement detecting means for, based upon a read result of said ID holding unit, detecting a movement quantity of an object of detection within the detection area; and a detection stabilization processing means for, based upon said detected movement quantity, stabilizing a detection result of an ID holding unit for an object of detection attached to or preserved by the object of detection.

The 14th invention for solving the above-mentioned task, which is a detection stabilizing system for RFID, characterized in comprising: a sensor; a movement detecting means for, based upon information of said sensor, detecting a movement quantity of an object of detection within a detection area; and a detection stabilization processing means for, based upon said detected movement quantity, stabilizing a detection result of an ID holding unit for an object of detection attached to or preserved by the object of detection.

The 15th invention for solving the above-mentioned task, which is an RFID system, characterized in comprising a movement detecting means for detecting a movement quantity of an object of detection within a detection area from a read result of an ID holding unit arranged in the detection area.

The 16th invention for solving the above-mentioned task, which is a method of detecting a movement quantity of an object of detection within a detection area from a read result of an ID holding unit arranged in the detection area.

The 17th invention for solving the above-mentioned task, which is a detection stabilizing method for RFID, characterized in comprising: a detecting process of detecting a change in a detection environment of a detection area; and a detection stabilizing process of, based upon said detected change in a detection environment, stabilizing a detection result of an ID holding unit for an object of detection attached to or preserved by an object of detection.

The 18th invention for solving the above-mentioned problem, in the above-mentioned 17th invention, is characterized in that said detecting process is a process of detecting a movement quantity of the object of detection within the detection area based upon a read result of the ID holding unit arranged in the detection area.

The 19th invention for solving the above-mentioned problem, in the above-mentioned 17th invention, is characterized in that said detecting process is a process of detecting a movement quantity of the object of detection in the detection area based upon information of a sensor arranged in the detection area.

The 20th invention for solving the above-mentioned problem, in one of the above-mentioned 17th to 19th inventions, is characterized in that said detection stabilizing process comprises: a parameter deciding process of deciding a parameter, which is utilized for a detecting process, from the detected movement quantity; and a detecting process of stabilizing a detection result of the ID holding unit for an object of detection based upon said decided parameter.

The 21st invention for solving the above-mentioned problem, in the above-mentioned 20th invention, is characterized in: in deciding said parameter, deciding a time-out time for a time-out process from the detected movement quantity; and in stabilizing said detection result, performing a time-out process for the read result of the ID holding unit for an object of detection based upon the decided time-out time.

The 22nd invention for solving the above-mentioned problem, in the above-mentioned 20th invention, is characterized in: in deciding said parameter, deciding a threshold for a threshold process from the detected movement quantity; and in stabilizing said detection result, performing a threshold process for the read result of the ID holding unit for an object of detection based upon the decided threshold.

The 23rd invention for solving the above-mentioned problem, in the above-mentioned 20th invention, is characterized in: in deciding said parameter, deciding an average value computation time length for an average value computing process and a threshold for a threshold process, respectively, from the detected movement quantity; and in stabilizing said detection result, after performing an average value computing process for the read result of the ID holding unit for an object of detection based upon the decided average value computation time length, performing a threshold process based upon the decided threshold.

The 24th invention for solving the above-mentioned problem, in the above-mentioned 20th invention, is characterized in: in deciding said parameter, deciding a threshold for a threshold process and a time-out time for a time-out process, respectively, from the detected movement quantity; and in stabilizing said detection result, after performing a threshold process for the read result of the ID holding unit for an object of detection based upon the decided threshold, performing a time-out process based upon the decided time-out time.

The 25th invention for solving the above-mentioned problem, in the above-mentioned 20th invention, is characterized in: in deciding said parameter, deciding an average value computation time length for an average value computing process, a threshold for a threshold process and a time-out time for a time-out process, respectively, from the detected movement quantity; and in stabilizing said detection result, after performing an average value computing process for the read result of the ID holding unit for an object of detection based upon the decided average value computation time length, performing a threshold process based upon the decided threshold, and further, thereafter performing a time-out process based upon the decided time-out time.

The 26th invention for solving the above-mentioned problem, in one of the above-mentioned 17th to 25th inventions, is characterized in preserving a detection stabilizing process level, and changing a method of the detection stabilizing process responding to the preserved detection stabilizing process level.

The 27th invention for solving the above-mentioned problem, in one of the above-mentioned 17th to 26th inventions, is characterized in setting a detection stabilizing process level, and changing a method of the detection stabilizing process responding to the set detection stabilizing process level.

The 28th invention for solving the above-mentioned problem, in one of the above-mentioned 17th to 27th inventions, is characterized in setting a detection stabilizing process level, preserving the set detection stabilizing process level, and changing a method of the detection stabilizing process responding to the preserved detection stabilizing process level.

The 29th invention for solving the above-mentioned task, which is a detection stabilization program for RFID, characterized in causing an information processing unit to function as: a detecting means for detecting a change in a detection environment of a detection area; and a detection stabilization processing means for, based upon said detected change in a detection environment, stabilizing a detection result of an ID holding unit for an object of detection attached to or preserved by an object of detection.

The 30th invention for solving the above-mentioned problem, in the above-mentioned 29th invention, is characterized in causing said detecting means to function as a movement detecting means for detecting a movement quantity of the object of detection within the detection area based upon a read result of the ID holding unit arranged in the detection area.

The 31st invention for solving the above-mentioned problem, in the above-mentioned 29th invention, is characterized in causing said detecting means to function as a movement detecting means for detecting a movement quantity of the object of detection in the detection area based upon information of a sensor arranged in the detection area.

The 44th invention for solving the above-mentioned problem, in one of the above-mentioned 29th to 31st inventions, is characterized in causing said detection stabilization processing means to function as: a parameter deciding means for deciding a parameter, which is utilized for a detecting process, from the movement quantity obtained by said movement detecting means; and a detection processing means for stabilizing the detection result of the ID holding unit for an object of detection based upon the parameter decided by said parameter deciding means.

The 33rd invention for solving the above-mentioned problem, in the above-mentioned 32nd invention, is characterized in causing: said parameter deciding means to function as a time-out time deciding means for deciding a time-out time for a time-out process from the movement quantity obtained by said movement detecting means; and said detection processing means to function as a time-out processing means for performing a time-out process for the read result the ID holding unit for an object of detection based upon the time-out time decided by said time-out time deciding means.

The 34th invention for solving the above-mentioned problem, in the above-mentioned 32nd invention, is characterized in causing: said parameter deciding means to function as a threshold deciding means for deciding a threshold for a threshold process from the movement quantity obtained by said movement detecting means; and said detection processing means to function as a threshold processing means for performing a threshold process for the read result of the ID holding unit for an object of detection based upon the threshold time decided by said threshold deciding means.

The 35th invention for solving the above-mentioned problem, in the above-mentioned 32nd invention, is characterized in causing: said parameter deciding means to function as: an average value computation time length deciding means for deciding an average value computation time length for an average value computing process from the movement quantity obtained by said movement detecting means; and a threshold deciding means for deciding a threshold for a threshold process from the movement quantity obtained by said movement detecting means; and said detection processing means to function as: an average value computation processing means for performing an average value computing process for the read result of the ID holding unit for an object of detection based upon the average value computation time length decided by said average value computation time length deciding means; and a threshold processing means for performing a threshold process for an output of said average value computation processing means based upon the threshold decided by said threshold deciding means.

The 36th invention for solving the above-mentioned problem, in the above-mentioned 32nd invention, is characterized in causing: said parameter deciding means to function as: a threshold deciding means for deciding a threshold for a threshold process from the movement quantity obtained by said movement detecting means; and a time-out time deciding means for deciding a time-out time for a time-out process from the movement quantity obtained by said movement detecting means; and said detection processing means to function as: a threshold processing means for performing a threshold process for the read result of the ID holding unit for an object of detection based upon the threshold decided by said threshold deciding means; and a time-out processing means for performing a time-out process for an output of said threshold processing means based upon the time-out time decided by said time-out time deciding means.

The 37th invention for solving the above-mentioned problem, in the above-mentioned 32nd invention, is characterized in causing: said parameter deciding means to function as: an average value computation time length deciding means for deciding an average value computation time length for an average value computing process from the movement quantity obtained by said movement detecting means; a threshold deciding means for deciding a threshold for a threshold process from the movement quantity obtained by said movement detecting means; and a time-out time deciding means for deciding a time-out time for a time-out process from the movement quantity obtained by said movement detecting means; and said detection processing means to function as: an average value computation processing means for performing an average value computing process for the read result of the ID holding unit for an object of detection based upon the average value computation time length decided by said average value computation time length deciding means; a threshold processing means for performing a threshold process for an output of said average value computation processing means based upon the threshold decided by said threshold deciding means; and a time-out processing means for performing a time-out process for an output of said average value computation processing means based upon the time-out time decided by said time-out time deciding means.

The 38th invention for solving the above-mentioned problem, in one of the above-mentioned 29th to 37th inventions, is characterized in causing: said information processing unit to function as a detection processing means having a function of changing a method of the detection stabilizing process responding to a detection stabilizing process level preserved by a service level storing means preserving the detection stabilizing process level.

The 39th invention for solving the above-mentioned problem, in one of the above-mentioned 29th to 38th inventions, is characterized in causing said information processing unit to function as: a service level setting means for setting a detection stabilizing process level; and a detection processing means having a function of changing a method of the detection stabilizing process responding to the detection stabilizing process level set by said service level setting means.

The 40th invention for solving the above-mentioned problem, in one of the above-mentioned 29th to 38th inventions, is characterized in causing said information processing unit to function as: a service level setting means for setting a detection stabilizing process level, and preserving it in the service level storing means and a detection processing means having a function of changing a method of the detection stabilizing process responding to the detection stabilizing process level preserved by said service level storing means.

The 41st invention for solving the above-mentioned task, which is a detection stabilization program for RFID, characterized in causing an information processing unit to function as a movement detecting means for detecting a movement quantity of an object of detection within a detection area from a read result of an ID holding unit arranged the detection area.

The 42nd invention for solving the above-mentioned task, which is a detection stabilizing system for RFID, characterized in comprising: an ID holding unit arranged in a detection area; a movement detecting means for detecting a movement quantity of an object of detection within the detection area based upon a read result of said ID holding unit, and a read result of an ID holding unit attached to an object of detection; a parameter deciding process of deciding a parameter, which is utilized for a detecting process, from the movement quantity obtained by said movement detecting means; and a detection processing means for, based upon the parameter by decided by said parameter deciding means, stabilizing a detection result of an ID holding unit for an object of detection.

The 43rd invention for solving the above-mentioned task, which is a detection stabilizing system for RFID, characterized in comprising: a sensor arranged in a detection area; a movement detecting means for detecting a movement quantity of an object of detection within the detection area based upon information of said sensor, and a read result of an ID holding unit attached to an object of detection; a parameter deciding process of deciding a parameter, which is utilized for a detecting process, from the movement quantity obtained by said movement detecting means; and a detection processing means for, based upon the parameter decided by said parameter deciding means, stabilizing a detection result of an ID holding unit for an object of detection.

The 44th invention for solving the above-mentioned problem, in the above-mentioned 42nd or 43rd inventions, is characterized in that: said parameter deciding means comprises a time-out time deciding means for deciding a time-out time for a time-out process from the movement quantity obtained by said movement detecting means; and said detection processing means comprises a time-out processing means for performing a time-out process for the read result of the ID holding unit for an object of detection based upon the time-out time decided by said time-out time deciding means.

The 45th invention for solving the above-mentioned problem, in the above-mentioned 42nd or 43rd inventions, is characterized in that: said parameter deciding means comprises a threshold deciding means for deciding a threshold for a threshold process from the movement quantity obtained by said movement detecting means; and said detection processing means comprises a threshold processing means for performing a threshold process for the read result of the ID holding unit for an object of detection based upon the threshold decided by said threshold deciding means.

The 46th invention for solving the above-mentioned problem, in the above-mentioned 42nd or 43rd inventions, is characterized in that: said parameter deciding means comprises an average value computation time length deciding means for deciding an average value computation time length for an average value computing process from the movement quantity obtained by said movement detecting means; and said detection processing means comprises an average value computation processing means for performing an average value computing process for the read result of the ID holding unit for an object of detection based upon the average value computation time length decided by said average value computation time length deciding means.

The 47th invention for solving the above-mentioned task, which is a detection stabilizing method for RFID, characterized in comprising: a movement detecting process of detecting a movement quantity of an object of detection within a detection area based upon a read result of an ID holding unit arranged in the detection area, and a read result of an ID holding unit attached to the object of detection; a parameter deciding process of deciding a parameter, which is utilized for a detecting process, from the movement quantity obtained in said movement detecting process; and a detection process of, based upon the parameter by decided in said parameter deciding process, stabilizing a detection result of an ID holding unit for an object of detection.

The 48th invention for solving the above-mentioned task, which is a detection stabilizing method for RFID, characterized in comprising: a movement detecting process of detecting a movement quantity of an object of detection within a detection area based upon information of a sensor arranged in the detection area, and a read result of an ID holding unit attached to the object of detection; a parameter deciding process of deciding a parameter, which is utilized for a detecting process, from the movement quantity obtained in said movement detecting process; and a detection process of, based upon the parameter by decided in said parameter deciding process, stabilizing a detection result of an ID holding unit for an object of detection.

The 49th invention for solving the above-mentioned problem, in the above-mentioned 47th or 48th inventions, is characterized in: in said parameter deciding process, deciding a time-out time for a time-out process from the movement quantity obtained in said movement detecting process; and in said detecting process, performing a time-out process for the read result of the ID holding unit for an object of detection based upon the decided time-out time.

The 50th invention for solving the above-mentioned problem, in the above-mentioned 47th or 48th inventions, is characterized in: in said parameter deciding process, deciding a threshold for a threshold process from the movement quantity obtained in said movement detecting process; and in said detecting process, performing a threshold process for the read result of the ID holding unit for an object of detection based upon the decided threshold.

The 51st invention for solving the above-mentioned problem, in the above-mentioned 47th or 48th inventions, is characterized in: in said parameter deciding process, deciding an average value computation time length for an average value computing process from the movement quantity obtained in said movement detecting process; and in said detecting process, performing an average value computing process for the read result of the ID holding unit for an object of detection based upon the decided average value computation time length.

The 52nd invention for solving the above-mentioned task, which is a detection stabilization program for RFID, characterized in causing an information processing unit to function as: a movement detecting means for detecting a movement quantity of an object of detection within a detection area based upon a read result of an ID holding unit arranged in the detection area, and a read result of the ID holding unit attached to an object of detection; a parameter deciding means for deciding a parameter, which is utilized for a detecting process, from the movement quantity obtained by said movement detecting means; and a detection stabilizing means for, based upon the parameter by decided by said parameter deciding means, stabilizing a detection result of an ID holding unit for an object of detection.

The 53rd invention for solving the above-mentioned task, which is a detection stabilization program for RFID, characterized in causing an information processing unit to function as: a movement detecting means for detecting a movement quantity of an object of detection within a detection area based upon information of a sensor arranged in the detection area, and a read result of an ID holding unit attached to the object of detection; a parameter deciding means for deciding a parameter, which is utilized for a detecting process, from the movement quantity obtained by said movement detecting means; and a detection stabilizing means for, based upon the parameter by decided by said parameter deciding means, stabilizing a detection result of an ID holding unit for an object of detection.

The 54th invention for solving the above-mentioned problem, in the above-mentioned 52nd or 53rd inventions, is characterized in causing: said parameter deciding means to function as a time-out time deciding means for deciding a time-out time for a time-out process from the movement quantity obtained by said movement detecting means; and said detection processing means to function as a time-out processing means for performing a time-out process for the read result of the ID holding unit for an object of detection based upon the time-out time decided by said time-out time deciding means.

The 55th invention for solving the above-mentioned problem, in the above-mentioned 52nd or 53rd inventions, is characterized in causing: said parameter deciding means to function as a threshold deciding means for deciding a threshold for a threshold process from the movement quantity obtained by said movement detecting means; and said detection processing means to function as a threshold processing means for performing a threshold process for the read result of the ID holding unit for an object of detection based upon the threshold decided by said threshold deciding means.

The 56th invention for solving the above-mentioned problem, in the above-mentioned 52nd or 53rd inventions, is characterized in causing: said parameter deciding means to function as an average value computation time length deciding means for deciding an average value computation time length for an average value computing process from the movement quantity obtained by said movement detecting means; and said detection processing means to function as a an average value computation processing means for performing an average value computing process for the read result of the ID holding unit for an object of detection based upon the average value computation time length decided by said average value computation time length deciding means.

The 57th invention for solving the above-mentioned task, which is a detection stabilizing system for RFID, characterized in comprising: ID holding units arranged in a plurality of detection areas; a movement detecting means for detecting a movement quantity of an object of detection within each detection area based upon a read result of said ID holding unit; a parameter deciding means for deciding a parameter, which is utilized for a detecting process, from the movement quantity obtained by said movement detecting means; and an area detection processing means for, based upon the parameter decided by said parameter deciding means, stabilizing an area detection result of an ID holding unit for an object of detection.

The 58th invention for solving the above-mentioned task, which is a detection stabilizing system for RFID, characterized in comprising: ID holding units arranged in a plurality of detection areas; a movement detecting means for detecting a movement quantity of an object of detection within the detection area based upon a read result of said ID holding unit, and a read result of an ID holding unit attached to the object of detection; a parameter deciding means for deciding a parameter, which is utilized for an area detecting process, from the movement quantity obtained by said movement detecting means; and an area detection processing means for, based upon the parameter decided by said parameter deciding means, stabilizing an area detection result of an ID holding unit for an object of detection.

The 59th invention for solving the above-mentioned task, which is a detection stabilizing system for RFID, characterized in comprising: sensors arranged in a plurality of detection areas; a movement detecting means for detecting a movement quantity of an object of detection within each detection area based upon information of said sensor; a parameter deciding means for deciding a parameter, which is utilized for an area detecting process, from the movement quantity obtained by said movement detecting means; and an area detection processing means for, based upon the parameter decided by said parameter deciding means, stabilizing an area detection result of an ID holding unit for an object of detection.

The 60th invention for solving the above-mentioned task, which is a detection stabilizing system for RFID, characterized in comprising: sensors arranged in a plurality of detection areas; a movement detecting means for detecting a movement quantity of an object of detection within the detection area based upon information of said sensor, and a read result of an ID holding unit attached to the object of detection; a parameter deciding means for deciding a parameter, which is utilized for an area detecting process, from the movement quantity obtained by said movement detecting means; and an area detection processing means for, based upon the parameter decided by said parameter deciding means, stabilizing an area detection result of an ID holding unit for an object of detection.

The 61st invention for solving the above-mentioned problem, in one of the above-mentioned 57th to 60th inventions, is characterized in that: said parameter deciding means comprises a state transition probability deciding means for deciding a state transition probability for a probability course process from the movement quantity obtained by said movement detecting means; and said area detection processing means comprises a probability course processing means for performing a probability course process for the read result of the ID holding unit for an object of detection based upon the state transition probability decided by said state transition probability deciding means.

The 62nd invention for solving the above-mentioned task, which is a detection stabilizing method for RFID, characterized in comprising: a movement detecting process of detecting a movement quantity of an object of detection within each detection area based upon a read result of ID holding units arranged in a plurality of the detection areas; a parameter deciding process of deciding a parameter, which is utilized for an area detecting process, from the movement quantity obtained in said movement detecting process; and an area detecting process of, based upon the parameter by decided in said parameter deciding process, stabilizing an area detection result of an ID holding unit for an object of detection.

The 63rd invention for solving the above-mentioned task, which is a detection stabilizing method for RFID, characterized in comprising: a movement detecting process of detecting a movement quantity of an object of detection within a detection area based upon a read result of ID holding units arranged in a plurality of the detection areas, and a read result of an ID holding unit attached to the object of detection; a parameter deciding process of deciding a parameter, which is utilized for an area detecting process, from the movement quantity obtained in said movement detecting process; and an area detecting process of, based upon the parameter by decided in said parameter deciding process, stabilizing an area detection result of an ID holding unit for an object of detection.

The 64th invention for solving the above-mentioned task, which is a detection stabilizing method for RFID, characterized in comprising: a movement detecting process of detecting a movement quantity of an object of detection within each detection area based upon information of sensors arranged in a plurality of the detection areas; a parameter deciding process of deciding a parameter, which is utilized for an area detecting process, from the movement quantity obtained in said movement detecting process; and an area detecting process of, based upon the parameter by decided in said parameter deciding process, stabilizing an area detection result of an ID holding unit for an object of detection.

The 65th invention for solving the above-mentioned task, which is a detection stabilizing method for RFID, characterized in comprising: a movement detecting process of detecting a movement quantity of an object of detection within each detection area based upon information of sensors arranged in a plurality of the detection areas, and a read result of an ID holding unit attached to the object of detection; a parameter deciding process of deciding a parameter, which is utilized for an area detecting process, from the movement quantity obtained in said movement detecting process; and an area detecting process of, based upon the parameter by decided in said parameter deciding process, stabilizing an area detection result of an ID holding unit for an object of detection.

The 66th invention for solving the above-mentioned problem, in one of the above-mentioned 62nd to 65th inventions, is characterized in that: said parameter deciding process comprises a state transition probability deciding process of deciding a state transition probability for a probability course process from the movement quantity obtained by said movement detecting means; and said area detecting process comprises a probability course process for performing a process of a probability course for the read result of the ID holding unit for an object of detection based upon the state transition probability decided in said state transition probability deciding process.

The 67th invention for solving the above-mentioned task, which is a detection stabilization program for RFID, characterized in causing an information processing unit to function as: a movement detecting means for detecting a movement quantity of an object of detection within each detection area based upon a read result of ID holding units arranged in a plurality of the detection areas; a parameter deciding means for deciding a parameter, which is utilized for an area detecting process, from the movement quantity obtained by said movement detecting means; and an area detection processing means for, based upon the parameter by decided by said parameter deciding means, stabilizing an area detection result of an ID holding unit for an object of detection.

The 68th invention for solving the above-mentioned task, which is a detection stabilization program for RFID, characterized in causing an information processing unit to function as: a movement detecting means for detecting a movement quantity of an object of detection within a detection area based upon a read result of ID holding units arranged in a plurality of the detection areas and a read result of an ID holding unit attached to the object of detection; a parameter deciding means for deciding a parameter, which is utilized for an area detecting process, from the movement quantity obtained by said movement detecting means; and an area detection processing means for, based upon the parameter by decided by said parameter deciding means, stabilizing an area detection result of an ID holding unit for an object of detection.

The 69th invention for solving the above-mentioned task, which is a detection stabilization program for RFID, characterized in causing an information processing unit to function as: a movement detecting means for detecting a movement quantity of an object of detection within each detection area based upon information of sensors arranged in a plurality of the detection areas; a parameter deciding means for deciding a parameter, which is utilized for an area detecting process, from the movement quantity obtained by said movement detecting means; and an area detection processing means for, based upon the parameter by decided by said parameter deciding means, stabilizing an area detection result of an ID holding unit for an object of detection.

The 70th invention for solving the above-mentioned task, which is a detection stabilization program for RFID, characterized in causing an information processing unit to function as: a movement detecting means for detecting a movement quantity of an object of detection within a detection area based upon information of sensors arranged in a plurality of the detection areas, and a read result of an ID holding unit attached to the object of detection; a parameter deciding means for deciding a parameter, which is utilized for an area detecting process, from the movement quantity obtained by said movement detecting means; and an area detection processing means for, based upon the parameter by decided by said parameter deciding means, stabilizing an area detection result of an ID holding unit for an object of detection.

The 71st invention for solving the above-mentioned problem, in one of the above-mentioned 67th to 70th inventions, is characterized in causing: said parameter deciding means to function as a state transition probability deciding means for deciding a state transition probability for a probability course process from the movement quantity obtained by said movement detecting means; and said area detection processing means to function as a probability course processing means for performing a probability course process for the read result of the ID holding unit for an object of detection based upon the state transition probability decided by said state transition probability deciding means.

The detection stabilizing system for the RFID system of the present invention detects a detection environment of a detection area, and detects whether the object of detection exists in the detection area from the read result of the ID holding unit attached to the object of detection by employing a parameter decided based upon this detected detection environment. Specifically, it detects the movement quantities of the human and the matter within the detection area from the read result of the ID holding unit arranged in the detection area and information that is obtained from a sensor arranged in the detection area, and detects whether the object of detection exists in the detection area from the read result of the ID holding unit attached to the object of detection by employing a parameter decided responding to the detected movement quantity. Performing s stabilizing process based upon the detected movement qualities of the human and the matter within the detection area by employing such a configuration makes it possible to accomplish an object of the present invention.

Effect of the Invention

The effect of the present invention lies in a point that utilizing the movement quantity of the object of detection (human and matter) within the detection area detected from the read result of the ID holding unit arranged in the detection area, or information that is obtained by the sensor arranged in the detection area makes it possible to stabilize the detection result of the ID holding unit for an object of detection.

The reason is that deciding the parameter, which is utilized for a detecting process, responding to the detected movement quantity makes it possible to dynamically change the time responsiveness or sensitivity of the detection responding to the movement quantity of the object of detection(human and matter) within the detection area, and to stabilize the detection of the RFID system without a necessity for placing limitations on the utilization environment or the utilization method, and without being influenced by a change in the utilization environment or the utilization method.

BRIEF DESCRIPTION OF THE DRAWINGS

FIG. 34 shows an equation illustrating a method of computing a posteriori probability in an example 9 of the present invention.

FIG. 36 shows an equation illustrating a method of computing a state transition probability in the example 9 of the present invention.

FIG. 37 shows an equation illustrating a method of computing a priori probability in the example 9 of the present invention.

FIG. 48 is a block diagram illustrating a configuration of the best mode for carrying out a fourteenth invention of the present invention.

DESCRIPTION OF NUMERALS

Figure 1:
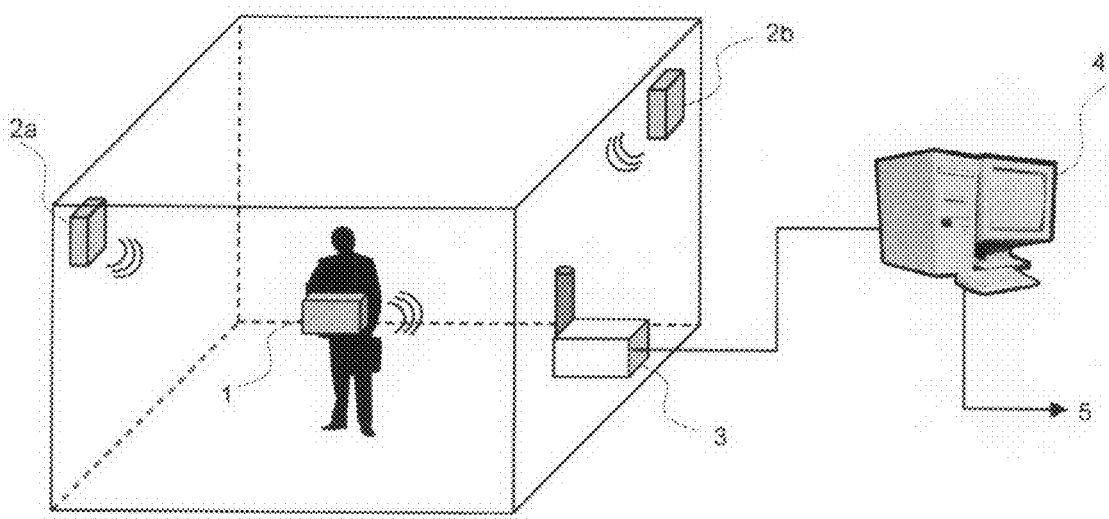
FIG. 1 is a view illustrating an outline of the best mode for carrying out inventions of the present invention.

1 ID holding unit for an object of detection
2 ID holding unit for a detection area
3 ID reading unit
4 detection result stabilizing unit
5 detection result outputting unit
6 sensor
7 detection stabilizing unit
8 detection stabilizing unit
9 program for stabilizing detection
10 detection stabilizing unit
11 program for stabilizing detection
12 detection stabilizing unit 13 area detection stabilizing unit
14 area detection result outputting unit
15 detection stabilizing unit
16 area detection stabilizing unit
17 area detection stabilizing unit
18 detection stabilizing unit
19 program for stabilizing detection
20 detection stabilizing unit
21 program for stabilizing detection
22 area detection stabilizing unit
23 program for stabilizing area detection
24 area detection stabilizing unit
25 program for stabilizing area detection
41 ID determining means
42 movement detecting means
43 parameter deciding means
44 detection processing means
45 movement detecting means
46 service level storing unit
122 movement detecting means
131 ID determining means
132 movement detecting means for area detection
133 area detection parameter deciding means
134 area detection processing means
135 movement detecting means for area detection
151 movement detecting means
161 movement detecting means for area detection
171 movement detecting means for area detection
312 service level controlling unit
321 service level setting means
322 service level controlling means
411 history storing means
412 history extracting means
413 variance value computing means
421 time-out time deciding means
422 threshold processing means
423 average value computation processing means
431 time-out processing means
432 threshold deciding means
433 average value computation time length deciding means
1221 movement-of-site detecting means
1222 movement-of-ID-holding-unit detecting means
1223 movement-of-object-of-detection detecting means
12221 history storing means
12222 history extracting means
12223 variance value computing means
1331 state transition probability deciding means
1341 probability course processing means

BEST MODE FOR CARRYING OUT THE INVENTION

The best mode for carrying out the present invention will be explained in details by making a reference to the accompanied drawings.

The present invention aims at detecting a change in the detection environment of the detection area, and stabilizing the detection of the ID holding unit for an object of detection attached to the object of detection such as a human body and other non-human objects based upon this change in the detection environment. As a representative of a change in the detection environment of the detection area, there exists the movement of the human body and the other non-human objects that exist within the detection area. In the following embodiment, an example will be explained of detecting movement quantities of the human body and the other non-human objects that exist within the detection area, and utilizing this for stabilizing the detection of the ID holding unit for an object of detection.

Figure 2:
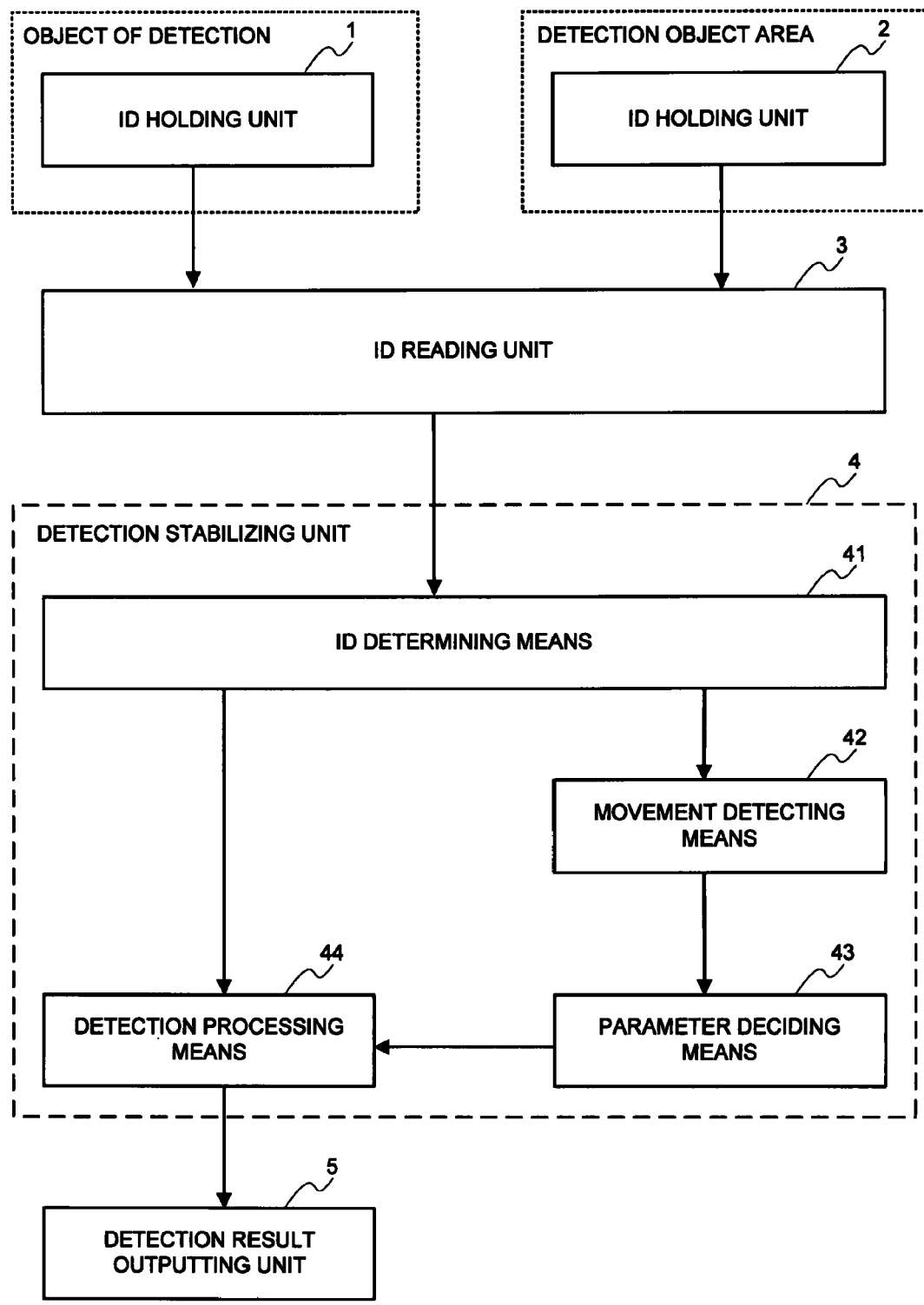
FIG. 2 is a block diagram illustrating a configuration of the best mode for carrying out a first invention of the present invention.

Upon making a reference to FIG. 1 and FIG. 2, the best mode for carrying out a first invention of the present invention is configured of a detection-object ID holding unit 1 for transmitting a unique ID attached to and held by the object of detection such as the human body and the other non-human objects by means of radio communication, detection-area ID holding units 2a and 2b for transmitting a unique ID being held by them, which are arranged within the detection area, an ID reading unit 3 for reading the ID that is held by the detection-object ID holding unit 1 and the detection-area ID holding unit 2, a detection stabilizing unit 4 for stabilizing the detection of the detection-object ID holding unit 1 by employing read results of the detection-object ID holding unit 1 and the detection-area ID holding unit 2 obtained by the ID reading unit 3, and a detection result outputting unit 5 for outputting a detection result.

The ID reading unit 3 may read off a numerical value indicating an intensity (hereinafter, referred to as reception intensity) of a radio wave received for a purpose of reading off the ID together with the ID. Further, each of the detection-object ID holding unit 1, the detection-area ID holding units 2, and the ID reading unit 3 may exist in plural.

The detection stabilizing unit 4 includes an ID determining means 41 for determining whether the read result of the ID holding unit read by the ID reading unit 3 is the read result by the detection-object ID holding unit 1 or the read result by the detection-area ID holding units 2, a movement detecting means 42 for detecting the movement qualities of the human body and the other non-human objects within the detection area from the read result of the detection-area ID holding unit 2, a parameter deciding means 43 for deciding a parameter, which is utilized for a detecting process, from the movement quantity detected by the movement detecting means 42, and a detection processing means 44 for processing the read result of the detection-object ID holding unit based upon the parameter decided in the parameter deciding means 43 and detecting whether the detection-object ID holding unit 1 exists within the detection area.

Next, an operation of the best mode for carrying out the present invention will be explained in details by making a reference to FIG. 2 and FIG. 3.

In a history of the result obtained by reading information held by the detection-area ID holding unit 2 with the ID reading unit 3 (step A1 of FIG. 3), which has been determined by the ID determining means 41, in a case where the human body and the other non-human objects each of which is an object of detection move within the detection area, thereby enabling the ID reading unit 3 to read off the reception intensity, a fluctuation in its numerical value is included, and in a case where the ID reading unit 3 cannot read off the reception intensity, a fluctuation in a read ratio over a constant time is included.

Figure 3:
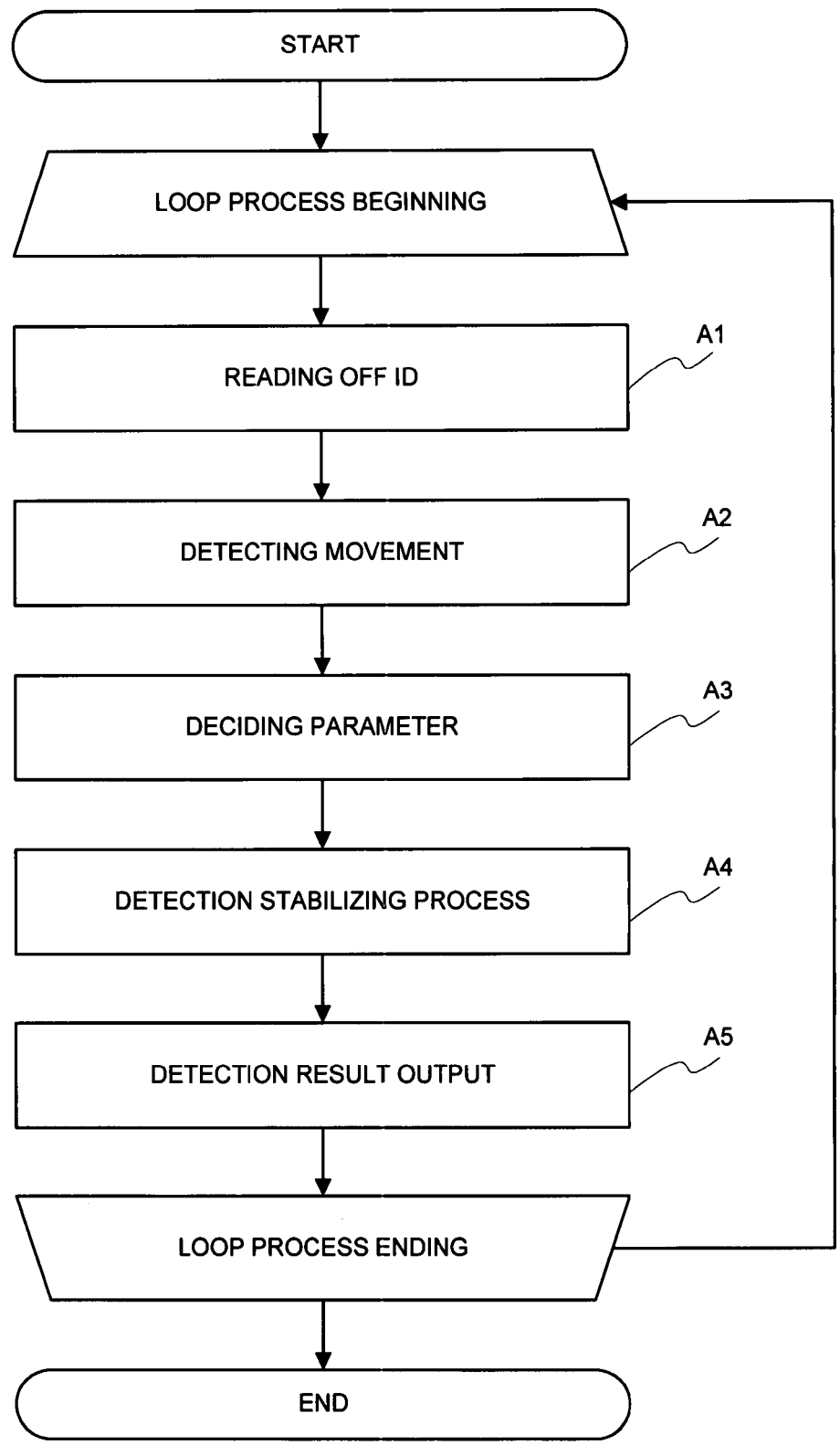
FIG. 3 is a flowchart illustrating an operation of the best mode for carrying out the first invention of the present invention.

The movement detecting means 42 detects the movement quantities of the human and the matter within the detection area from a fluctuation that can be viewed in the history of the read result (step A2 of FIG. 3).

The parameter deciding means 43 decides a parameter, which is utilized by the detection processing means 44, responding to the movement quantity detected by the movement detecting means 42 (step A3).

The detection processing means 44 processes the read result of the detection-object ID holding unit 1 determined by the ID determining means 41, based upon the parameter decided by the parameter deciding means 43, and detects whether the detection-object ID holding unit 1 exists within the detection area (step A4).

A detection result indicating whether the detection-object ID holding unit 1 exists within the detection area, which has been processed by the detection processing means 44, is output by the detection result outputting unit 5 (step A5).

As a specific example of the detecting process that is performed by the detection processing means 44, there exist the time-out process in which it is determined that the object of detection has gone out of the detection area in a case where the reading thereof over a constant time (hereinafter, referred to as a time-out time) was impossible with respect to the history of the read result, the average value computing process of obtaining an average reception intensity over a constant time (hereinafter, referred to as an average value computation time length) or a read ratio over a constant time with respect to the history of the read result, the threshold process in which it is determined that the object of detection has gone out of the detection area in a case where the reception intensity or the read ratio over a constant time has fallen below a constant value (hereinafter, referred to as a threshold), and so on.

As a specific example of the parameter that is decided by the parameter deciding means 43 and utilized by the detection processing means 44, there exist the time-out time, the average value computation time length, the threshold, and so on, each of which corresponds to a specific example of the process that is performed by the foregoing detection processing means 44.

Next, an effect of the best mode for carrying out the present invention will be explained.

In the best mode for carrying out the present invention, the movement quantities of the human body and the other non-human objects within the detection area can be detected from a fluctuation in the read result of the ID holding unit arranged within the detection area, which is similar to the ID holding unit that is attached to the object of detection. Deciding the parameter, which is utilized for the detecting process, responding to the movement quantity detected in such a manner makes it possible to dynamically change the time responsiveness or sensitivity of the detection responding to the movement quantities of the human body and the other non-human objects within the detection area, and to stabilize the detection of the RFID system without a necessity for putting restrictions to the utilization environment or the utilization method, and without being influenced by a change in the utilization environment or the utilization method.

Next, the best mode for carrying out a second invention of the present invention will be explained in details by making a reference to the accompanied drawings.

Figure 4:
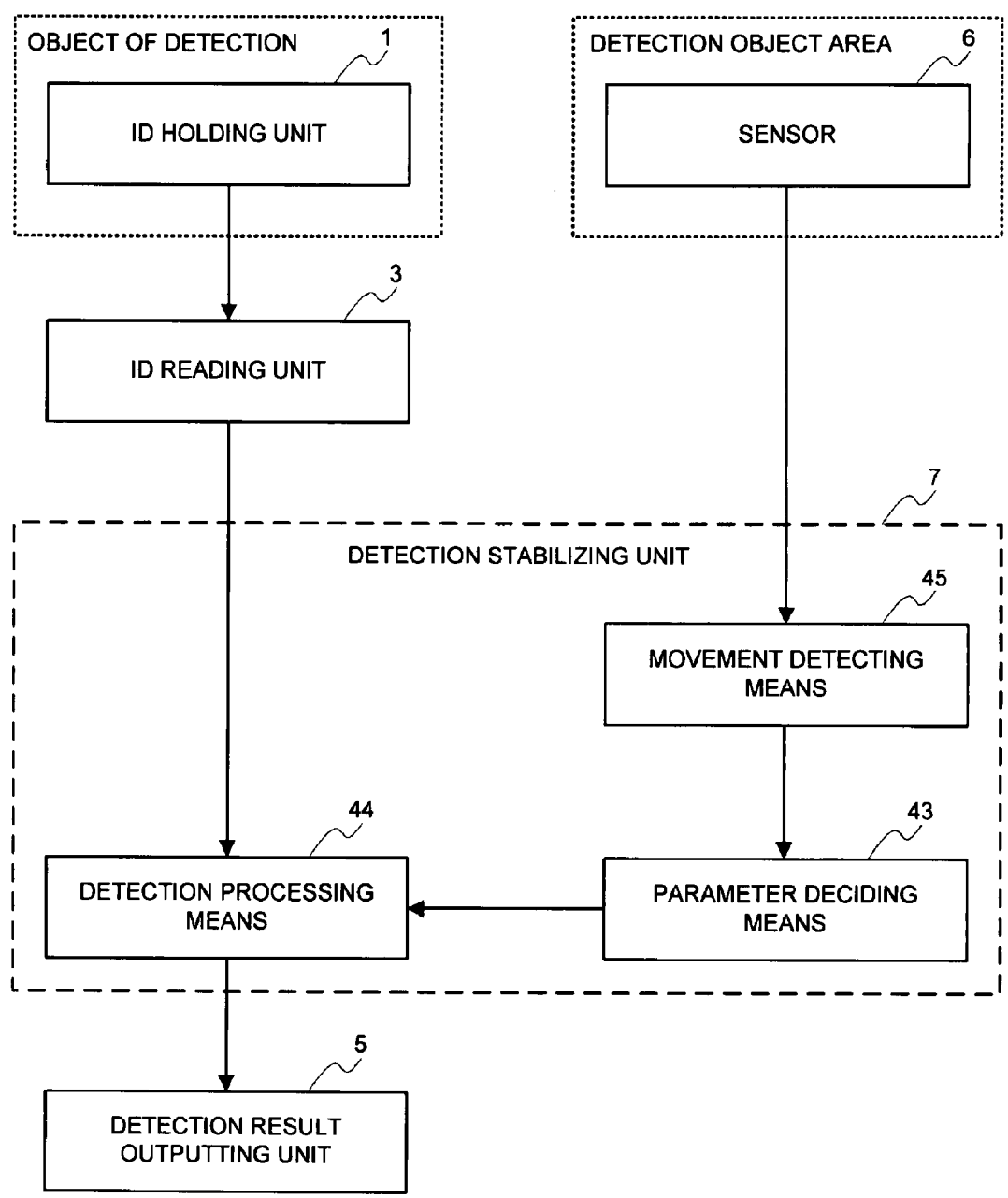
FIG. 4 is a block diagram illustrating a configuration of the best mode for carrying out a second invention of the present invention.

Upon making a reference to FIG. 4, the best mode for carrying out the second invention of the present invention differs in a point of including a sensor 6 fixed within the detection area instead of the detection-area ID holding units 2 in the best mode for carrying out the first invention of the present invention shown in FIG. 2 and a point that a detection stabilizing unit 7 includes a movement detecting means 45 for detecting the movement quantities of the human body and the other non-human objects within the detection area from information that is obtained from the sensor 6 instead of the movement detecting means 42 in the configuration of the detection stabilizing unit 4 in the best mode for carrying out the first invention of the present invention shown in FIG. 2.

Next, an operation of the best mode for carrying out the present invention will be explained in details by making a reference to FIG. 4 and FIG. 5.

Figure 5:
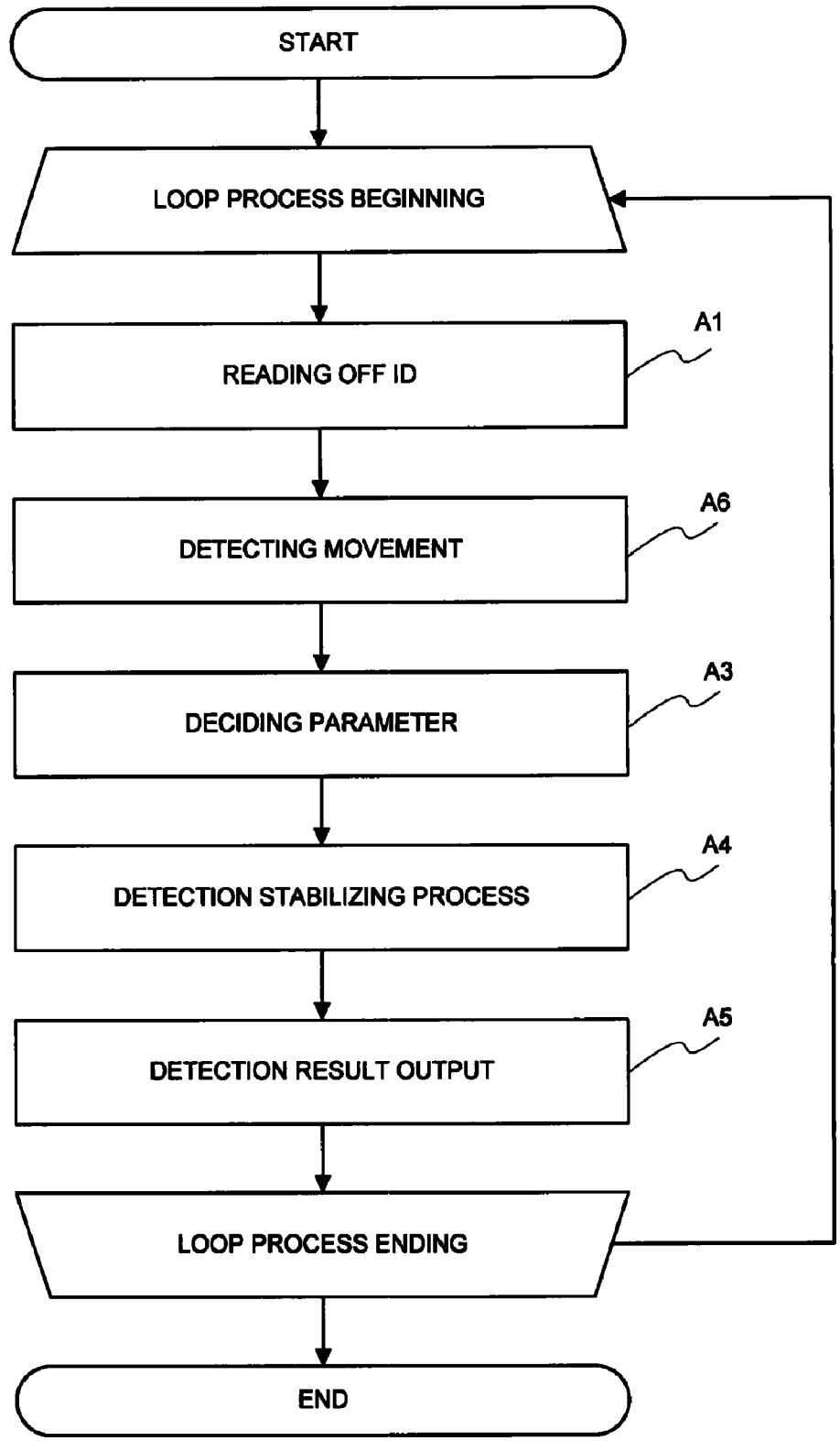
FIG. 5 is a flowchart illustrating an operation of the best mode for carrying out the second invention of the present invention.

Additionally, an operation of a parameter deciding means 43 and a detection stabilization processing means 44 in the best mode for carrying out the present invention, which is shown in steps A1 and A3-A5 of FIG. 5, is identical to that of the means 43 and 44 in the best mode for carrying out the first invention of the present invention, respectively, so its explanation is omitted.

In the best mode for carrying out the first invention of the present invention, the movement quantities of the human body and the other non-human objects within the detection area were detected from the read result of the detection-area ID holding units 2 obtained by the ID reading unit 3; however in a case where the other sensor can be utilized for detecting the movement quantity, the detection-area ID holding units 2 are not needed in some cases. The movement detecting means 45 in the best mode for carrying out the present invention detects the movement quantities of the human body and the matter other non-human objects within the detection area from information that is obtained by the sensor arranged in the detection area (step A6).

Next, an effect of the best mode for carrying out the present invention will be explained.

In the best mode for carrying out the present invention, deciding the parameter, which is utilized for the detecting process, responding to the movement quantity detected by the sensor capable of detecting the movement quantities of the human body and the other non-human objects within the detection area makes it possible to dynamically change the time responsiveness or sensitivity of the detection responding to the movement quantities of the human and the matter within the detection area, and to stabilize the detection of the RFID system without a necessity for placing limitations on the utilization environment or the utilization method, and without being influenced by a change in the utilization environment or the utilization method.

Next, the best mode for carrying out a third invention of the present invention will be explained in details by making a reference to the accompanied drawings.

Figure 6:
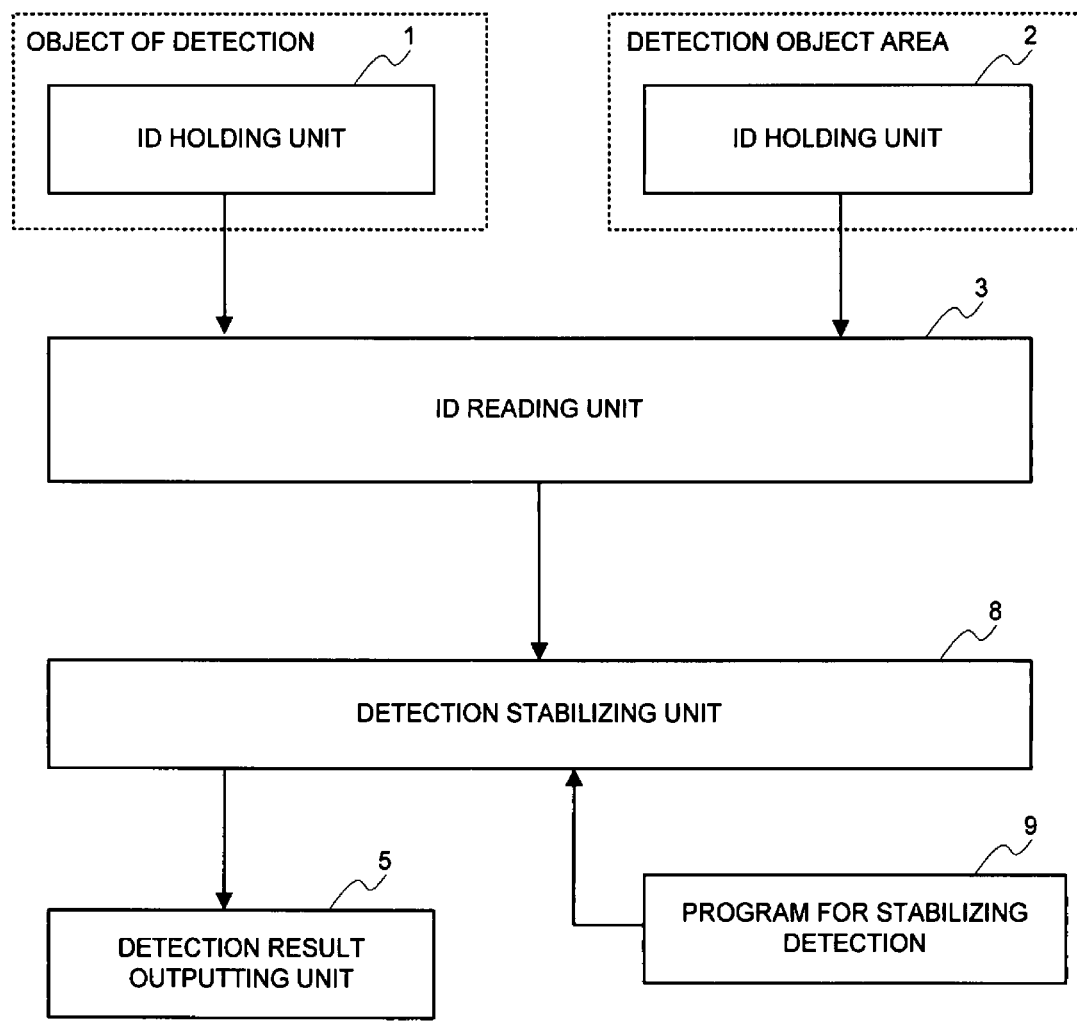
FIG. 6 is a block diagram illustrating a configuration of the best mode for carrying out a third invention of the present invention.

Upon making a reference to FIG. 6, the best mode for carrying out the third invention of the present invention includes a detection-object ID holding unit 1, a detection-area ID holding unit 2, an ID reading unit 3, and a detection result outputting unit 5 similarly to the best mode for carrying out the first invention of the present invention.

A detection stabilization program 9, which is loaded in a detection stabilizing unit 8, controls an operation of the detection stabilizing unit 8. The detection stabilizing unit 8 executes a process similar to the process under control of the detection stabilization program 9, which is performed by the detection stabilizing unit 4 in the best mode for carrying out the first invention of the present invention.

Next, the best mode for carrying out a fourth invention of the present invention will be explained in details by making a reference to the accompanied drawings.

Figure 7:
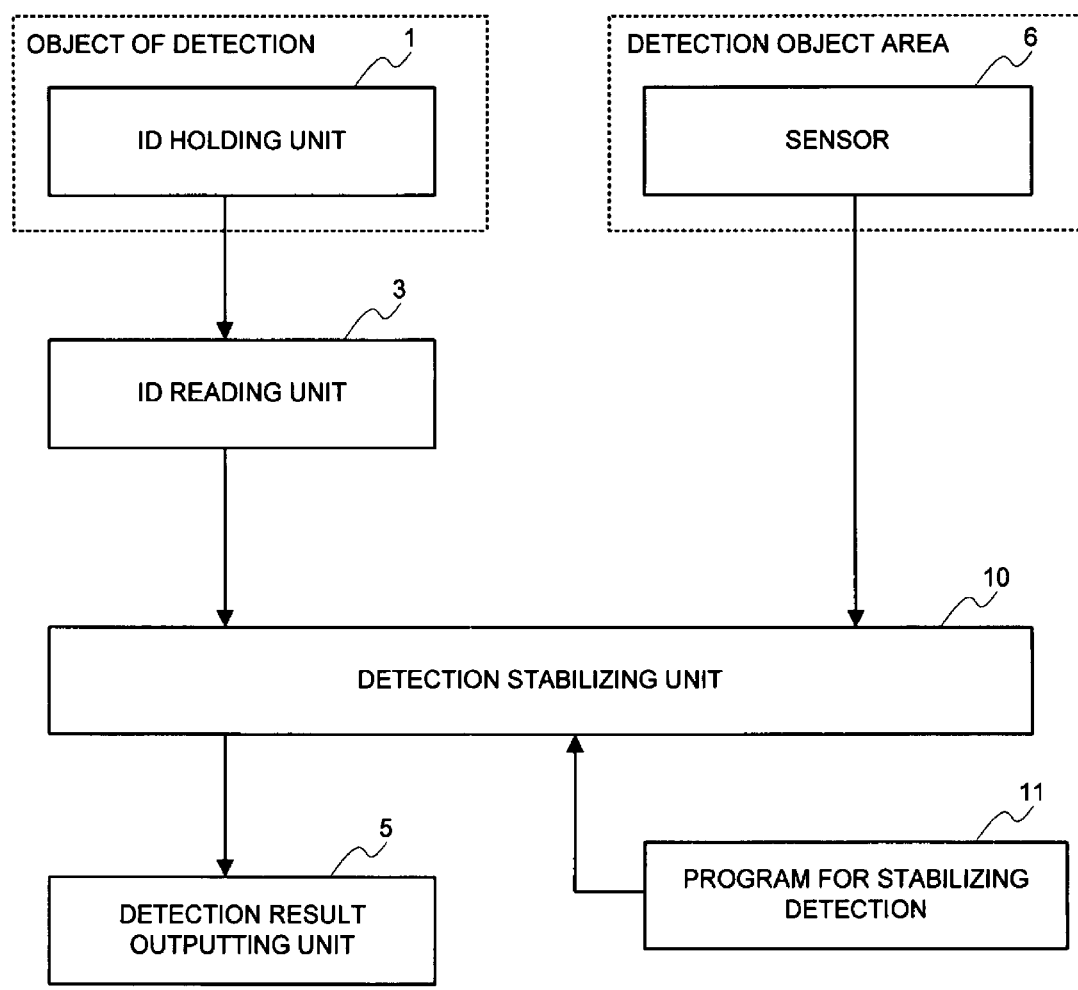
FIG. 7 is a block diagram illustrating a configuration of the best mode for carrying out a fourth invention of the present invention.

Upon making a reference to FIG. 7, the best mode for carrying out the fourth invention of the present invention includes an detection-object ID holding unit 1, an ID reading unit 3, a sensor 6, and a detection result outputting unit 5 similarly to the best mode for carrying out the second invention of the present invention.

A detection stabilization program 11, which is loaded in a detection stabilizing unit 10, controls an operation of the detection stabilizing unit 10.

The detection stabilizing unit 10 executes a process similar to the process under control of the detection stabilization program 11, which is performed by the detection stabilizing unit 7 in the best mode for carrying out the second invention of the present invention.

Next, the best mode for carrying out a fifth invention of the present invention will be explained in details by making a reference to the accompanied drawings.

Figure 22:
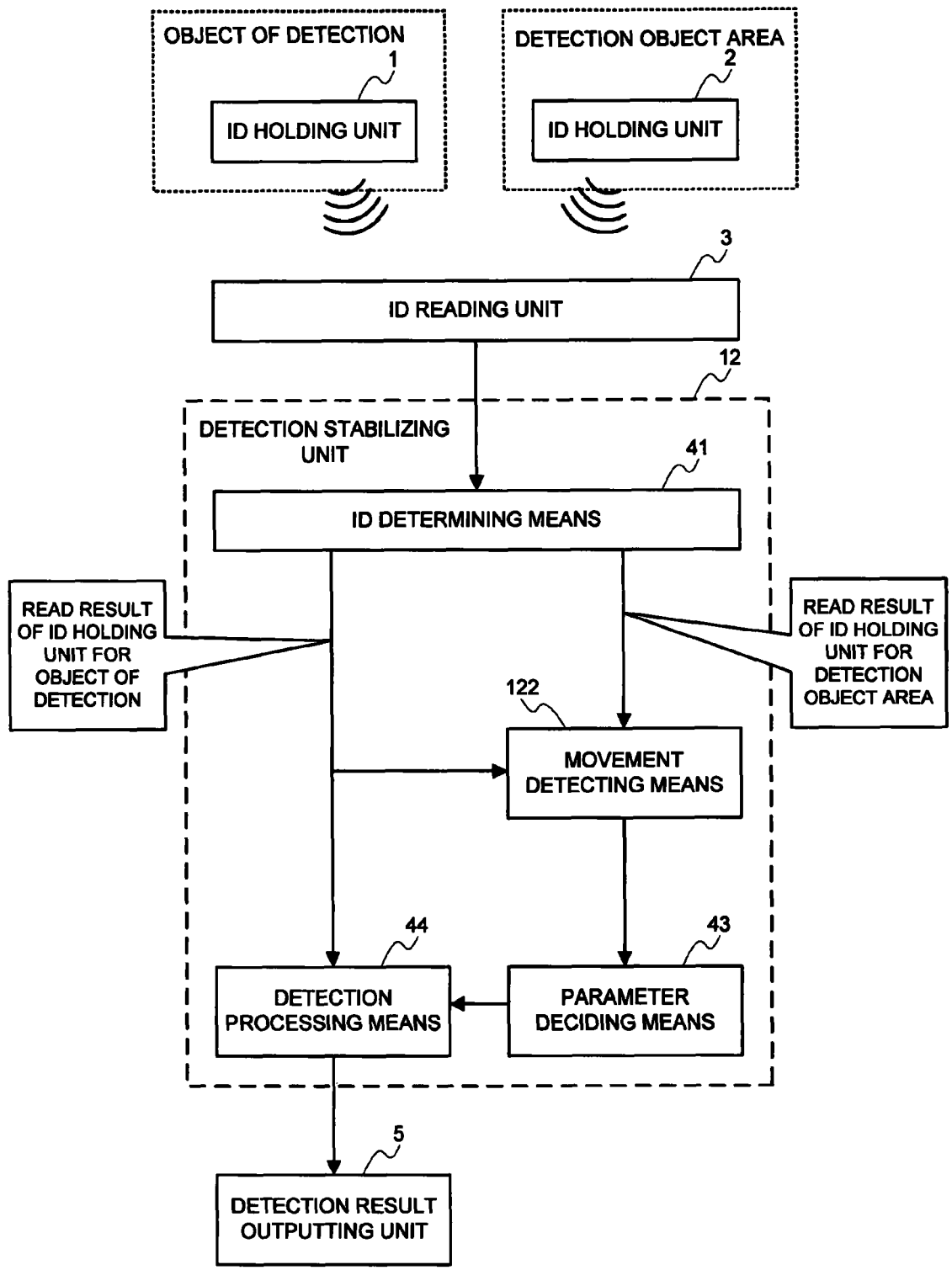
FIG. 22 is a block diagram illustrating a configuration of the best mode for carrying out a fifth invention of the present invention.

Upon making a reference to FIG. 22, the best mode for carrying out the fifth invention of the present invention differs in a point that a detection stabilizing unit 12 includes a movement detecting means 122 for detecting the movement quantity of the object of detection from the read results of the detection-object ID holding unit 1 and the detection-area ID holding unit 2 instead of the movement detecting means 42 in the configuration of the detection stabilizing unit 4 in the best mode for carrying out the first invention of the present invention shown in FIG. 2.

Next, an operation of the best mode for carrying out the present invention will be explained in details by making a reference to FIG. 22 and FIG. 23.

Figure 23:
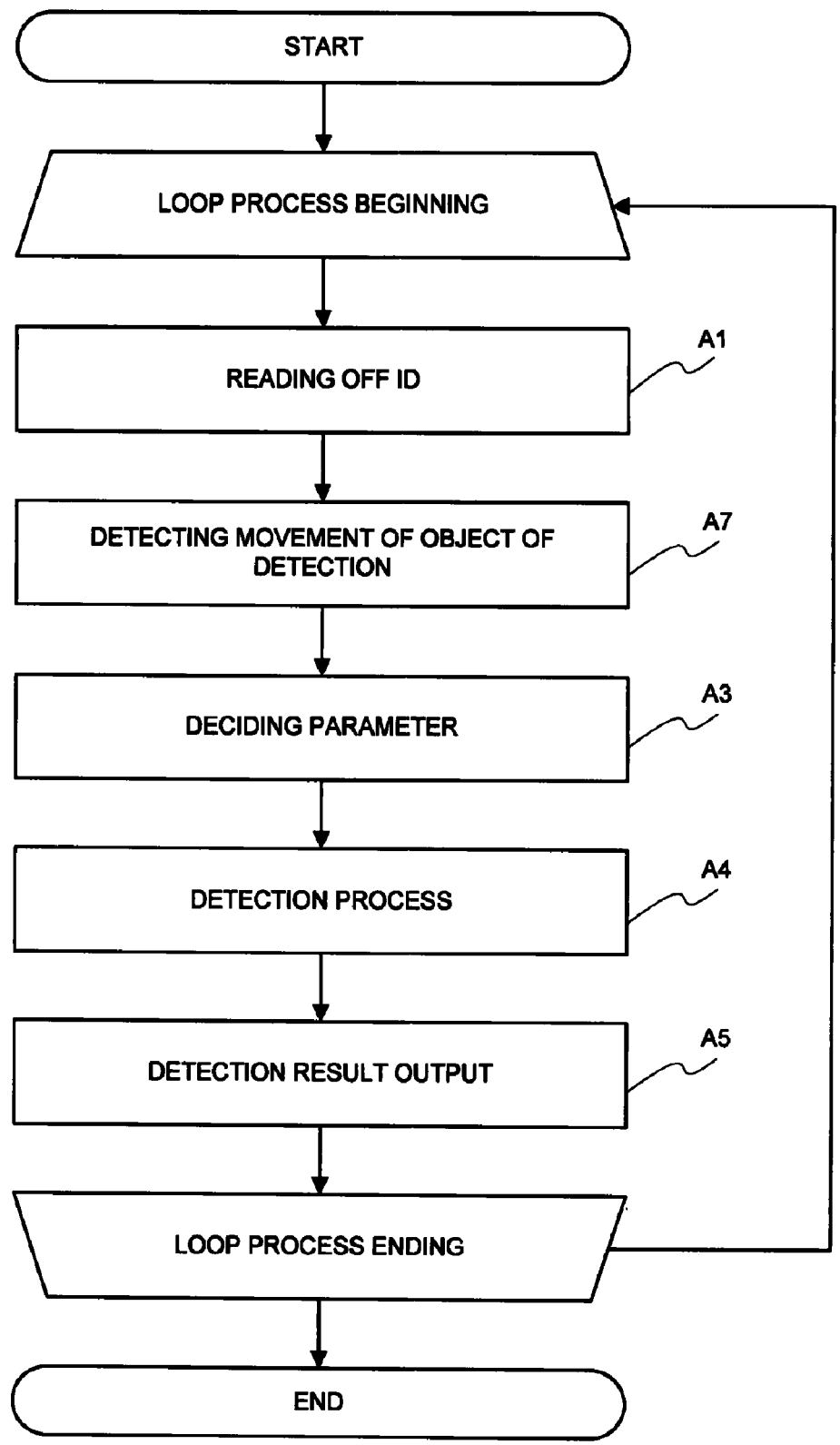
FIG. 23 is a flowchart illustrating an operation of the best mode for carrying out the fifth invention of the present invention.

Additionally, an operation of an ID determining means 41, a parameter deciding-means 43, and a detection processing means 44 in the best mode for carrying out the present invention, which is shown in the step A1 and A3 A5 of FIG. 23, is identical to that of the means 41, 43 and 44 in the best mode for carrying out the first invention of the present invention, respectively, so its explanation is omitted.

In the best mode for carrying out the first invention of the present invention, the movement quantities of the human body and the other non-human objects within the detection area were detected from the read result of the detection-area ID holding unit 2 obtained by the ID reading unit 3; however when a plurality of the humans human bodies and other non-human objects exist simultaneously within the detection area, it follows that the movement other than that of the object of detection is detected in some cases.

On the other hand, in the history of the result obtained by reading held in the detection-object ID holding unit 1 with the ID reading unit 3, which has been determined by the ID determining means 41, in a case where the detection-object ID holding units 1 move, thereby enabling the ID reading unit 3 to read off the reception intensity, a fluctuation in its numerical value is included, and in a case where the ID reading unit 3 cannot read off the reception intensity, a fluctuation in a read ratio over a constant time is included.

Thereupon, the movement detecting means 122 in the best mode for carrying out the present invention detects the movement quantity of the object of detection, to which the corresponding detection-object ID holding unit 1 has been attached, from a fluctuation that can be viewed in the history of the read results of the detection-object ID holding unit 1 and the detection-area ID holding unit 2 (step A7).

Next, an effect of the best mode for carrying out the present invention will be explained.

In the best mode for carrying out the present invention, the movement quantity of the object of detection can be detected from a fluctuation in the read results of the ID holding unit for an object of detection attached to the object of detection and the ID holding unit for a detection area arranged within the detection area. For this, even when a plurality of human bodies and non-human objects exist simultaneously within the detection area, deciding the parameter, which is utilized for the detecting process, responding to the detected movement quantity of the object of detection makes it possible to dynamically change the time responsiveness or sensitivity of the detection, and to stabilize the detection of the RFID system without a necessity for placing limitations on the utilization environment or the utilization method, and without being influenced by a change in the utilization environment or the utilization method.

The best mode for carrying out a sixth invention of the present invention will be explained in details by making a reference to the accompanied drawings.

Figure 24:
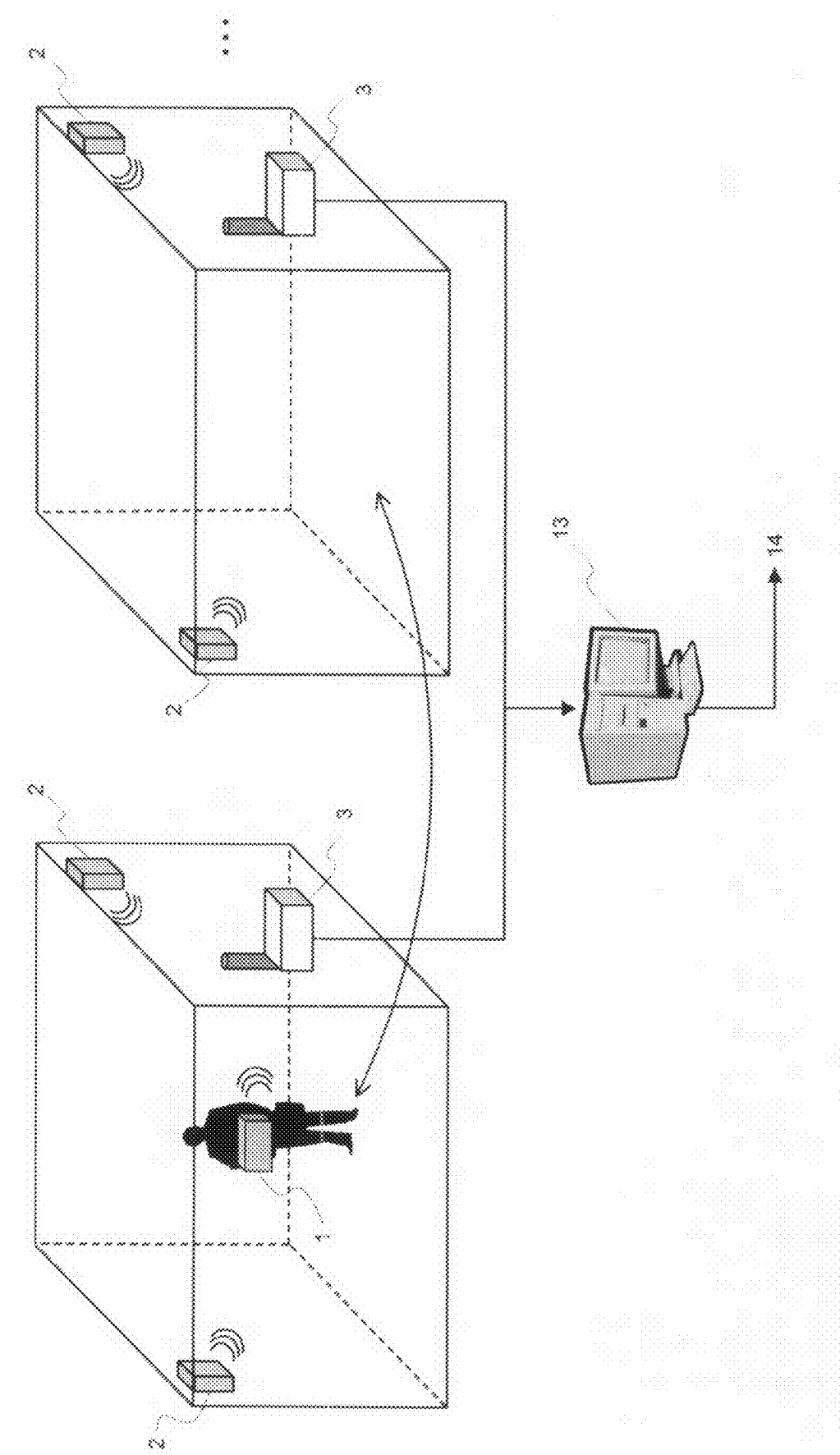
FIG. 24 is a view illustrating an outline of the best mode for carrying out a sixth invention of the present invention.
Figure 25:
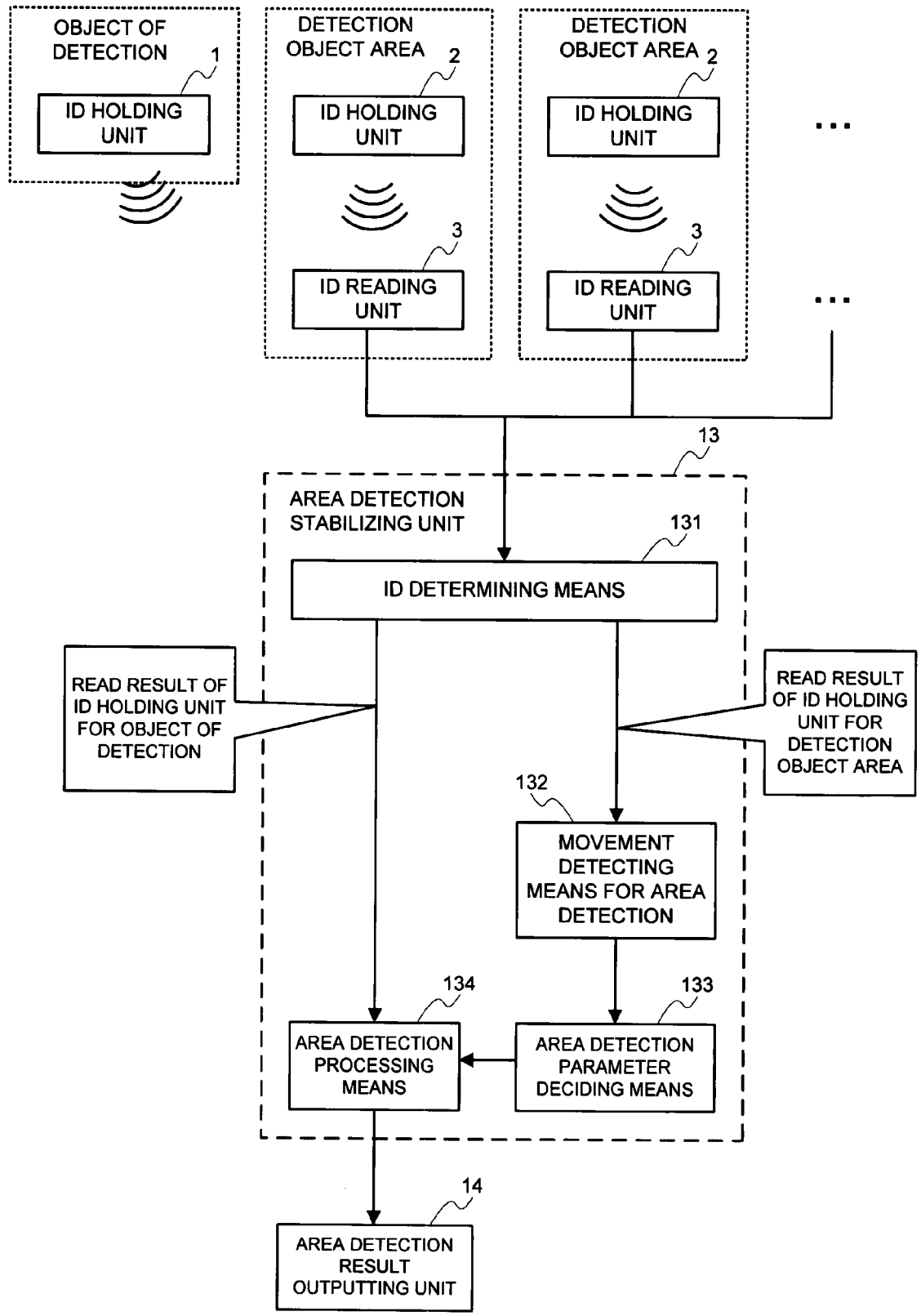
FIG. 25 is a block diagram illustrating a configuration of the best mode for carrying out the sixth invention of the present invention.

Upon making a reference to FIG. 24 and FIG. 25, the best mode for carrying out the sixth invention of the present invention differs in a point that a plurality of the detection areas exist, and a detection-area ID holding unit 2 and an ID reading unit 3 are arranged singularly or in plural in each detection area, respectively, and in point of including an area detection stabilizing unit 13 for detecting the area in which the detection-object ID holding unit 1 exists by employing the read results of the detection-object ID holding unit 1 and the detection-area ID holding unit 2 arranged in each detection area, which have been obtained by the ID reading unit 3 arranged in each detection area, and an area detection result outputting unit 14 for outputting a detection result instead of the detection stabilizing unit 4 and the detection result outputting unit 5 in the best mode for carrying out the first invention of the present invention shown in FIG. 2 as compared with the best mode for carrying out the first invention of the present invention shown in FIG. 1 and FIG. 2. Herein, the so-called area detection signifies determining the area in which the object of detection exists, out of a plurality of the areas.

The area detection stabilizing unit 13 includes an ID determining means 131 for determining whether the read result of information held by the ID holding unit read by the ID reading unit 3 arranged in each detection area is the read result of the detection-object ID holding unit 1 or the read result of the detection-area ID holding units 2, an area-detection movement detecting means 132 for detecting the movement qualities of the human body and the other non-human objects within the detection area from the read result of the detection-area ID holding units 2 arranged in each detection area, an area detection parameter deciding means 133 for deciding a parameter, which is utilized for the area detecting process, from the movement quantity detected by the area-detection movement detecting means 132, and an area detection processing means 134 for processing the read result of the detection-object ID holding unit 1 based upon the parameter decided by the area detection parameter deciding means 133 and detecting the area in which the object of detection exists.

Next, an operation of the best mode for carrying out the present invention will be explained in details by making a reference to FIG. 25 and FIG. 26.

In the history of the result obtained by reading off information held by the detection-area ID holding unit 2 by the ID reading unit 3, which has been determined by the ID determining means 131 (step A8 of FIG. 26), in a case where the human body and other non-human objects move within each detection area, thereby enabling the ID reading unit 3 to read off the reception intensity, a fluctuation in its numerical value is included, and in a case where the ID reading unit 3 cannot read off the reception intensity, a fluctuation in a read ratio over a constant time is included.

Figure 26:
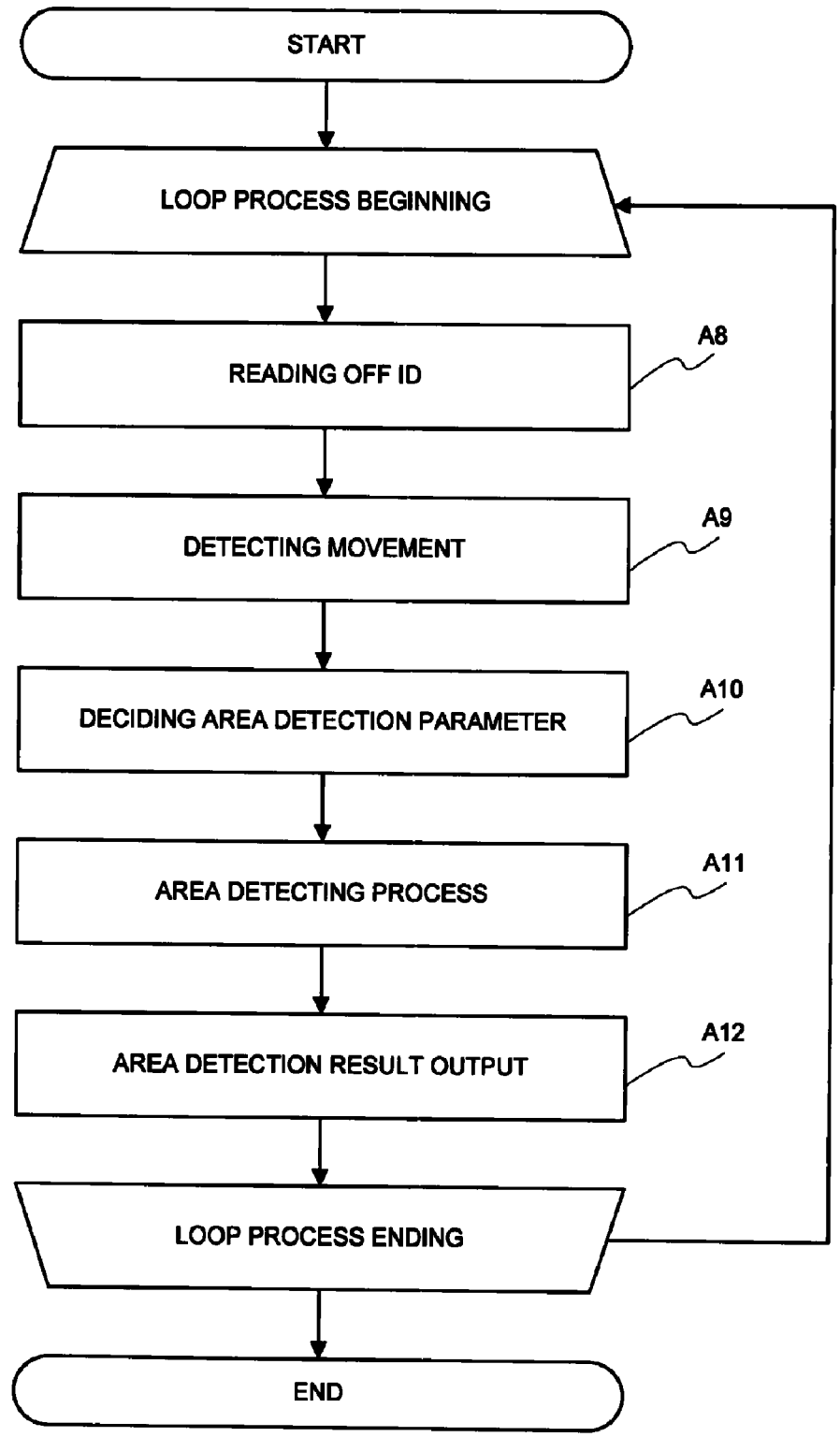
FIG. 26 is a flowchart illustrating an operation of the best mode for carrying out the sixth invention of the present invention.

The area-detection movement detecting means 132 detects the movement quantities of the human body and the other non-human objects within each detection area from a fluctuation that can be viewed in the history of the read result obtained by reading off the detection-area ID holding unit 2 with the ID reading unit 3 (step A9 of FIG. 26).

The area detection parameter deciding means 133 decides a parameter, which is utilized by the area detection processing means 134, responding to the movement quantity of each detection area detected by the area-detection movement detecting means 132 (step A10).

The area detection processing means 134 processes the read result of the detection-object ID holding unit 1 determined by the ID determining means 131, based upon the parameter decided by the area detection parameter deciding means 133, and detects the area in which the object of detection exists (step A11).

An area detection result processed by the area detection processing means 134 is output by the area detection result outputting unit 14 (step A12).

As a specific example of the process that is performed by the area detection processing means 134, there exist the method of stochastically processing the read result of the detection-object ID holding unit 1 based upon a state transition probability table decided by the area detection parameter deciding means 133 and estimating the area in which the object of detection exists.

Next, an effect of the best mode for carrying out the present invention will be explained.

In the best mode for carrying out the present invention, deciding the parameter, which is utilized for the detecting process, responding to the movement quantities of the human body and the other non-human objects within each detection area, which can be detected from a fluctuation in the read results of the ID holding units for a detection area arranged within a plurality of the detection areas, makes it possible to dynamically change the time responsiveness or sensitivity of the detection, and to stabilize the area detection of the RFID system without a necessity for placing limitations on the utilization environment or the utilization method, and without being influenced by a change in the utilization environment or the utilization method.

The best mode for carrying out a seventh invention of the present invention will be explained in details by making a reference to the accompanied drawings.

Figure 27:
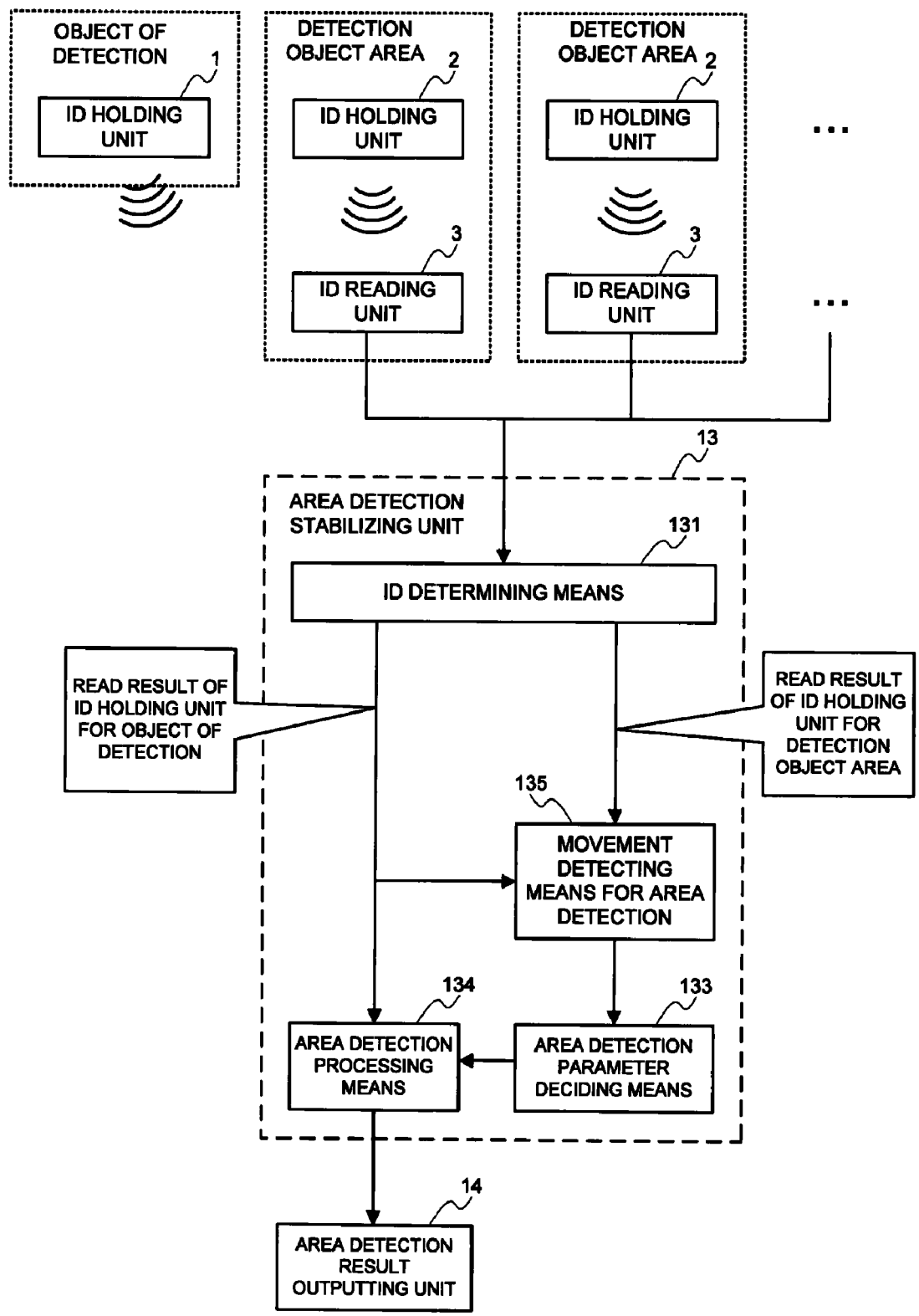
FIG. 27 is a block diagram illustrating a configuration of the best mode for carrying out a seventh invention of the present invention.

Upon making a reference to FIG. 27, the best mode for carrying out the seventh invention of the present invention differs in a point that an area detection stabilizing unit 14 includes an area-detection movement detecting means 135 for detecting the movement quantity of the object of detection within each detection area from the read results of the detection-object ID holding unit 1 and the detection-area ID holding unit 2 arranged within each detection area instead of the area-detection movement detecting means 132 in the configuration of the area detection stabilizing unit 13 in the best mode for carrying out the sixth invention of the present invention shown in FIG. 25.

Next, an operation of the best mode for carrying out the present invention will be explained in details by making a reference to FIG. 27 and FIG. 28.

Figure 28:
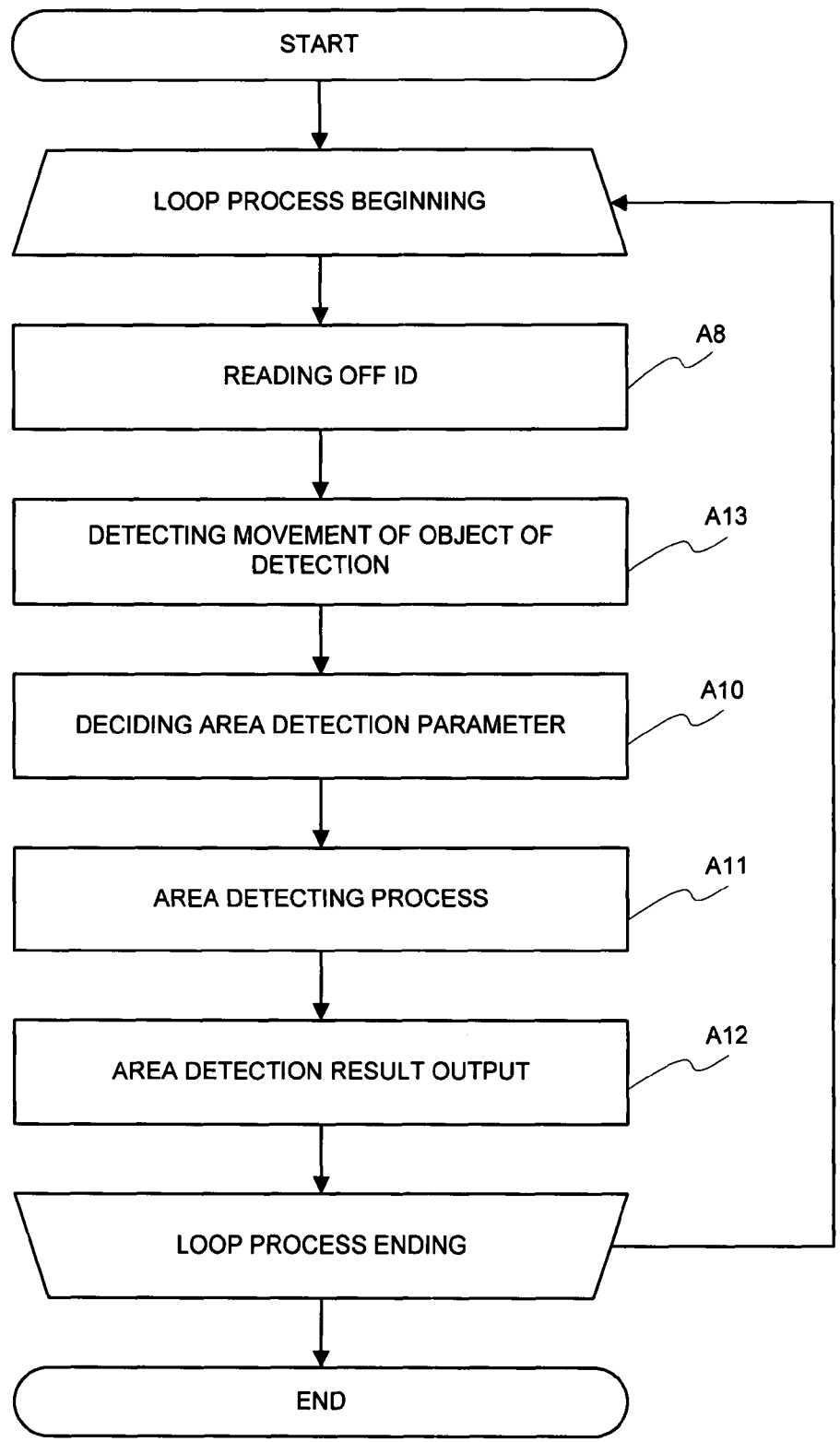
FIG. 28 is a flowchart illustrating an operation of the best mode for carrying out the seventh invention of the present invention.

An operation of an ID determining means 131, an area detection parameter deciding means 133, and an area detection processing means 134 in the best mode for carrying out the present invention, which is shown in steps A8 and A10-A13 of FIG. 28, is identical to that of the means 131, 133 and 134 in the best mode for carrying out the sixth invention of the present invention, respectively, so its explanation is omitted.

In the best mode for carrying out the sixth invention of the present invention, the movement quantities of the human body and the other non-human objects within each detection area were detected from the read result of the detection-area ID holding unit 2 arranged in each detection area that was obtained by the ID reading unit 3; however when a plurality of bodies and non-human objects exist simultaneously within the detection area, it follows that the movement other than that of the object of detection is detected in some cases.

Further, in the history of the result obtained by reading off the detection-object ID holding unit 1 with the ID reading unit 3, which has been determined by the ID determination mean 131, in a case where the detection-object ID holding units moves, thereby enabling the ID reading unit 3 to read off the reception intensity, a fluctuation in its numerical value is included, and in a case where the ID reading unit 3 cannot read off the reception intensity, a fluctuation in a read ratio over a constant time is included.

The area-detection movement detecting means 135 in the best mode for carrying out the present invention detects the movement quantity of the object of detection within each detection area from a fluctuation that can be viewed in the history of the read results of the detection-object ID holding units 1 and the detection-area ID holding unit 2 arranged in each detection area (step A13).

Next, an effect of the best mode for carrying out the present invention will be explained.

In the best mode for carrying out the present invention, the movement of the object of detection, to which the ID holding unit for an object of detection has been attached, within each detection area can be detected from a fluctuation in the read results of the ID holding unit for an object of detection attached to the object of detection and the ID holding unit for an detection area arranged within each detection area. For this, even when a plurality of human bodies and non-human objects exist simultaneously within the detection area, deciding the parameter, which is utilized for the detecting process, responding to the detected movement quantity makes it possible to dynamically change the time responsiveness or sensitivity of the detection, and to stabilize the area detection of the RFID system without a necessity for placing limitations on the utilization environment or the utilization method, and without being influenced by a change in the utilization environment or the utilization method.

The best mode for carrying out an eighth invention of the present invention will be explained in details by making a reference to the accompanied drawings.

Figure 39:
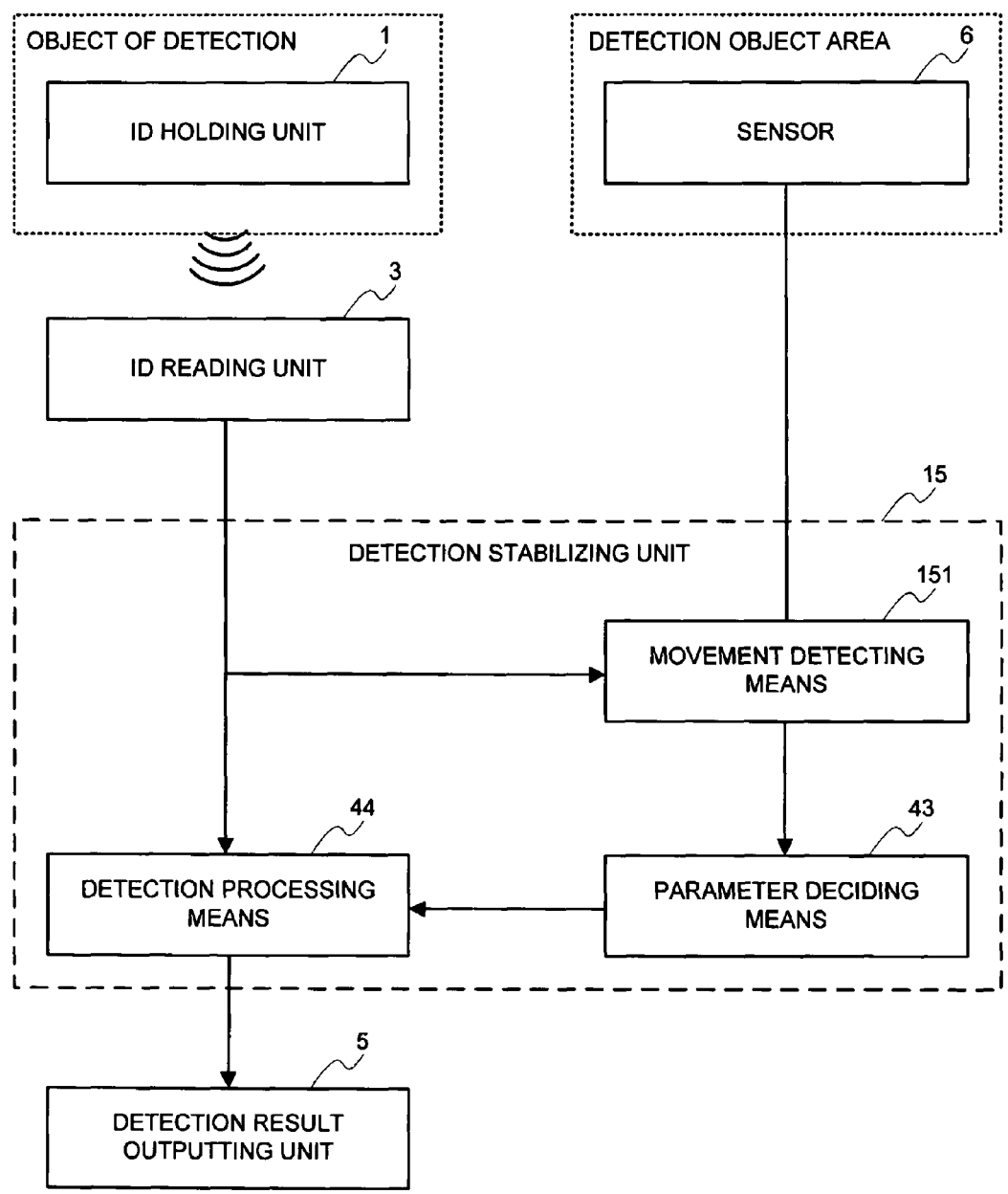
FIG. 39 is a block diagram illustrating a configuration of the best mode for carrying out an eighth invention of the present invention.

Upon making a reference to FIG. 39, the best mode for carrying out the eighth invention of the present invention differs in a point of including a sensor 6 fixed within the detection area instead of the detection-area ID holding units 2 in the best mode for carrying out the fifth invention of the present invention shown in FIG. 22, and in a point that a detection stabilizing unit 15 includes a movement detecting means 151 for detecting the movement quantity of the object of detection from information that is obtained from the detection-object ID holding unit 1 and the sensor 6 instead of the movement detecting means 122 in the configuration of the detection stabilizing unit 12 in the best mode for carrying out the fifth invention of the present invention shown in FIG. 22.

Next, an operation of the best mode for carrying out the present invention will be explained in details by making a reference to FIG. 39 and FIG. 40.

Figure 40:
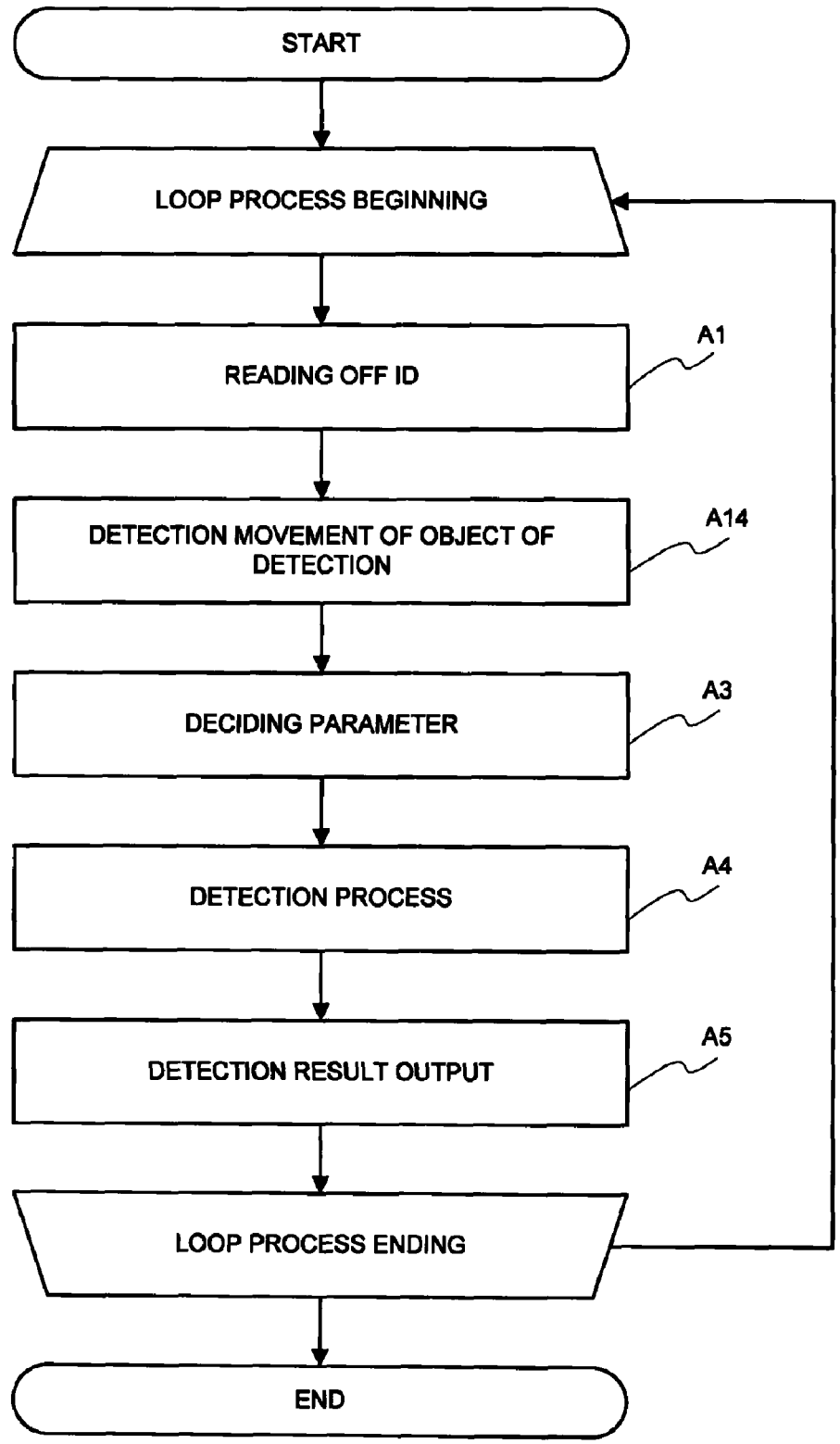
FIG. 40 is a flowchart illustrating an operation of the best mode for carrying out the eighth invention of the present invention.

Additionally, an operation of a parameter deciding means 43 and a detection stabilization processing means 44 in the best mode for carrying out the present invention, which is shown in steps A1 and A3-A5 of FIG. 40, is identical to that of the means 43 and 44 in the best mode for carrying out the fifth invention of the present invention, respectively, so its explanation is omitted.

In the best mode for carrying out the fifth invention of the present invention, the movement quantity of the object of detection was detected from the read results of the detection-object ID holding unit 1 and the detection-area ID holding unit 2 obtained by the ID reading unit 3; however in a case where the other sensor can be utilized for detecting the movement quantities of the human and the matter within the detection area, the detection-area ID holding units 2 is not necessitated in some cases. The movement detecting means 151 in the best mode for carrying out the present invention detects the movement quantity of the object of detection from a fluctuation in the read result of the detection-object ID holding units 1 and information that is obtained by the sensor arranged in the detection area (step A14).

Next, an effect of the best mode for carrying out the present invention will be explained.

In the best mode for carrying out the present invention, the movement of the object of detection can be detected from a fluctuation in the read result of the ID holding unit for an object of detection attached to the object of detection and information that is obtained by the sensor capable of detecting the movement quantities of the human body and the other non-human objects arranged within the detection area. For this, even when a plurality of human bodies and non-human objects exist simultaneously within the detection area, deciding the parameter, which is utilized for the detecting process, responding to the detected movement quantity of the object of detection makes it possible to dynamically change the time responsiveness or sensitivity of the detection, and to stabilize the detection of the RFID system without a necessity for placing limitations on the utilization environment or the utilization method, and without being influenced by a change in the utilization environment or the utilization method.

The best mode for carrying out a ninth invention of the present invention will be explained in details by making a reference to the accompanied drawings.

Figure 41:
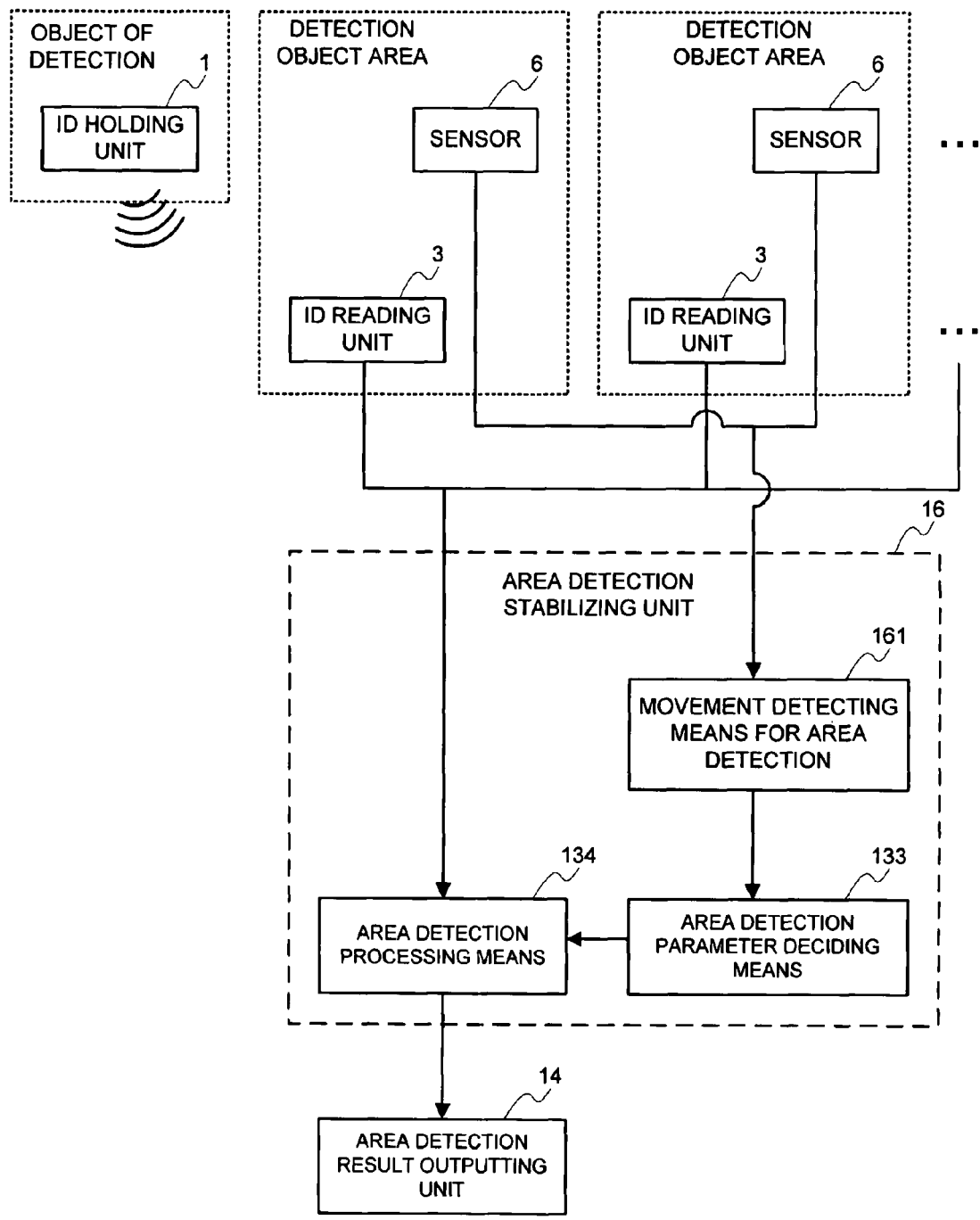
FIG. 41 is a block diagram illustrating a configuration of the best mode for carrying out a ninth invention of the present invention.

Upon making a reference to FIG. 41, the best mode for carrying out the ninth invention of the present invention differs in a point of including a sensor 6 fixed within the detection area instead of the detection-area ID holding unit 2 in the best mode for carrying out the sixth invention of the present invention shown in FIG. 25, and a point that a detection stabilizing unit 16 includes an area-detection movement detecting means 161 for detecting the movement quantities of the human and the matter within each detection area from information that is obtained by the sensor 6 instead of the area-detection movement detecting means 132 in the configuration of the detection stabilizing unit 13 in the best mode for carrying out the sixth invention of the present invention shown in FIG. 25.

Next, an operation of the best mode for carrying out the present invention will be explained in details by making a reference to FIG. 41 and FIG. 42.

Figure 42:
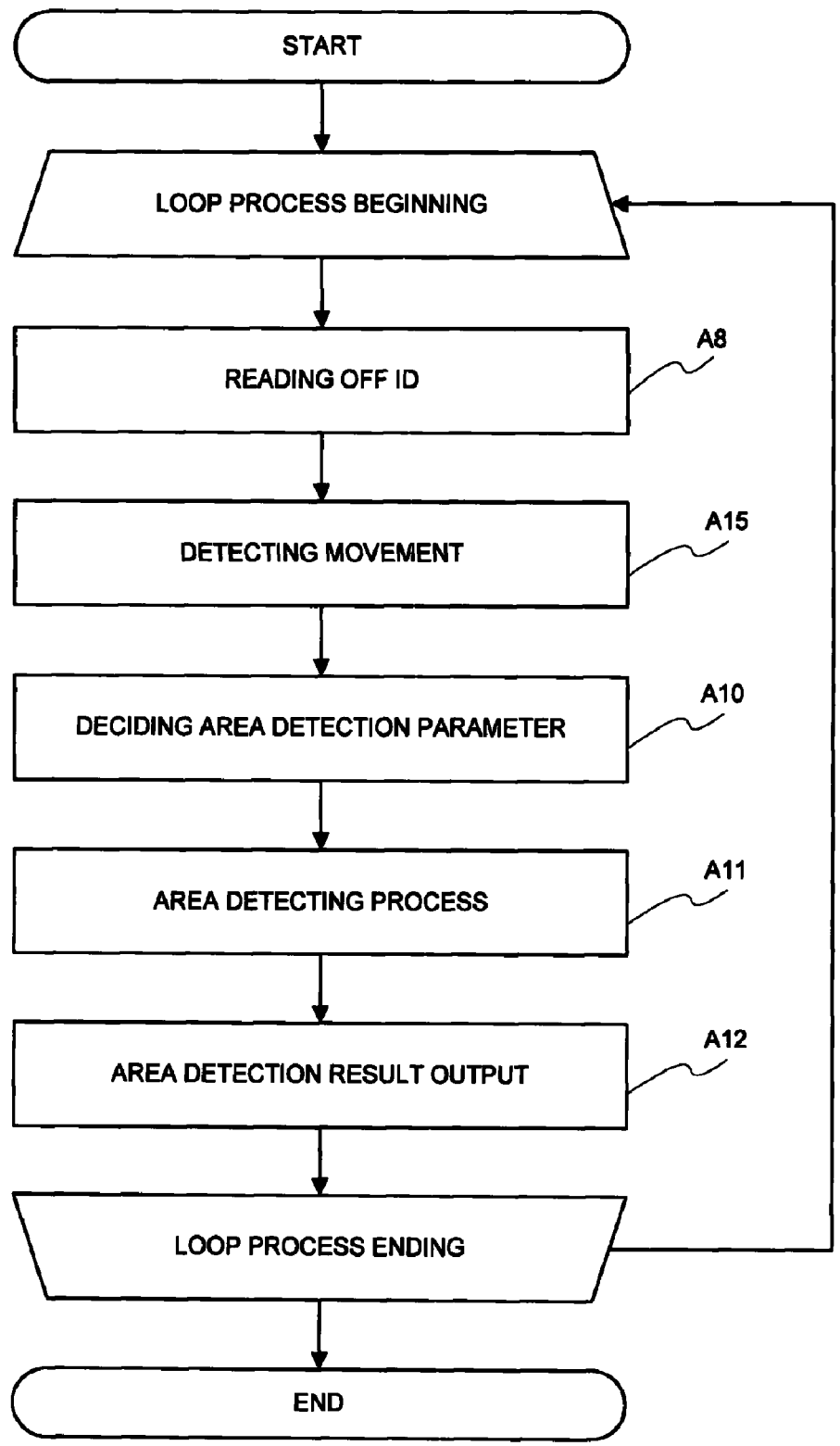
FIG. 42 is a flowchart illustrating an operation of the best mode for carrying out the ninth invention of the present invention.

Additionally, an operation of an area detection parameter deciding means 133 and an area detection processing means 134 in the best mode for carrying out the present invention, which is shown in steps A8 and A10-A12 of FIG. 42, is identical to that of the means 133 and 134 in the best mode for carrying out the sixth invention of the present invention, respectively, so its explanation is omitted.

In the best mode for carrying out the sixth invention of the present invention, the movement quantities of the human and the matter within each detection area were detected from the read result of the detection-area ID holding unit 2 arranged in each detection area that was obtained by the ID reading unit 3 arranged each detection area; however in a case where the other sensor can be utilized for detecting the movement quantity, the detection-area ID holding units 2 is not necessitated in some cases. The area-detection movement detecting means 161 in the best mode for carrying out the present invention detects the movement quantities of the human and the matter within each detection area from information that is obtained by the sensor arranged in each detection area (step A15).

Next, an effect of the best mode for carrying out the present invention will be explained.

In the best mode for carrying out the present invention, deciding the parameter, which is utilized for the detecting process, responding to the movement quantities of the human body and the other non-human objects within each detection area detected by the sensors capable of detecting the movement quantities of the human body and the other non-human objects arranged within a plurality of the detection areas makes it possible to dynamically change the time responsiveness or sensitivity of the detection, and to stabilize the area detection of the RFID system without a necessity for placing limitations on the utilization environment or the utilization method, and without being influenced by a change in the utilization environment or the utilization method.

The best mode for carrying out a tenth invention of the present invention will be explained in details by making a reference to the accompanied drawings.

Figure 43:
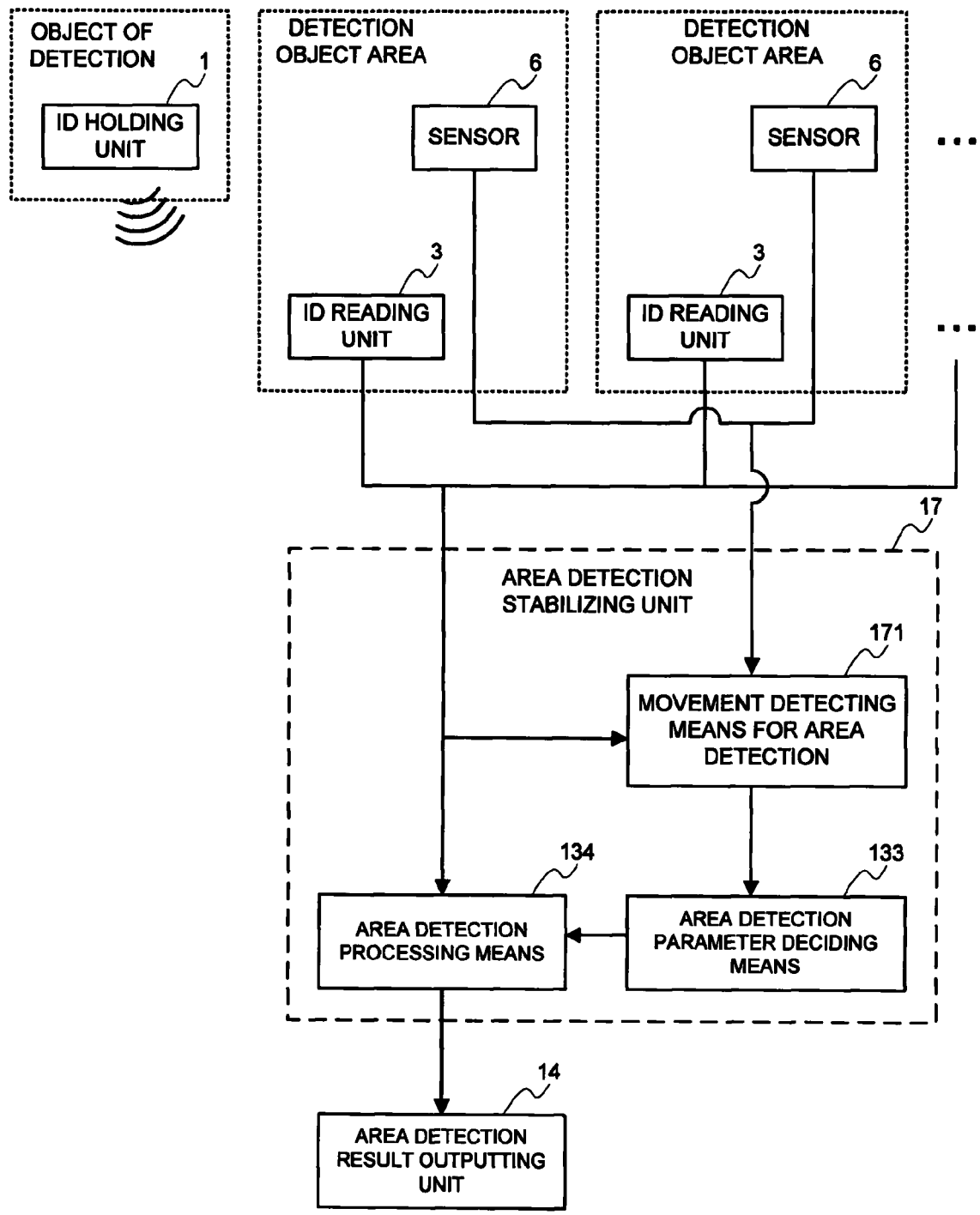
FIG. 43 is a block diagram illustrating a configuration of the best mode for carrying out a tenth invention of the present invention.

Upon making a reference to FIG. 43, the best mode for carrying out the tenth invention of the present invention differs in a point of including a sensor 6 fixed within the detection area instead of the detection-area ID holding unit 2 in the best mode for carrying out the seventh invention of the present invention shown in FIG. 27, and a point that a detection stabilizing unit 17 includes a movement detecting means 171 for detecting the movement quantity of the object of detection within each detection area from information that is obtained by the detection-object ID holding unit 1 and the sensor 6 instead of the area-detection movement detecting means 135 in the configuration of the detection stabilizing unit 14 in the best mode for carrying out the seventh invention of the present invention shown in FIG. 27.

Next, an operation of the best mode for carrying out the present invention will be explained in details by making a reference to FIG. 43 and FIG. 44.

Figure 44:
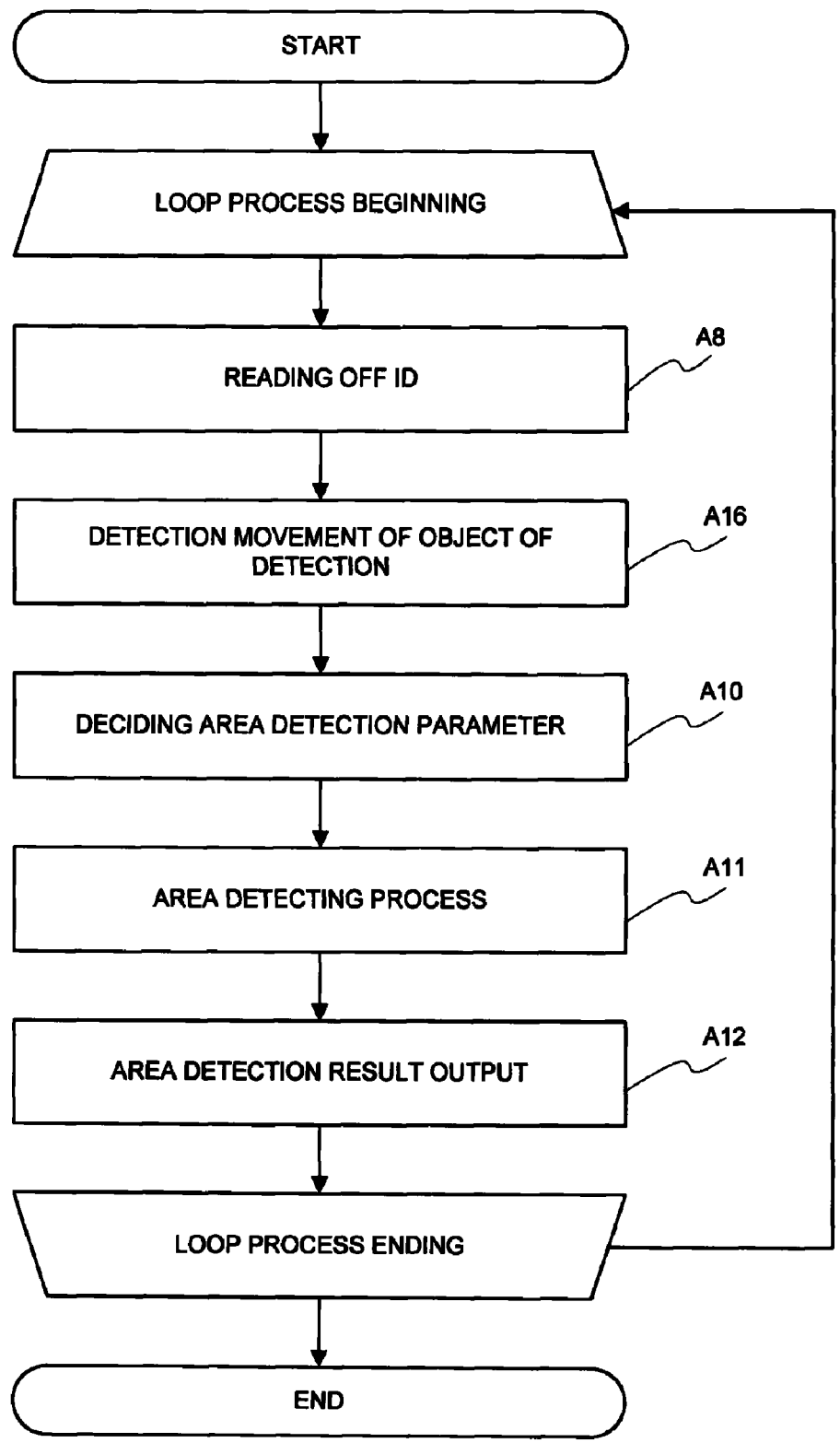
FIG. 44 is a flowchart illustrating an operation of the best mode for carrying out the tenth invention of the present invention.

Additionally, an operation of an area-detection parameter deciding means 133 and an area detection processing means 134 in the best mode for carrying out the present invention, which is shown in steps A8 and A10-A12 of FIG. 44, is identical to that of the means 133 and 134 in the best mode for carrying out the seventh invention of the present invention, respectively, so its explanation is omitted.

In the best mode for carrying out the seventh invention of the present invention, the movement quantity of the object of detection within each detection area was detected from the read results of the detection-object ID holding unit 1 and the detection-area ID holding unit 2 arranged in each detection area that were obtained by the ID reading unit 3 arranged in each detection area; however in a case where the other sensor can be utilized for detecting the movement quantities of the human and the matter within the detection area, the detection-area ID holding unit 2 is not necessitated in some cases. The movement detecting means 171 in the best mode for carrying out the present invention detects the movement quantity of the object of detection within each detection area from a fluctuation in the read result of the detection-object ID holding unit 1 and information that is obtained from the sensor arranged in each detection area (step A16).

Next, an effect of the best mode for carrying out the present invention will be explained.

In the best mode for carrying out the present invention, the movement of the object of detection within each detection area can be detected from a fluctuation in the read result of the ID holding unit for an object of detection attached to the object of detection and information that is obtained by the sensor capable of detecting the movement quantities of the human body and the other non-human objects arranged within the detection area. For this, even when a plurality of human bodies and non-human objects exist simultaneously within the detection area, deciding the parameter, which is utilized for the detecting process, responding to the detected movement quantity even makes it possible to dynamically change the time responsiveness or sensitivity of the detection, and to stabilize the area detection of the RFID system without a necessity for placing limitations on the utilization environment or the utilization method, and without being influenced by a change in the utilization environment or the utilization method.

The best mode for carrying out an eleventh invention of the present invention will be explained in details by making a reference to the accompanied drawings.

Figure 45:
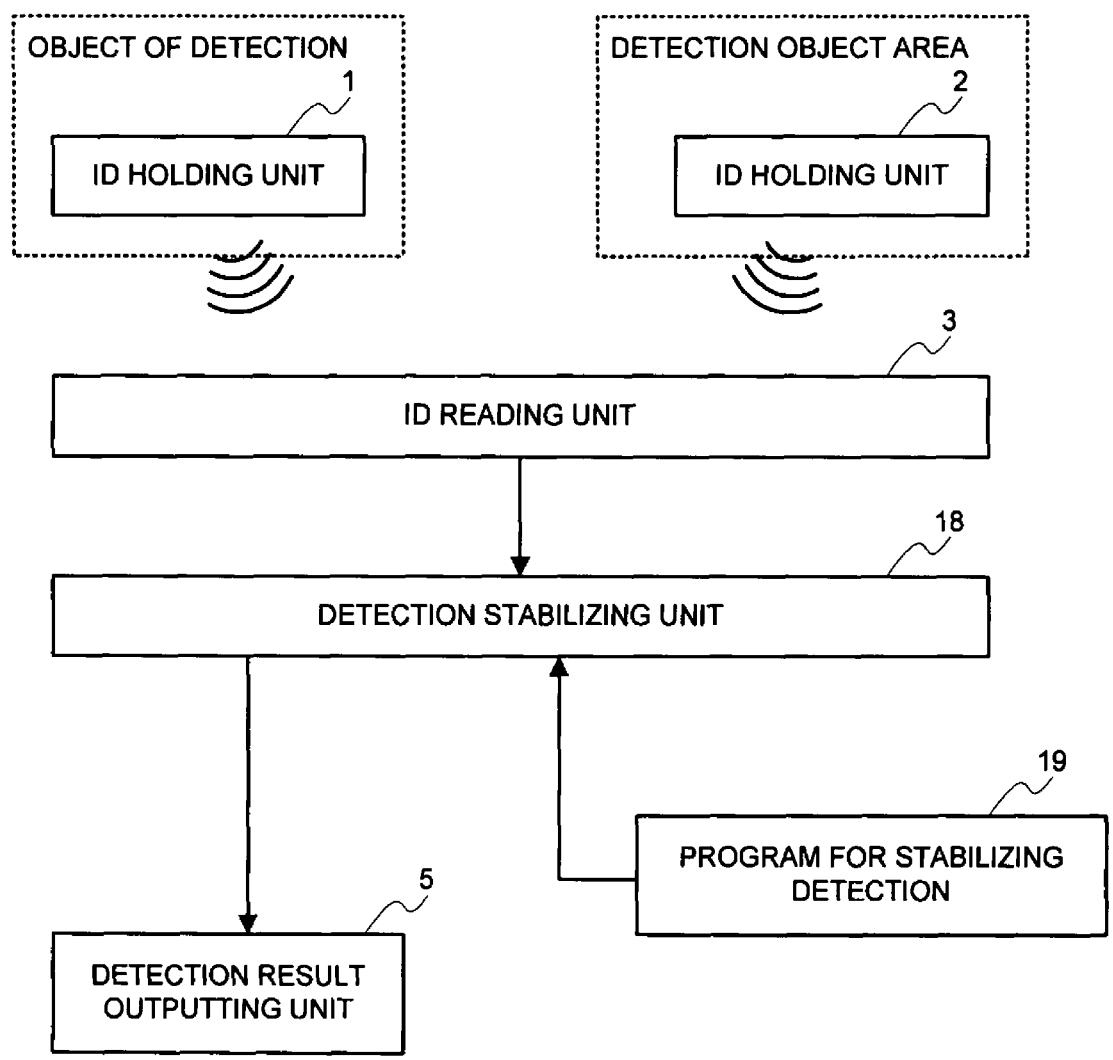
FIG. 45 is a block diagram illustrating a configuration of the best mode for carrying out an eleventh invention of the present invention.

Upon making a reference to FIG. 45, the best mode for carrying out the eleventh invention of the present invention includes an detection-object ID holding unit 1, a detection-area ID holding unit 2, an ID reading unit 3, and a detection result outputting unit 5 similarly to the best mode for carrying out the fifth invention of the present invention shown in FIG. 22.

A detection stabilization program 19, which is loaded in a detection stabilizing unit 18, controls an operation of the detection stabilizing unit 18. The detection stabilizing unit 18 executes a process similar to the process under control of the detection stabilization program 19, which is performed by the detection stabilizing unit 12 in the best mode for carrying out the fifth invention of the present invention.

The best mode for carrying out a twelfth invention of the present invention will be explained in details by making a reference to the accompanied drawings.

Figure 46:
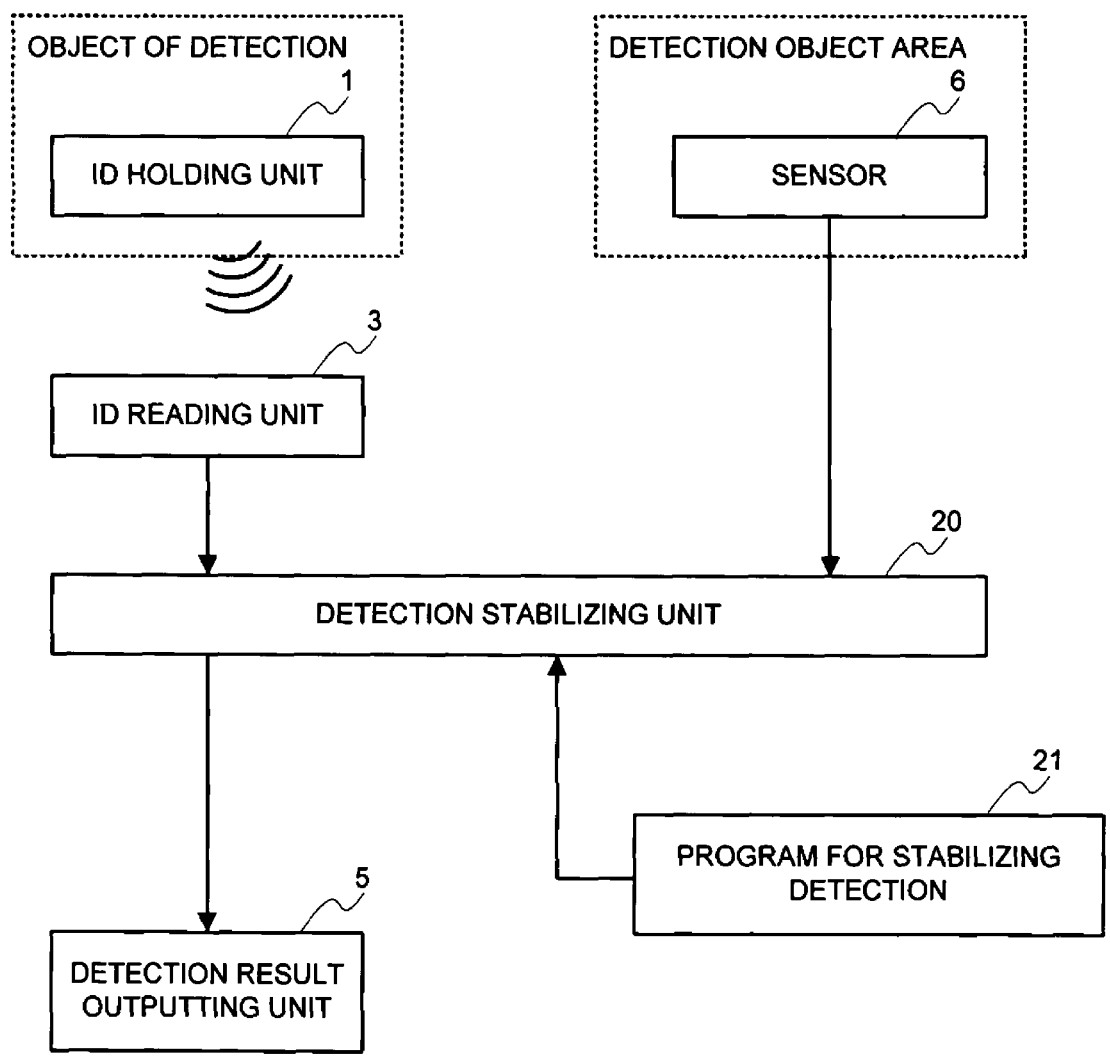
FIG. 46 is a block diagram illustrating a configuration of the best mode for carrying out a twelfth invention of the present invention.

Upon making a reference to FIG. 46, the best mode for carrying out the twelfth invention of the present invention includes an detection-object ID holding unit 1, a sensor 6, an ID reading unit 3, and a detection result outputting unit 5 similarly to the best mode for carrying out the eighth invention of the present invention shown in FIG. 39.

A detection stabilization program 21, which is loaded in a detection stabilizing unit 20, controls an operation of the detection stabilizing unit 20. The detection stabilizing unit 20 executes a process similar to the process under control of the detection stabilization program 21, which is performed by the detection stabilizing unit 15 in the best mode for carrying out the eighth invention of the present invention.

The best mode for carrying out a thirteenth invention of the present invention will be explained in details by making a reference to the accompanied drawings.

Figure 47:
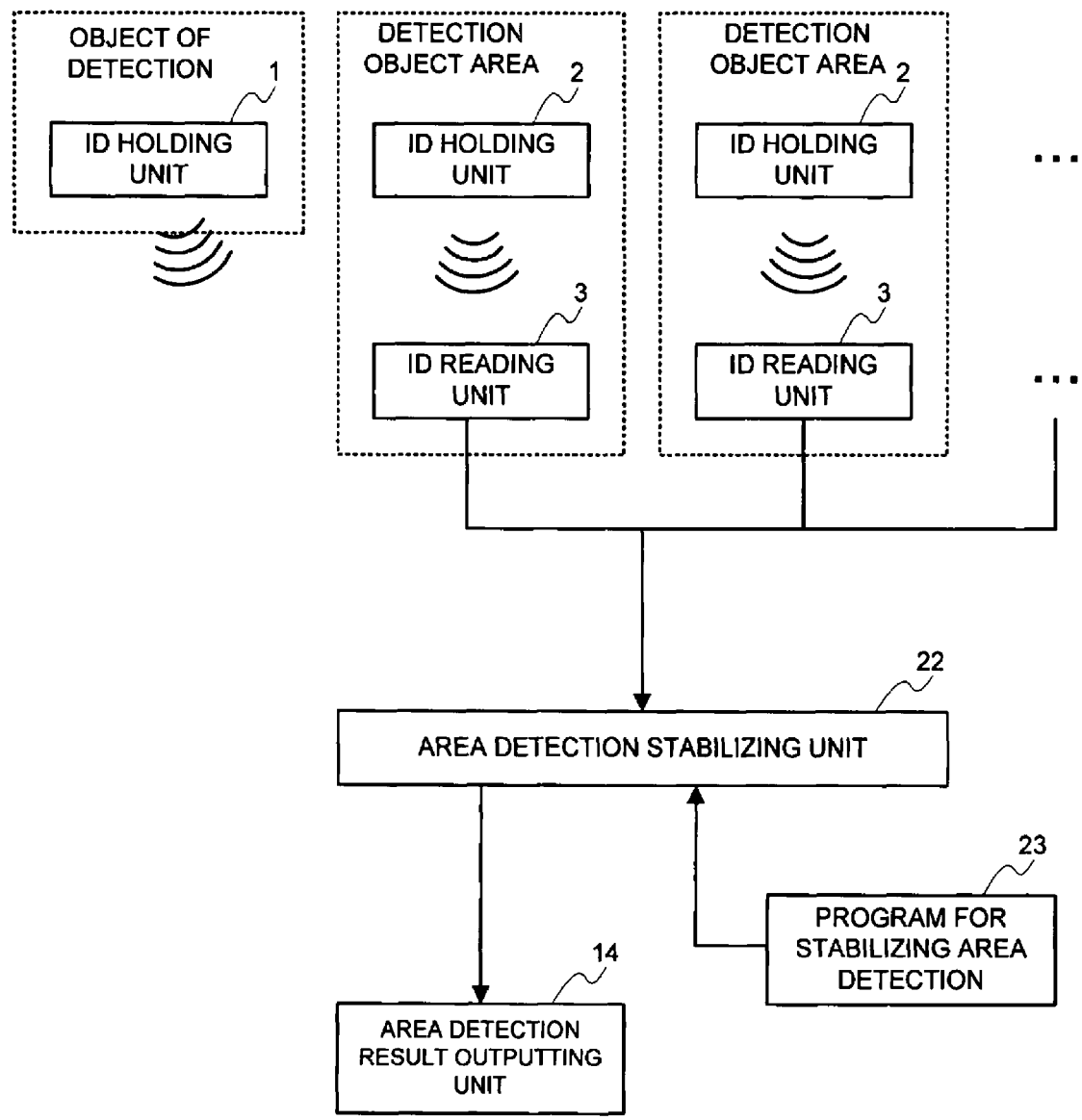
FIG. 47 is a block diagram illustrating a configuration of the best mode for carrying out a thirteenth invention of the present invention.

Upon making a reference to FIG. 47, the best mode for carrying out the thirteenth invention of the present invention includes an detection-object ID holding unit 1, a detection-area ID holding unit 2, an ID reading unit 3, and an area-detection result outputting unit 14 similarly to the best mode for carrying out the sixth invention of the present invention shown in FIG. 25 or the best mode for carrying out the seventh invention of the present invention shown in FIG. 27.

An area detection stabilization program 23, which is loaded in an area detection stabilizing unit 22, controls an operation of the area detection stabilizing unit 22. The area detection stabilizing unit 22 executes a process similar to the process under control of the area detection stabilization program 23, which is performed by the area detection stabilizing unit 13 in the best mode for carrying out the sixth invention of the present invention, or by the area detection stabilizing unit 14 in the best mode for carrying out the seventh invention of the present invention.

The best mode for carrying out a fourteenth invention of the present invention will be explained in details by making a reference to the accompanied drawings.

Upon making a reference to FIG. 48, the best mode for carrying out the fourteenth invention of the present invention includes a detection-object ID holding unit 1, a sensor 6, an ID reading unit 3, and an area detection result outputting unit 14 similarly to the best mode for carrying out the ninth invention of the present invention shown in FIG. 41 or the best mode for carrying out the tenth invention of the present invention shown in FIG. 43.

An area detection stabilization program 25, which is loaded in an area detection stabilizing unit 24, controls an operation of the area detection stabilizing unit 24. The area detection stabilizing unit 24 executes a process similar to the process under control of the area detection stabilization program 25, which is performed by the area detection stabilizing unit 16 in the best mode for carrying out the ninth invention of the present invention, or the area detection stabilizing unit 17 in the best mode for carrying out the tenth invention of the present invention.

Example 1

Next, an example 1 of the present invention will be explained by making a reference to the accompanied drawings. Such an example 1 corresponds to the best mode for carrying out the first invention of the present invention.

As a general process for aiming at stabilizing the detection in the conventional RFID system, the time-out process is employed in which it is determined that the object of detection has gone out of the detection area in a case where the reading thereof over a constant time (hereinafter, referred to as a time-out time) was impossible with respect to the history of the read result. In the time-out process, making the time-out time longer enables the detection result to be stabilized. On the other hand, there is the problem that the longer the time-out time is made, the more the time responsiveness of the detection result deteriorates. Thereupon, this example aims at dynamically changing the time-out time, which is employed for the time-out process, responding to the state of the detection area, thereby allowing the stability and the time responsiveness of the detection result to consist with each other.

In this example, similarly to the best mode for carrying out the foregoing inventions, the explanation is made on the premise that the detection-object ID holding unit 1 is attached to the object of detection such as the human and the matter. Further, in this example, the example of employing an active-type RFID tag using a button cell as a power source, which transmits an inherent ID that it has for each constant time (for example, one second) by means of radio communication will be explained as a specific example of the detection-object ID holding unit 1 and the detection-area ID holding unit 2, and the example of employing an RFID reader capable of reading off the value indicating the reception intensity (for example, 256-stage integer values ranging from 0 to 255) together with the ID from the detection-object ID holding unit 1 and the detection-area ID holding unit 2 will be explained as a specific example of the ID reading unit 3. Further, in this example, the detection stabilizing unit 4 is realized with a personal computer, and the display is employed as the detection result outputting unit 5.

Figure 8:
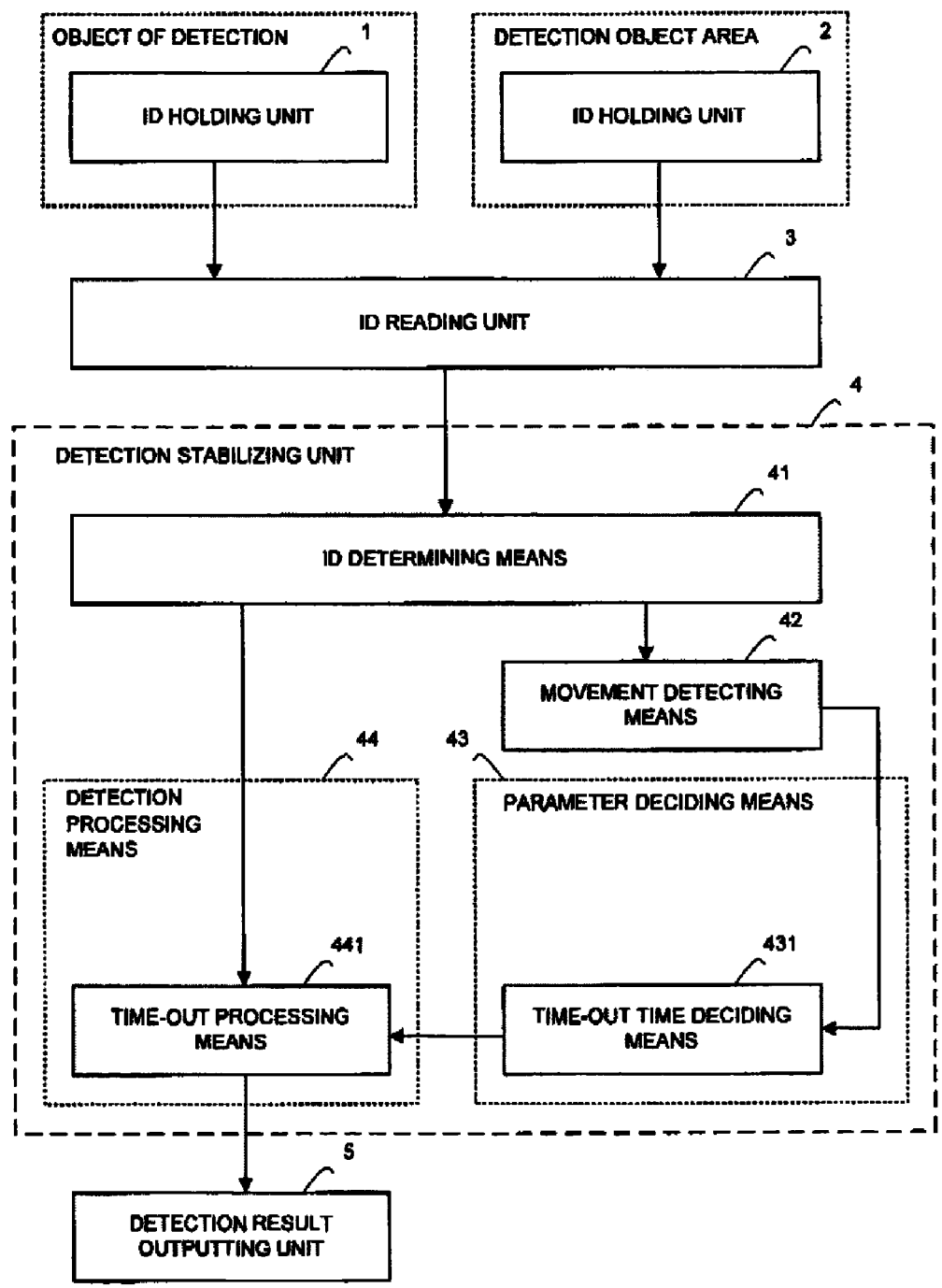
FIG. 8 is a block diagram illustrating a configuration of an example 1 of the present invention.

Upon making a reference to FIG. 8, the detection stabilizing unit 4 in this example includes an ID determining means 41 for determining whether the read result of the ID holding unit read off by the ID reading unit 3 is the read result of the detection-object ID holding unit 1 or the read result of the detection-area ID holding units 2, a movement detecting means 42 for detecting the movement qualities of the human and the matter within the detection area from the read result of the detection-area ID holding unit 2, a parameter deciding means 43 for receiving the movement quantity detected by the movement detecting means 42 and deciding the time-out time as a parameter, which is utilized for the time-out process, and delivering it to a detection processing means 44, and the detection processing means 44 for receiving the parameter decided by the parameter deciding means 43 and the read result of the detection-object ID holding unit 1, detecting whether the detection-object ID holding unit 1 exists within the detection area, and delivering a detection result to the detection result outputting unit 5.

The parameter deciding means 43, which includes a time-out time deciding means 431 for deciding a time-out time, which is utilized for the time-out process, from the movement quantity received from the movement detecting means 42, delivers the time-out time as a parameter to the detection processing means 44.

The detection processing means 44, which includes a time-out processing means 441 for performing a time-out process for the read result of the detection-object ID holding unit 1 by employing the time-out time received from the parameter deciding means 43, and detecting whether the detection-object ID holding unit 1 exists within the detection area, delivers a detection result to the detection result outputting unit 5.

The read result of the ID holding unit for an object of detection and the read result of the ID holding unit for a detection area coexist in the read result of ID holding unit read off by the ID reading unit 3. The ID determination mean 41 determines whether the read result of the ID holding unit read off by the ID reading unit 3 is the read result of the detection-object ID holding unit 1 or the read result of the detection-area ID holding unit 2 because the movement detecting means 42 demands the latter, and the detection processing means 44 demands the former. The ID determining means 41, which includes, for example, a data base having an ID and an ID holding unit class (for example, the ID holding unit is the detection-object ID holding unit 1 or the detection-area ID holding unit 2) caused to correspond to each other with respect to all of the ID holding units that are used, can determine whether the ID holding unit is for the object of detection or for the detection area from the read-off ID of the ID holding unit.

A fluctuation in the reception intensity caused by the human and matter moving within the detection area is included in the history of the result obtained by reading off the detection-area ID holding unit 2 with the ID reading unit 3. Upon making a reference to FIG. 9, the movement detecting means 42 is configured of a history storing means 421 for preserving the result as a history obtained by reading off the detection-area ID holding unit 2 with the ID reading unit 3 by making up one set of the time, the read-off ID of the RFID tag, and the reception intensity, a history extracting means 422 for extracting the latest constant-time portion (for example, the latest five-second portion) of the read result from the history of the read result of the detection-area ID holding unit 2 that is held by the history storing means 421, and a variance value computing means 423 for calculating a variance vale with an electric field intensity value in the history extracted by the history extracting means 422 regarded as a numerical value row.

Figure 9:
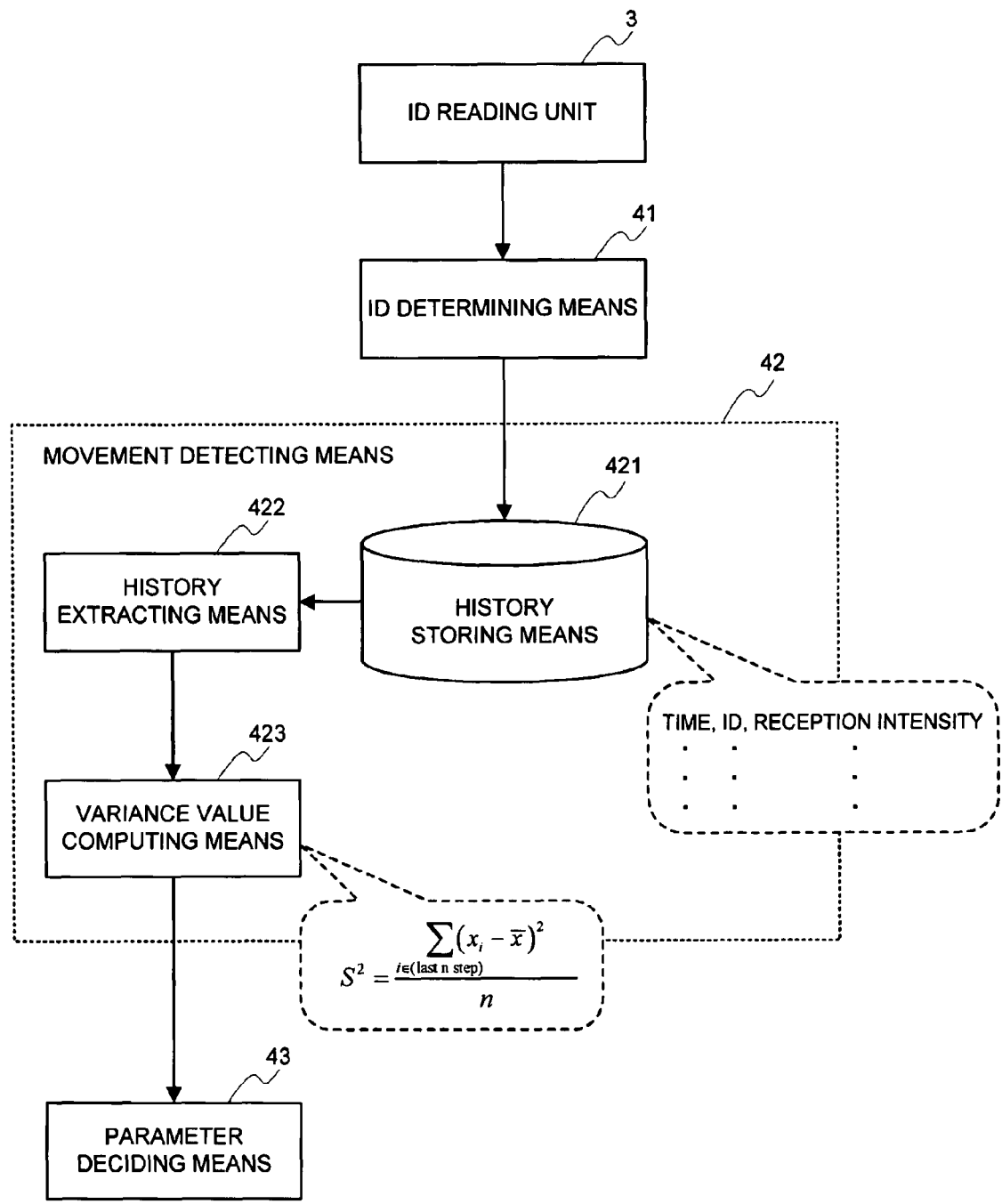
FIG. 9 is a block diagram illustrating a configuration of the movement detecting means in the example 1 of the present invention.

As apparent from a computation equation shown in FIG. 9, the variance value of the electric field intensity can be obtained by computing the average of the square of difference values, which are obtained by subtracting an average of the electric field intensity values in all steps from the extracted electric field intensity value in each step of the history. The variance value calculated by the variance value computing means 423 signifies a degree of the fluctuation in the extracted reception intensity in the history over a constant time, so this very variance value is defined to be a value indicating the movement quantities of the human and the matter within the detection area.

The time-out time deciding means 431 estimates that the possibility that the human and the matter each of which is an object of detection frequent the detection area is high in a case where the movement quantity detected by the movement detecting means 42 is much, and decides the time-out time so that it is short, and estimates that the possibility that the human and the matter each of which is an object of detection frequent the detection area is low in a case where the movement quantity is few, and decides the time-out time so that it is lengthy. By employing a measurement result of an experiment made by envisaging the situation in which the human and the matter move actually within the detection area, it is possible to set the threshold for determining whether the movement quantity is much or few to a value that enables whether the human and the matter each of which is an object of detection is moving within the detection area to be classified.

Figure 10:
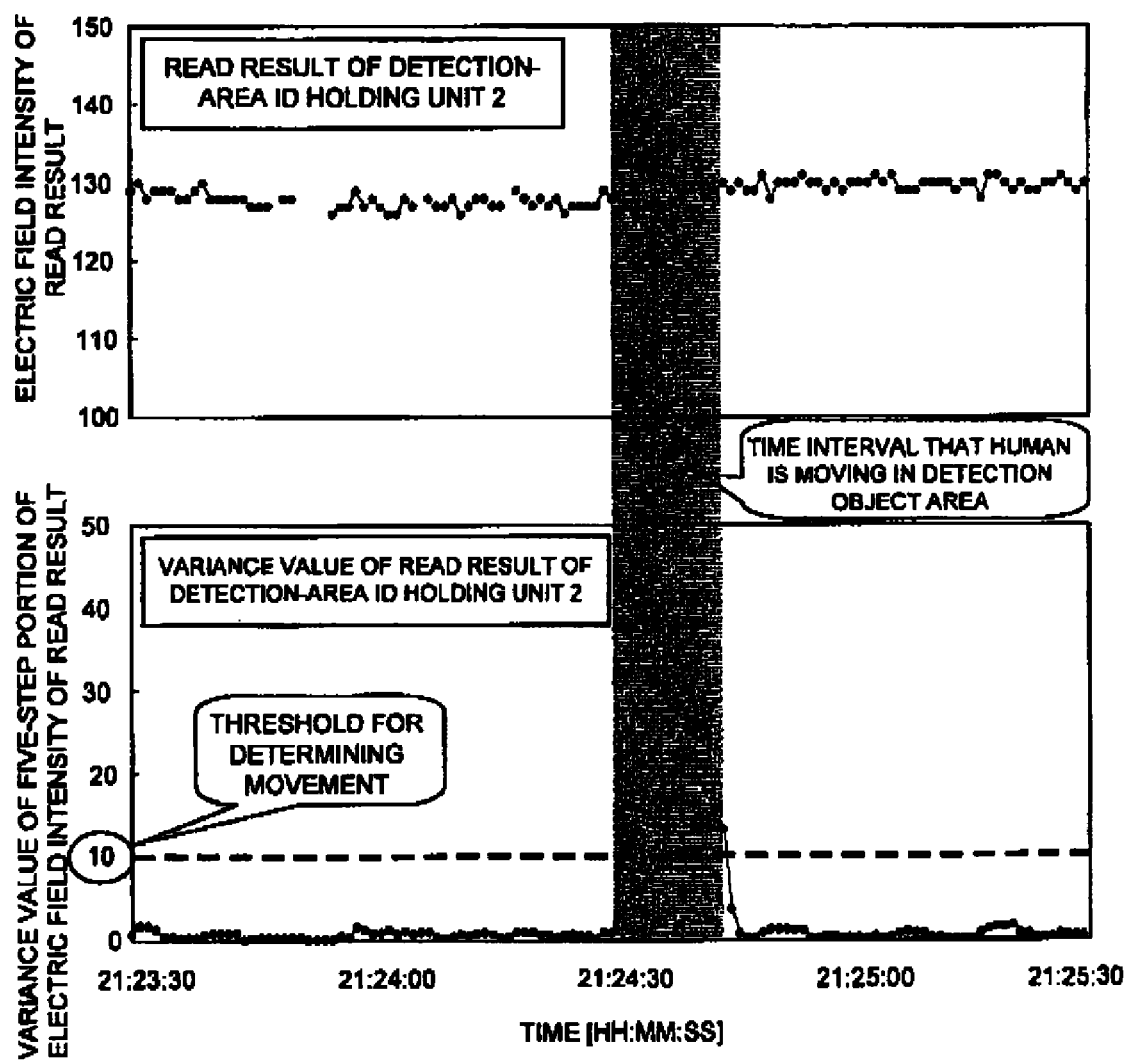
FIG. 10 is a graph illustrating a method of detecting the movement in the example 1 of the present invention.

For example, upon making a reference to FIG. 10, it is seen that with the variance value over a constant time (the case of five seconds was shown in FIG. 10) of the electric field intensity values of the read result computed by the variance value computing means 423, shown in an lower-side graph, the fluctuation in the reception intensity in a time zone that the human is moving in the detection area, which can be viewed in the result obtained by reading off the detection-area ID holding unit 2 with the ID reading unit 3, shown in a upper-side graph, can be clearly determined. With the case of the example shown in FIG. 10, setting 10 as a threshold for determining whether the movement quantity is high or low makes it possible to detect the movement of the human body and the other non-human objects within the detection area. As a method of deciding the threshold, the method can be employed of performing interior division of the average value over five seconds of the foregoing electric field intensity variance values in the case that the human body and the other non-human objects have not moved at all, and the average value over one minute of the foregoing electric field intensity variance values in the case that the human body and the other non-human objects are moving by a one-to-one ratio.

Further, the time-out times in respective cases, in which the movement is high or low, are set responding to the period at which a signal of the RFID tag is originated, or the radio wave intensity received by the RFID reader. For example, in a case of assuming that the human body is an object of detection in a certain conference room, the time-out time (a short value), which is employed when the movement is much, is set to 3 seconds, and the time-out time (a lengthy value), which is employed when the movement is few, to 10 seconds, respectively.

The time-out processing means 441 performs a time-out process of the read result of the detection-object ID holding unit 1 responding to the time-out time decided by the time-out time deciding means 431. Herein, the so-called time-out process signified a process in which it is determined that the object of detection has gone out of the detection area in a case where it was impossible to read off the ID within the time-out time. For example, in a case where the time-out time is three seconds, it is detected that the human and the matter each of which is an object of detection have gone out of the detection area when it was impossible to read off the ID for three seconds or more.

The detection result indicating whether the detection-object ID holding unit 1 exists within the detection area, which has been processed by the time-out processing means 441, is output by means of the display.

In this example, deciding the time-out time responding to the movement quantities of the human body and the other non-human objects within the detection area that can be detected by arranging the ID holding unit identical to the ID holding unit, which is attached to the object of detection, in the detection area makes it possible to stabilize the detection without being influenced by a complexity or a disorder of the radio wave environment due to a change in the utilization environment or the utilization method, and without deteriorating the time responsiveness of the detection result.

Further, only arranging the ID holding unit identical to the ID holding unit, which is attached to the object of detection, in the detection area makes it possible to stabilize the detection without deteriorating the time responsiveness of the detection result, whereby restrictions do not have to be put to the utilization environment or the utilization method of the conventional RFID system.

Above, in the example 1 of the present invention, the case of employing the active-type RFID capable of reading off the electric field intensity together with the ID as each of the ID holding unit and the ID reading unit was explained; however the active-type RFID that is not capable of reading off the electric field intensity together with the ID can be employed. In this case, employing, for example, the value of the read ratio over the past three seconds instead of the numerical value indicating the reception intensity in the read result of the detection-area ID holding unit 2, which becomes an object of the variance calculation in the movement detecting means 42, makes it possible to perform a process identical to the process of the example 1. The reason is that the fluctuation in not only the reception intensity but also the read ratio, which is caused by the human body and the other non-human objects moving within the detection area, is included in the history of the result obtained by reading off the detection-area ID holding unit 2 with the ID reading unit 3.

Further, a passive-type RFID as well can be employed for a system in which the ID holding unit having no power source transmits an inherent ID that it has by means of wireless communication owing to excitation by the ID reading unit, and the ID reading unit reads off the ID. In this case, the setting has to be made so that the ID reading unit reads off the ID for each interval of a constant time (for example, one second).

Example 2

Next, an example 2 of the present invention will be explained by making a reference to the accompanied drawings. Such an example 2 corresponds to the best mode for carrying out the first invention of the present invention.

As a general process for aiming at stabilizing the detection in the conventional RFID system, the threshold process is employed in which it is determined that the object of detection has gone out of the detection area in a case where the radio wave intensity of the read result has fallen below a constant value (hereinafter, referred to as a threshold). In the threshold process, setting the threshold makes it possible to prevent instability of the detection due to receiving a weak radio wave even though the human body and the other non-human objects each of which is an object of detection do not exist in the detection area. On the other hand, there is the problem that a sufficient effect of stabilization cannot be obtained notwithstanding setting a constant threshold because the reception sensitivity of the ID reading unit alters due to the movement of the human body and the other non-human objects within the detection area. Thereupon, this example aims at dynamically deciding the threshold, which is employed for the threshold process, responding to the state of the detection area, thereby allowing the stability and the sensitivity of the detection result to be consistent with each other.

Figure 12:
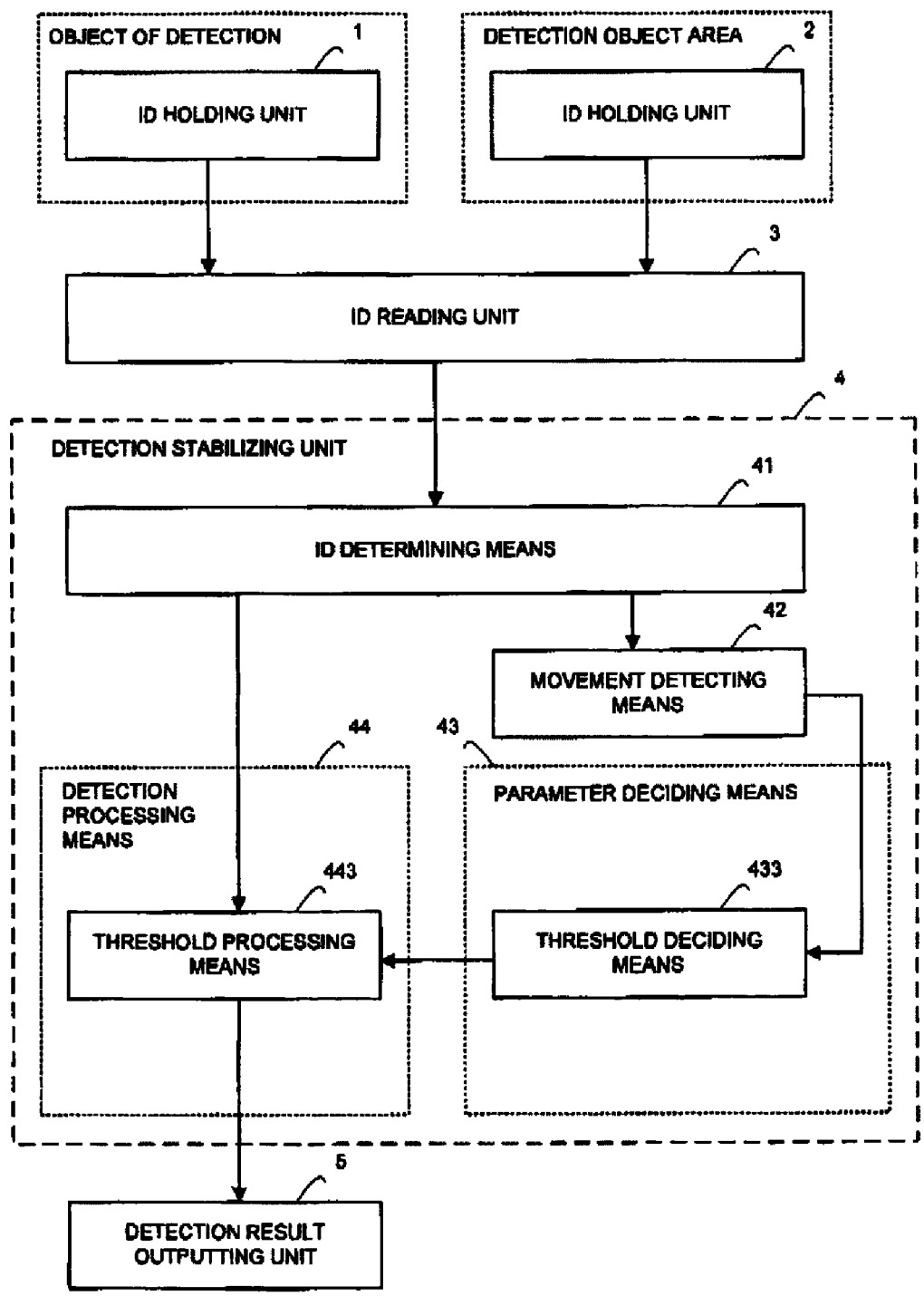
FIG. 12 is a block diagram illustrating a configuration of an example 2 of the present invention.

Upon making a reference to FIG. 12, this example differs in a point that a parameter deciding means 43 decides the threshold that is utilized for the threshold process as a parameter, and delivers it to a detection processing means 44, and the detection processing means 44 receives the threshold decided by the parameter deciding means 43 as a parameter, and detects whether the detection-object ID holding unit 1 exists within the detection area as compared with the example 1 of the present invention.

The parameter deciding means 43, which includes a threshold deciding means 432 for deciding a threshold, which is utilized for the threshold process, from the movement quantity received from the movement detecting means 42, delivers the threshold as a parameter to the detection processing means 44.

The detection processing means 44, which includes a threshold processing means 442 for performing a threshold process of the read result of the detection-object ID holding unit 1 by employing the threshold received from the parameter deciding means 43, and detecting whether the detection-object ID holding unit 1 exists within the detection area, delivers a detection result to the detection result outputting unit 5.

The threshold deciding means 432 decides the threshold so that it is small in a case where the movement quantity detected by the movement detecting means 42 is much because the read sensitivity by the ID reading unit 3 becomes low and hence, the reception intensity becomes relatively weak, and decides the threshold so that it is large in a case where the movement quantity is few because the read sensitivity of the ID reading unit 3 becomes high and hence, the reception intensity becomes relatively strong. By employing a measurement result of an experiment made by envisaging the situation in which the human body and the other non-human objects move actually within the detection area, the thresholds in respective cases, in which the movement is high or low, are set responding to the reception sensitivity of the RFID reader. For example, in a case of assuming that the human body is an object of detection in a certain conference room, it is possible to set the threshold (small value), which is employed when the movement is high, to 120, and the threshold (large value), which is employed when the movement is low, to 150, respectively.

The threshold processing means 442 performs a threshold process of the read result of the detection-object ID holding unit 1 responding to the threshold decided by the threshold deciding means 432. Herein, the so-called threshold process signified a process in which the object of detection has gone out of the detection area in a case where the reception intensity has not reached the threshold. For example, in a case where the threshold is 150, it is detected that the human and the matter each of which is an object of detection has gone out of the detection area when the reception intensity is less than 150.

The detection result indicating whether the detection-object ID holding unit 1 exists within the detection area, which has been processed by the threshold processing means 442, is output by means of the display.

In this example, deciding the threshold responding to the movement quantities of the human body and the other non-human objects within the detection area that can be detected by arranging the ID holding unit identical to the ID holding unit, which is attached to the object of detection, in the detection area makes it possible to stabilize the detection without being influenced by a complexity or a disorder of the radio wave environment due to a change in the utilization environment or the utilization method, and without deteriorating the sensitivity of the detection result.

Further, only arranging the ID holding unit identical to the ID holding unit, which is attached to the object of detection, in the detection area makes it possible to stabilize the detection without deteriorating the sensitivity of the detection result, whereby restrictions do not have to be put to the utilization environment or the utilization method of the conventional RFID system.

The other unit, which can be utilized as an ID holding unit and an ID reading unit in the example 2 of the present invention, is identical to that of the example 1, so its explanation is omitted.

Example 3

Next, an example 3 of the present invention will be explained by making a reference to the accompanied drawings. Such an example corresponds to the best mode for carrying out the first invention of the present invention.

As a general process for aiming at stabilizing the detection in the conventional RFID system, the average value computing process is employed of obtaining an average radio wave intensity value of the read result over a constant time (hereinafter, referred to as an average value computation time length) with respect to the history of the read result. In the average value computing process, making the average value computation time length longer enables the detection result by the ID reading unit to be stabilized. On the other hand, there is the problem that the longer the average value computation time length is made, the more the time responsiveness of the detection result deteriorates. Thereupon, this example aims at dynamically changing the average value computation time length, which is employed for the average value computing process, responding to the state of the detection area, thereby allowing the stability and the time responsiveness of the detection result to consist with each other.

Figure 13:
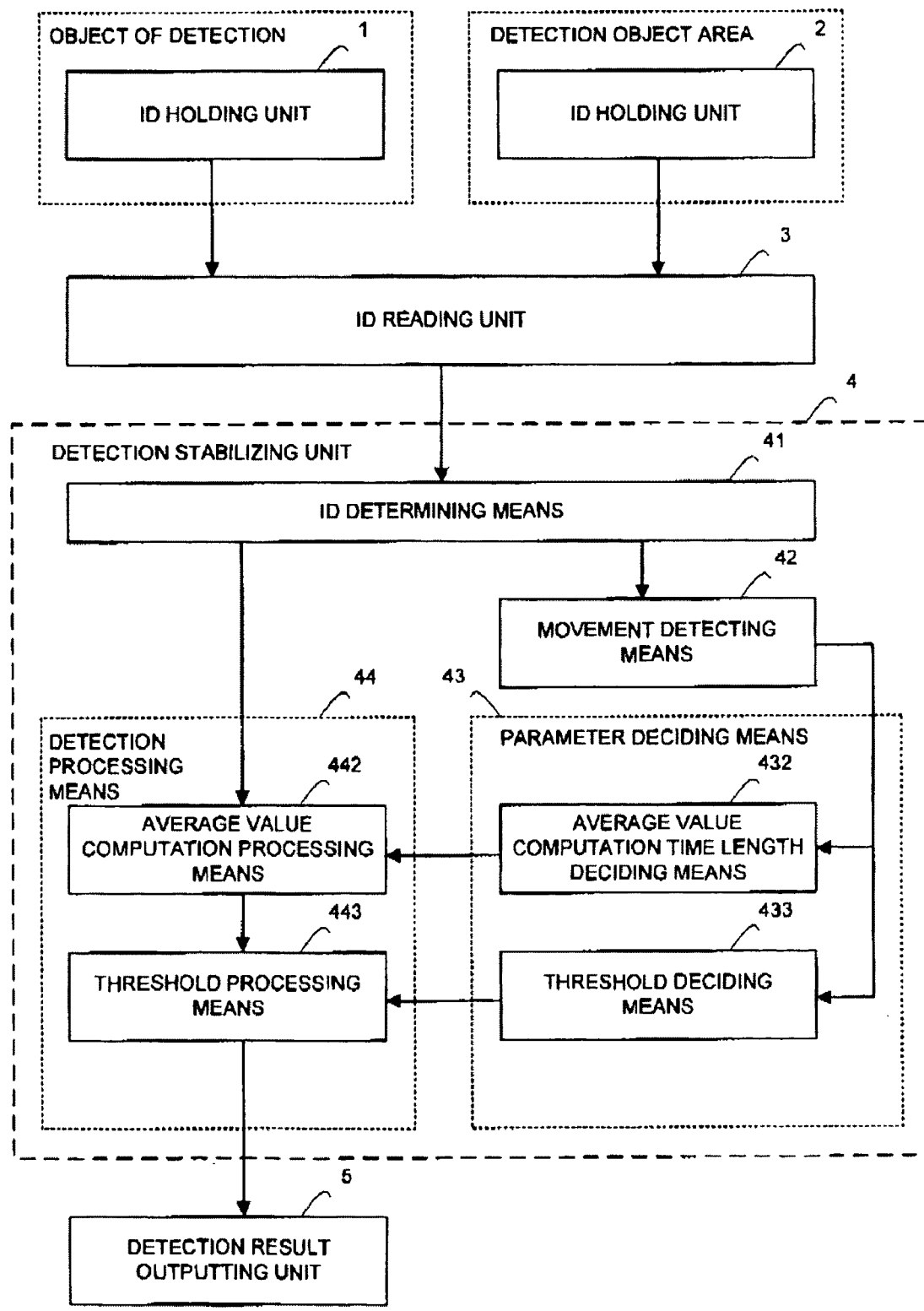
FIG. 13 is a block diagram illustrating a configuration of an example 3 of the present invention.

Upon making a reference to FIG. 13, this example differs in a point that a parameter deciding means 43 decides the average value computation time length, which is employed for the average value computing process, and the threshold, which is utilized for the threshold process, as a parameter, respectively, and delivers them to a detection processing means 44, and the detection processing means 44 receives the average value computation time length and the threshold decided by the parameter deciding means 43 as a parameter, and detects whether the detection-object ID holding unit 1 exists within the detection area as compared with the example 2 of the present invention.

The parameter deciding means 43, which includes an average value computation time length deciding means 433 for deciding an average value computation time length, which is employed for the average value computing process, and a threshold deciding means 432 for deciding a threshold, which is utilized for the threshold process, from the movement quantity received from the movement detecting means 42, respectively, delivers the average value computation time length and the threshold as a parameter to the detection processing means 44.

The detection processing means 44, which includes an average value computation processing means 443 and a threshold processing means 442 for performing an average value computing process and a threshold process of the read result of the detection-object ID holding unit 1 by employing the average value computation time length and the threshold received from the parameter deciding means 43, and detecting whether the detection-object ID holding unit 1 exists within the detection area, respectively, delivers a detection result to the detection result outputting unit 5.

An operation of a threshold deciding means 432 and the threshold processing means 442 in this example is identical to that of means 432 and 442 of the example 2, respectively, so its explanation is omitted.

The average value computation time length deciding means 433 decides the average value computation time length so that it is lengthy in a case where the movement quantity detected by the movement detecting means 42 is much because the possibility that the human body and the other non-human objects each of which is an object of detection frequent the detection area is high, and decides the average value computation time length so that it is short in a case where the movement quantity is less because the possibility that the human body and the other non-human objects each of which is an object of detection frequent the detection area is low. By employing a measurement result of an experiment made by envisaging the situation in which the human body and the other non-human objects move actually within the detection area, the average value computation time lengths in respective cases, in which the movement is high or low, are set responding to the period at which a signal of the RFID tag is originated, or the reception sensitivity by the RFID reader. For example, in a case of assuming that the human body is an object of detection in a certain conference room, it is possible to set the average value computation time length (short value), which is employed when the movement is high, to 3 seconds, and the average value computation time length (lengthy value), which is employed when the movement is low, to 10 seconds, respectively.

The average value computation processing means 443 performs an average value computing process of the history of the read result of the detection-object ID holding unit 1 responding to the average value computation time length decided by the average value computation time length deciding means 433. Herein, the so-called average value computing process signifies a process of, with respect to the history of the read result of the detection-object ID holding unit 1 by the ID reading unit 3, calculating an average reception intensity value thereof. For example, in a case where the average value computation time length is 10 seconds, the very average reception intensity value over the latest 10-second portion of the history of the read result of the ID holding unit for an object of detection by the ID reading unit 3 is defined to be a current reception intensity of the read result. The reception intensity processed by the average value computation processing means 443 becomes an object of a process by the threshold processing means 442.

In this example, in addition to the effect of the example 2 of the present invention, deciding the average value computation time length responding to the movement quantities of the human and the matter within the detection area that can be detected from the read result of the ID holding unit arranged within the detection area makes it possible to stabilize the detection without being influenced by a complexity or a disorder of the radio wave environment due to a fluctuation in the utilization environment or the utilization method, and without deteriorating the time responsiveness of the detection result.

The other unit, which can be utilized as an ID holding unit and an ID reading unit in the example 3 of the present invention, is identical to that of the example 1, so its explanation is omitted.

Example 4

Next, an example 4 of the present invention will be explained by making a reference to the accompanied drawings. Such an example corresponds to the best mode for carrying out the first invention of the present invention.

Figure 14:
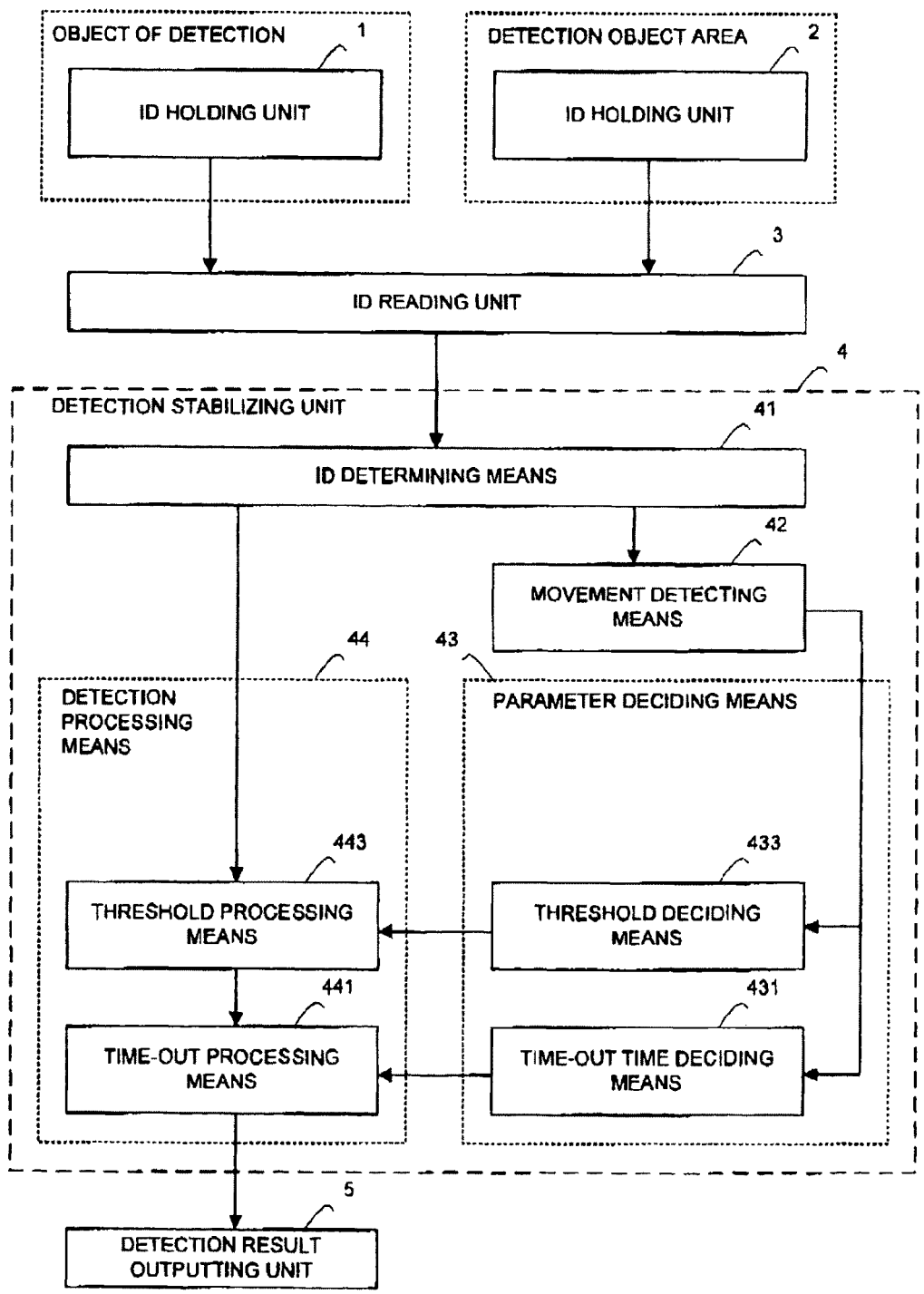
FIG. 14 is a block diagram illustrating a configuration of an example 4 of the present invention.

Upon making a reference to FIG. 14, this example differs in a point that a parameter deciding means 43 decides the threshold, which is employed for the threshold process, and the time-out time, which is employed for the time-out process, as a parameter, respectively, and delivers them to a detection processing means 44, and the detection processing means 44 receives the threshold and the time-out time decided by the parameter deciding means 43 as a parameter, and detects whether the detection-object ID holding unit 1 exists within the detection area as compared with the example 1 of the present invention.

The parameter deciding means 43, which includes a threshold deciding means 432 for deciding the threshold, which is utilized for the threshold process, and a time-out time deciding means 431 for deciding the time-out time, which is utilized for the time-out process, from the movement quantity received from the movement detecting means 42, respectively, delivers the threshold and the time-out time as a parameter to the detection processing means 44.

The detection processing means 44, which includes a threshold processing means 442 and a time-out processing means 441 for performing a threshold process and a time-out process of the read result of the detection-object ID holding unit 1 by employing the threshold and the time-out time received from the parameter deciding means 43, and detecting whether the detection-object ID holding unit 1 exists within the detection area, respectively, delivers a detection result to the detection result outputting unit 5.

An operation of the time-out time deciding means 431 and the time-out processing means 441 in this example is identical to that of means 431 and 441 of the example 1 of the present invention, respectively, and an operation of the threshold deciding means 432 and the threshold processing means 442 in this example is identical to that of means 432 and 442 of the example 3 of the present invention, respectively, so its explanation is omitted.

A detection result processed by threshold processing means 442 becomes an object of a process by the time-out processing means 441.

This example has an effect similar to that of the example 1, the example 2, and the example 3 of the present invention.

Example 5

Next, an example 5 of the present invention will be explained by making a reference to the accompanied drawings. Such an example corresponds to the best mode for carrying out the first invention of the present invention.

Figure 15:
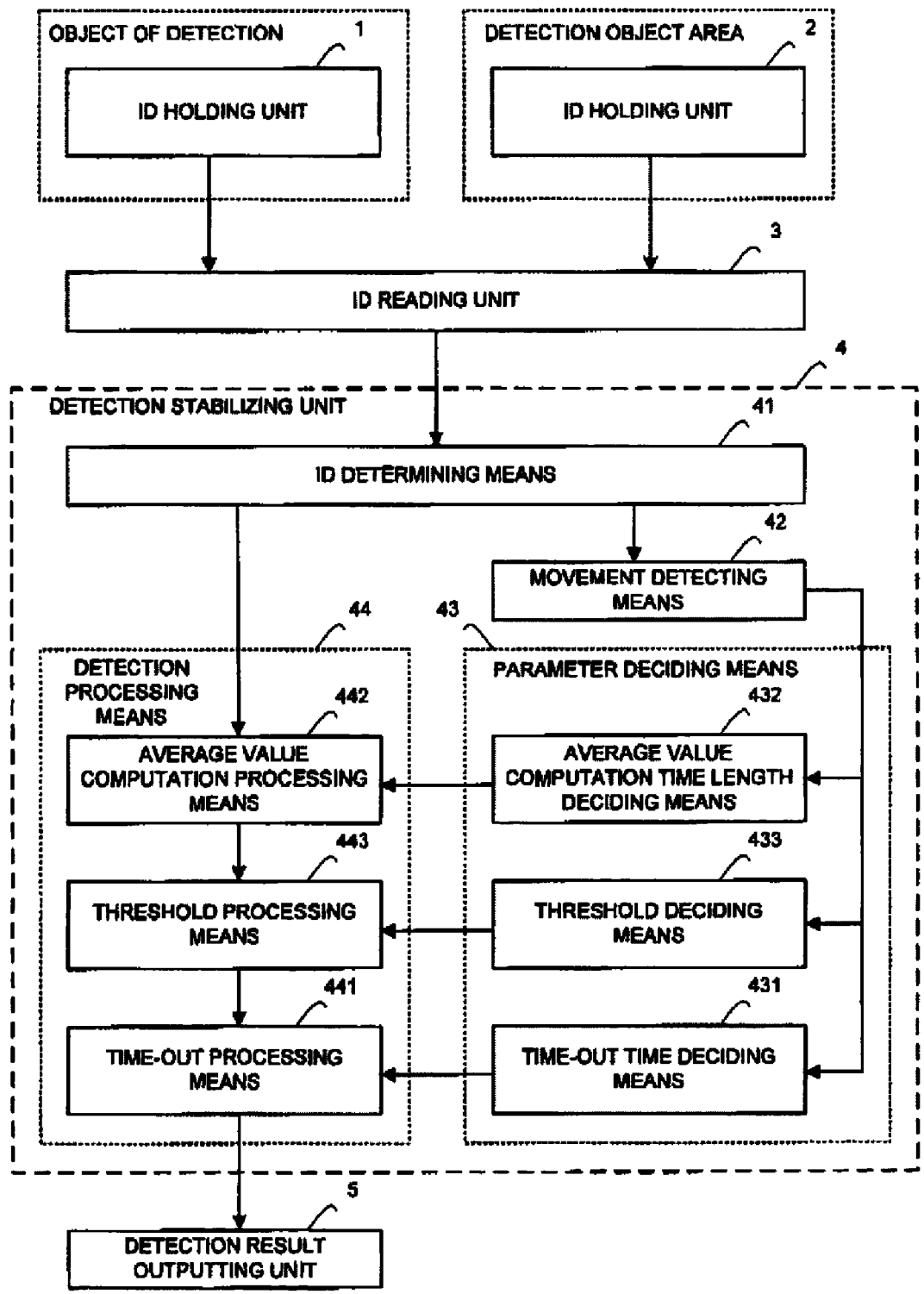
FIG. 15 is a block diagram illustrating a configuration of an example 5 of the present invention.

Upon making a reference to FIG. 15, this example differs in a point that a parameter deciding means 43 decides the average value computation time length, which is utilized for the average value computing process, the threshold, which is utilized for the threshold process, the time-out time, which is utilized for the time-out process, as a parameter, respectively, and delivers them to a detection processing means 44, and the detection processing means 44 receives the average value computation time length, the threshold, and the time-out time decided by the parameter deciding means 43 as a parameter, and detects whether the detection-object ID holding unit 1 exists within the detection area as compared with the example 1 of the present invention.

The parameter deciding means 43, which includes a average value computation time length deciding means 433 for deciding the average value computation time length, which is utilized for the average value computing process, a threshold deciding means 432 for deciding the threshold, which is utilized for the threshold process, and a time-out time deciding means 431 for deciding the time-out time, which is utilized for the time-out process, from the movement quantity received from the movement detecting means 42, respectively, delivers the average value computation time length, the threshold, and the time-out time as a parameter to the detection processing means 44.

The detection processing means 44, which includes an average value computation processing means 443, a threshold processing means 442, a time-out processing means 441 for performing an average value computing process, a threshold process, and a time-out process of the read result of the detection-object ID holding unit 1 by employing the average value computation time length, the threshold, and the time-out time received from the parameter deciding means 43, and detecting whether the detection-object ID holding unit 1 exists within the detection area, respectively, delivers a detection result to the detection result outputting unit 5.

An operation of the time-out time deciding means 431, the time-out processing means 441, the threshold deciding means 432, and the threshold processing means 442 in this example is identical to that of means 431, 441, 432, and 442 of the example 4 of the present invention, respectively, and an operation of the average value computation time length deciding means 433 and the average value computation processing means 443 in this example is identical to that of means 433 and 443 of the example 3 of the present invention, respectively, so its explanation is omitted. The reception intensity processed by the average value computation processing means 443 becomes an object of a process by the threshold processing means 442.

This example has an effect similar to that of the example 3, and the example 4 of the present invention.

Example 6

Next, an example 6 of the present invention will be explained by making a reference to the accompanied drawings. Such an example corresponds to the best mode for carrying out the second invention of the present invention.

Figure 21:
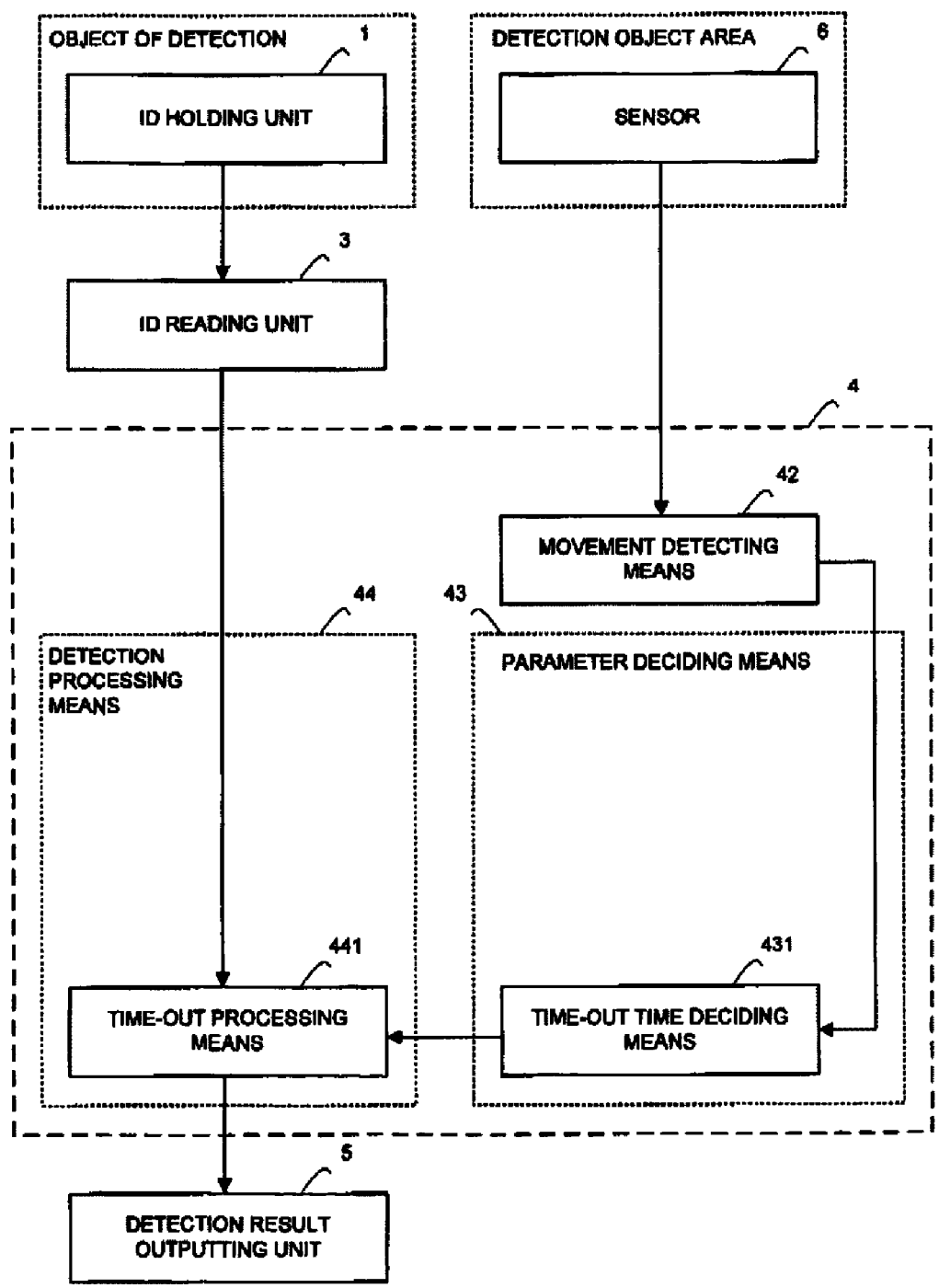
FIG. 21 is a block diagram illustrating a configuration of the example 6 of the present invention.

In the example 6, as shown in FIG. 21, an example will be explained in which a sensor 6 is arranged within the detection area instead of the detection-area ID holding unit 2, and the ID determining means 41 of the foregoing example 1, and a movement detecting means 45 detects the movement quantities of the human body and the other non-human objects from information that is obtained by the sensor. Additionally, explanation of the portion similar to the example 1 is omitted.

As a sensor, the sensor capable of detecting the movement quantities of the human body and the other non-human objects, for example, a camera arranged in the detection area, a non-visible light (infrared-rays, heat infrared-rays, etc.) sensor, a floor pressure sensor, a vibration sensor, and a microphone can be utilized. For example, by arranging such an accelerometer that measures acceleration applied to a sensor body 50 times for one second and outputs it as a voltage in the floor of the detection area, which is utilized as a vibration sensor, it is possible to detect the movement of the human body and the other non-human objects within the detection area.

Figure 11:
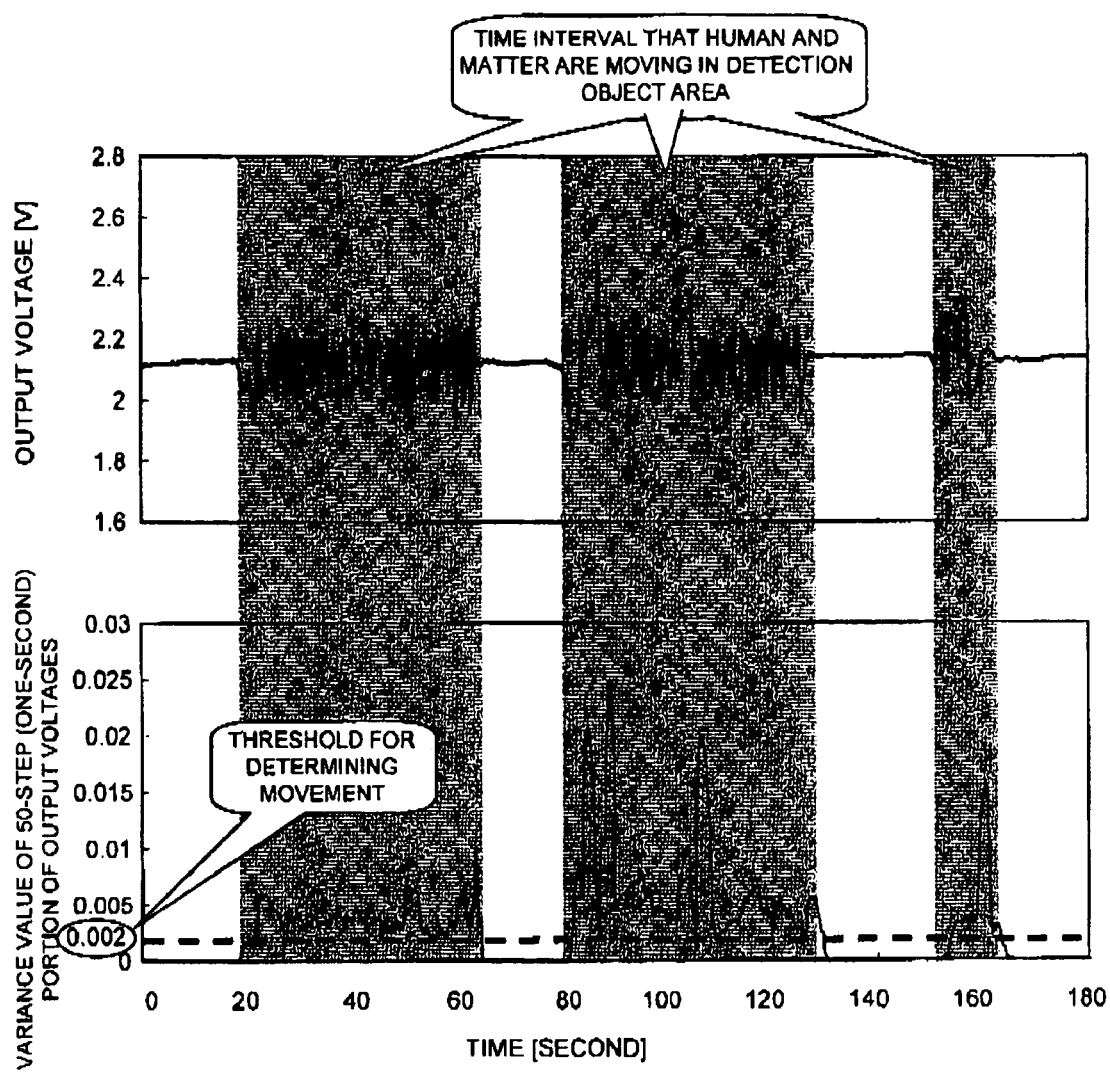
FIG. 11 is a graph illustrating a method of detecting the movement employing a sensor in the example 1 of the present invention.

An example of a time series variation in the voltage measured by the accelerometer arranged in the floor of the detection area is shown in the upper side of in FIG. 11. With respect to the identical measurement data, a time series variation in the variance value that is calculated from the past 50-step portion (one-second portion) of the measurement voltages at respective time points is shown in the lower side of FIG. 11. In such a manner, the movement detecting means 45 can clearly detect the movement of the human body and the other non-human objects within the detection area by determining a fluctuation in the measured voltage, which is generated at a time zone that the human and the matter are moving within the detection area, from the time series variation in the variance value shown in the lower-side graph.

The time-out time deciding means 431 sets 0.002 to the threshold for determining whether the movement quantity is much or few with respect to the variance value of the past 50-step portion of the measured voltages, for example, in a case of the example shown in FIG. 11, thereby, making it possible to detect the movement of the human body and the other non-human objects within the detection area, and with this threshold, the time-out time can be decided similarly to the foregoing example 1. As a method of deciding the threshold, for example, the method can be employed of performing interior division of the average value over one minute of the foregoing measured voltage variance values in the case that the human body and the other non-human objects have not moved within the detection area at all, and the average value over one minute of the foregoing measured voltage variance values in the case that the human body and the other non-human objects are moving by a one-to-one ratio.

In this example, arranging the sensor for detecting the movement of the human body and the other non-human objects within the detection area in the detection area and deciding the time-out time responding to the movement quantities of the human body and the other non-human objects within the detection area make it possible to stabilize the detection without being influenced by a complexity or a disorder of the radio wave environment due to a change in the utilization environment or the utilization method, and without deteriorating the time responsiveness of the detection result.

Additionally, the detection stabilizing process is not limited to the time-out process similar to that of the example 1, and the processes described in other examples also are applicable.

Example 7

Next, an example 7 of the present invention will be explained by making a reference to the accompanied drawings.

This example aims at switching the detection stabilizing process, which is performed by the detection processing means 44 in the example 1 to the example 6 of the present invention, responding to the service level set for each object of detection and for each user (hereinafter, referred to as an observer).

Figure 16:
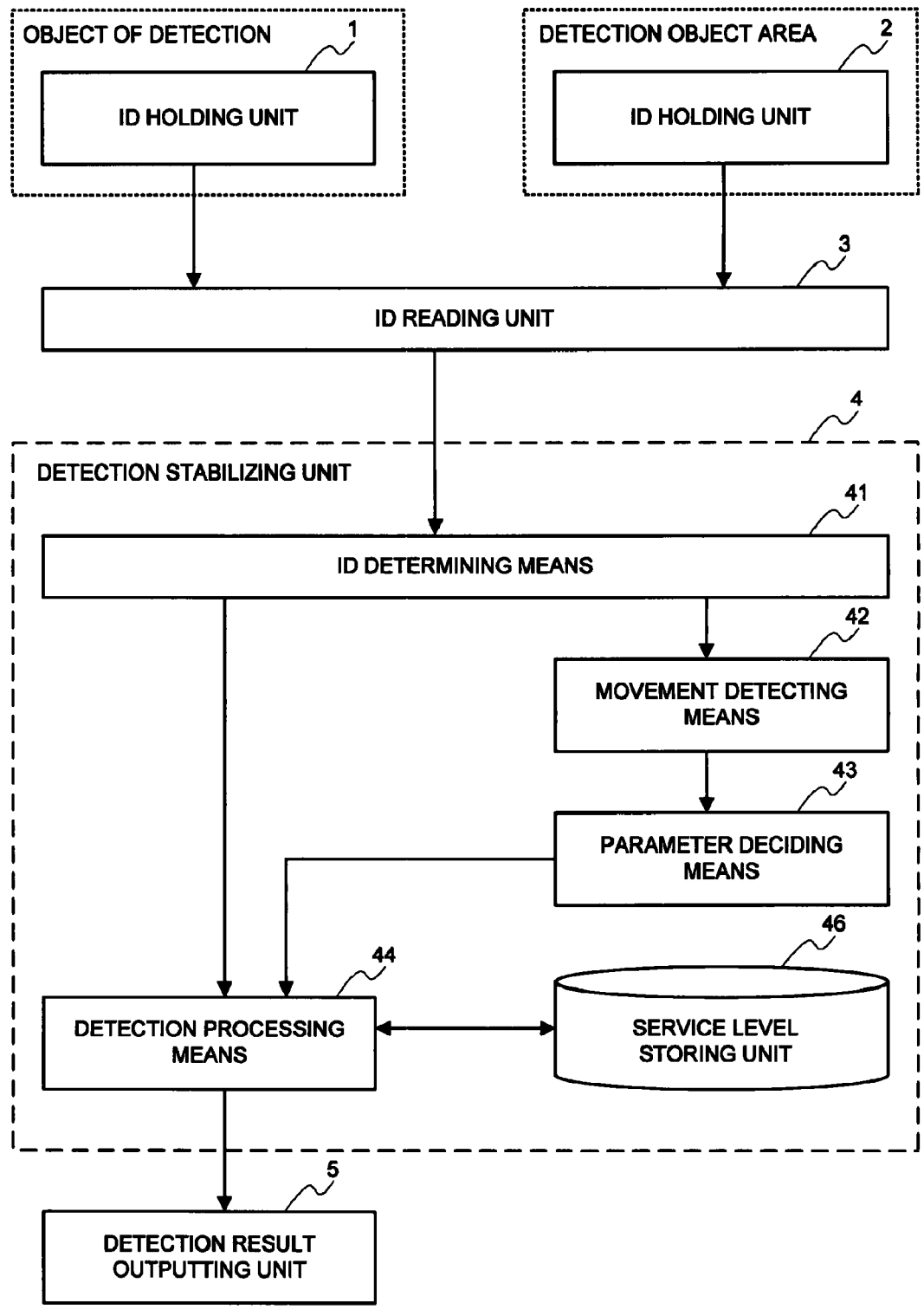
FIG. 16 is a block diagram illustrating a configuration of an example 7 of the present invention.

Upon making a reference to FIG. 16, this example differs in a point that a detection stabilizing unit 4 includes a service level storage unit 46 for preserving the service levels by each object of detection and by each observer as compared with the example 1 to the example 6 of the present invention.

Service level information that is preserved in the service level storing unit 46 is expressed with a set of the ID (that is, the ID that the detection-object ID holding unit 1 has) for specifying the object of detection, the ID for specifying the observer, and the service level.

Changing the content of the detection stabilizing process that is performed by the detection processing means 44 for the read result of the detection-object ID holding unit 1 by the ID reading unit 3 responding to the service level makes it possible to provide the detection result of which the stability and the time responsiveness differs for each object of detection and for each observer. For example, the service level is expressed with two stages of "high precision" and "normal". In a case where the service level is "high precision", the detection result stabilized by employing the movement detecting means 42, the parameter deciding means 43, and the detection processing means 44 as explained in the example 1 to the example 5 is provided to the observer by the detection result outputting unit 5. In a case where the service level is "normal", the read result of the detection-object ID holding unit 1 by the ID reading unit 3, for which no detection stabilizing process is performed at all by the detection processing means 44, is provided as a detection result to the observer by the detection result outputting unit 5 as it stands.

Figure 17:
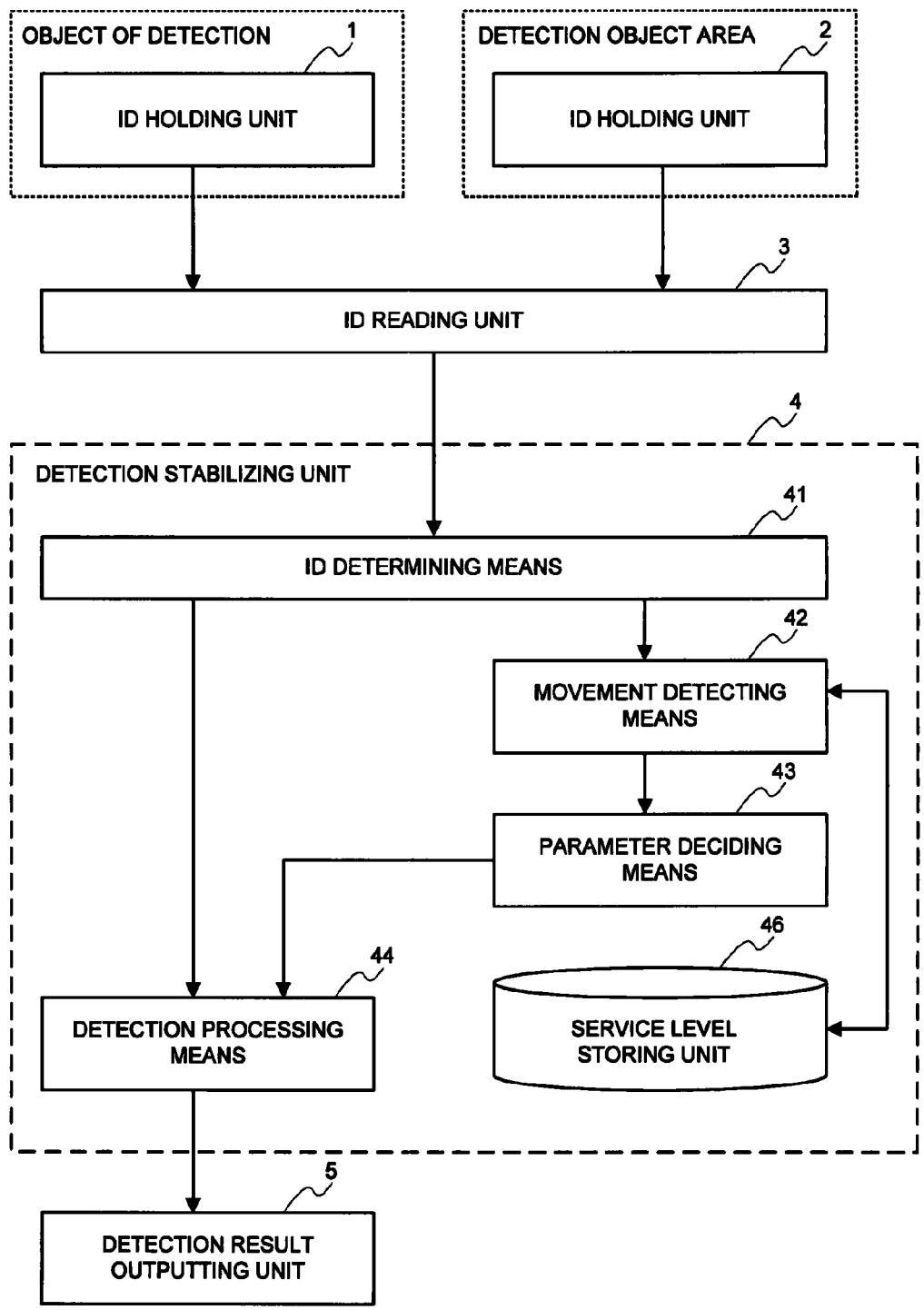
FIG. 17 is a block diagram illustrating another configuration of the example 7 of the present invention.

Further, as shown in FIG. 17, changing a combination of the detection-area ID holding units 2, which are used for detecting the movement in the movement detecting means 42, responding to the service level preserved in the service level storing unit 46 makes it possible to change the movement detection precision for each object of detection and for each observer, and to provide the detection result of which the stability or the time responsiveness differs for each object of detection and for each observer.

Figure 18:
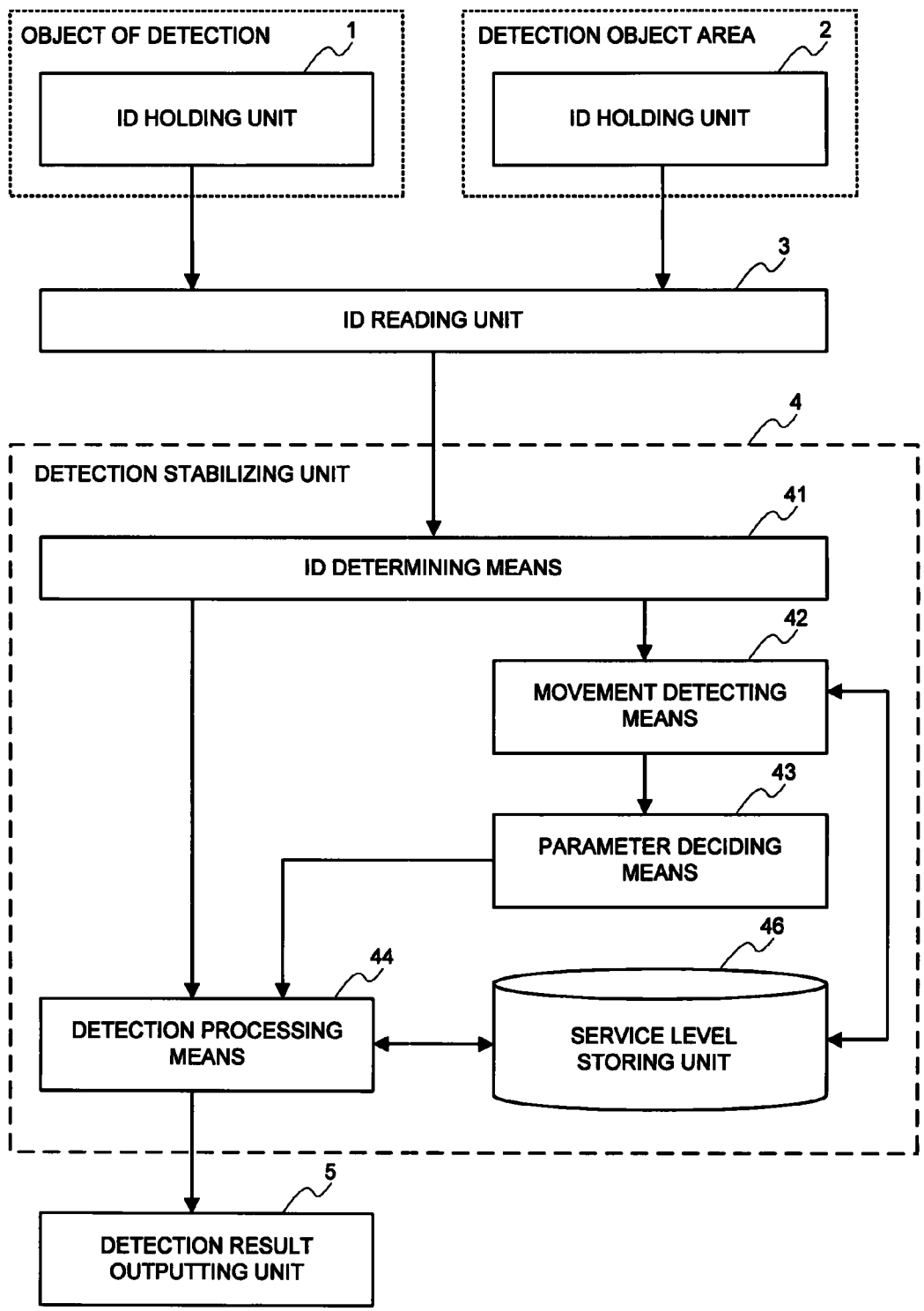
FIG. 18 is a block diagram illustrating another configuration of the example 7 of the present invention.

Further, as shown in FIG. 18, Changing both of the content of the detection stabilizing process, which is performed by the detection processing means 44 for the read result of the detection-object ID holding unit 1 by the ID reading unit 3, and the combination of the detection-area ID holding units 2, which are used for detecting the movement in the movement detecting means 42, responding to the service level preserved in the service level storing unit 46 makes it possible to provide the detection result of which the stability or the time responsiveness differs for each object of detection and for each observer.

Figure 19:
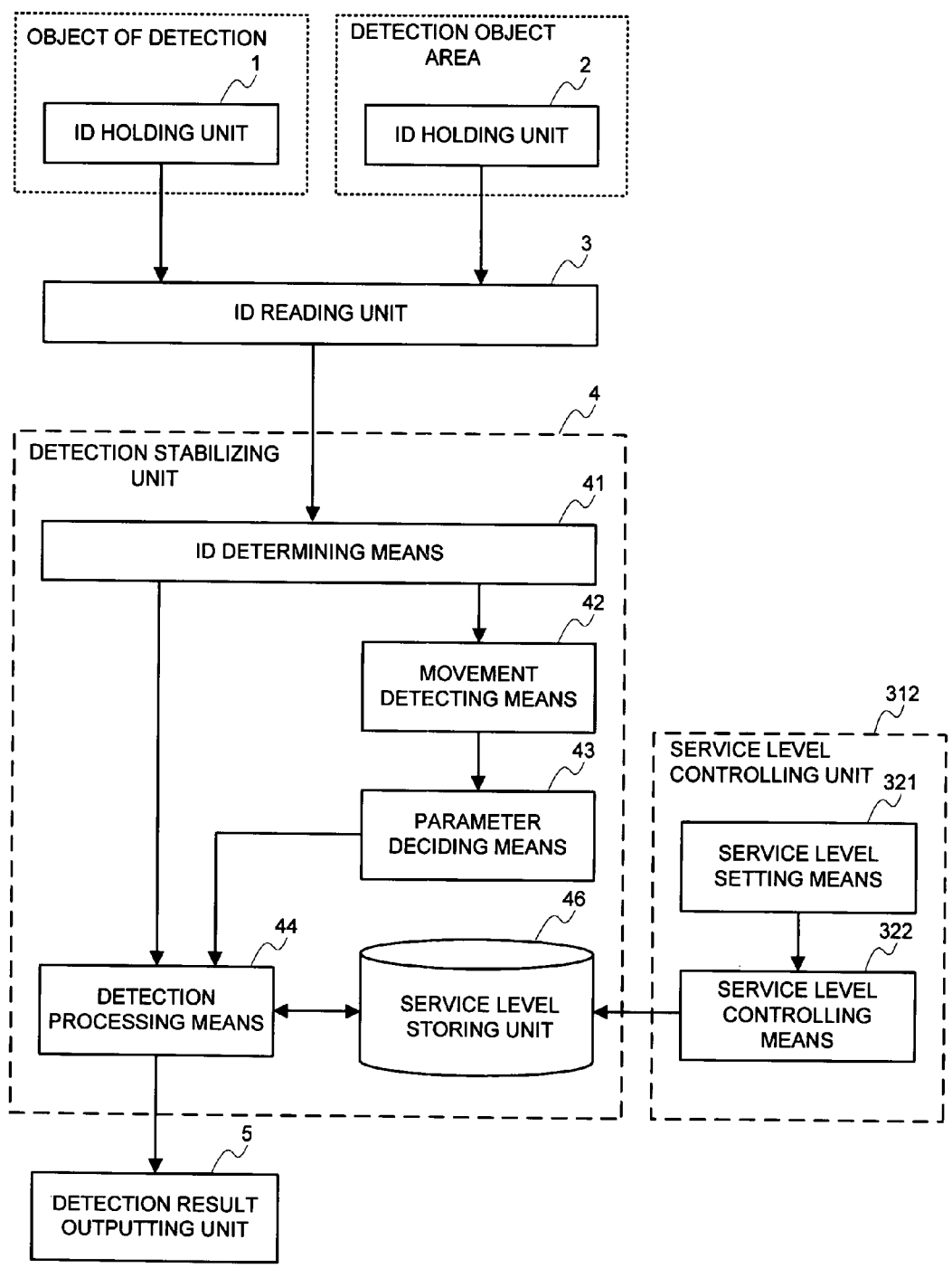
FIG. 19 is a block diagram illustrating another configuration of the example 7 of the present invention.

Further, as shown in FIG. 19, this example may include a service level controlling unit 312 for controlling the service levels by each object of detection and by each observer. The service level controlling unit 312 includes a service level setting means 321 and a service level controlling means 322.

The service level setting means 321 sets the service levels by each object of detection and by each observer.

The service level controlling means 322 preserves the service levels set by the service level setting means 321 in the service level storing unit 46.

Figure 20:
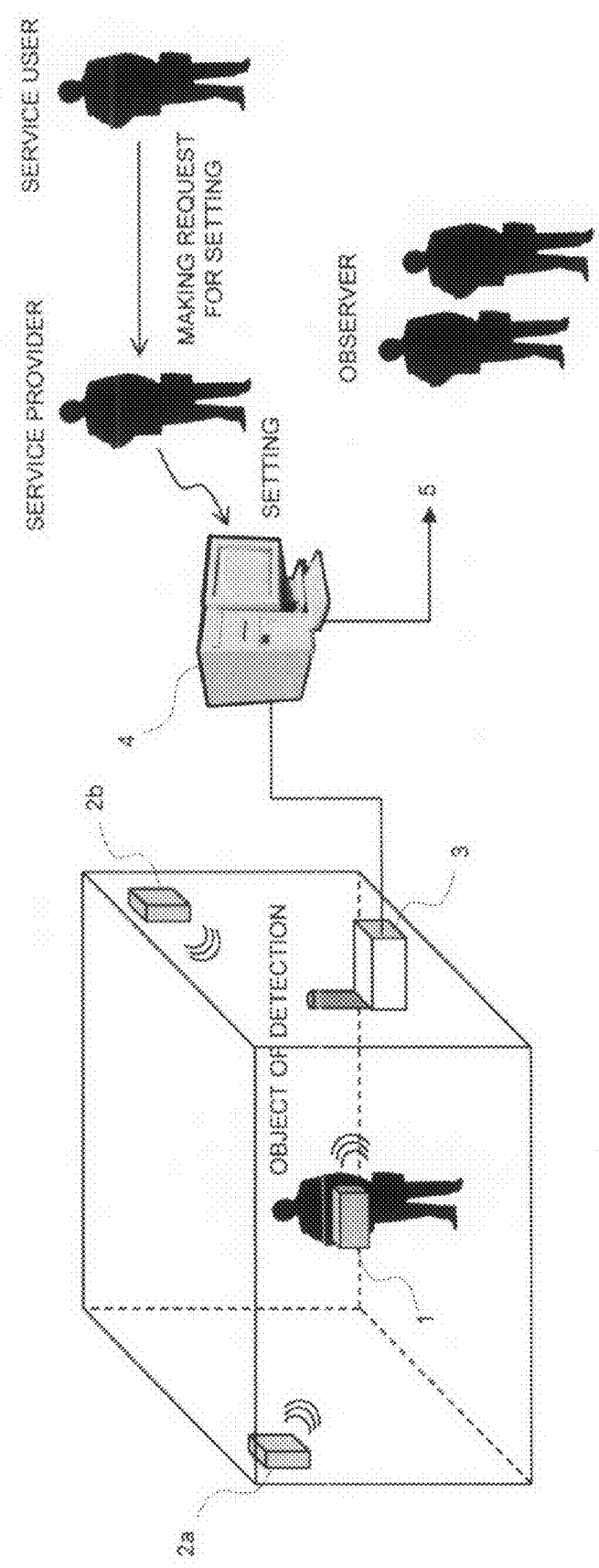
FIG. 20 is a view illustrating an outline of the service utilizing the example 7 of the present invention.

With this example, application to the service etc. to which the detection result of which the precision differs for each object of detection should be provided becomes possible. An example will be explained in which, as shown in FIG. 20, a service provider that provides the detection stabilization service with the entirety of this example taken as a detection stabilization service, a service user that utilizes the detection stabilization service, an object of detection, and an observer that receives the detection result exist.

The service user (for example, an enterprise) requests the service provider (for example, an ASP service providing enterprise) to set the service levels by each object of detection (for example, an employee) and by each observer (for example, a manager). Herein, an example will be explained in which the service level is expressed with two stages of "high precision" and "normal".

The service user makes a request for setting the service levels responding to each object of detection and a job rank or a job type of each observer. The service provider sets the service levels by each object of detection and by each observer responding to a request by employing the service level setting means. The set service levels are preserved in the service level storing unit. The service provider charges the service user responding to the content of the process by the detection stabilizing unit, that is, responding to the service level being "high precision" or "normal".

The stability or the time responsiveness of the detection result, which is provided object of detection by object of detection and observer by observer, differs responding to the service level requested by the service user and set by the service provider.

With this, the detection result stabilization service, which makes it possible to provide the detection result of which the quality differs for each object of detection and for each observer in a manner that the user can use it at an optimum cost, can be realized.

In accordance with this example, the content of the process by the detection stabilizing unit is changed responding to the service level, thereby making it possible to provide the detection result of which the stability or the time responsiveness differs for each object of detection and for each observer.

Example 8

Next, an example 8 of the present invention will be explained by making a reference to the accompanied drawings. Such an example 8 corresponds to the best mode for carrying out the fifth invention of the present invention.

Figure 29:
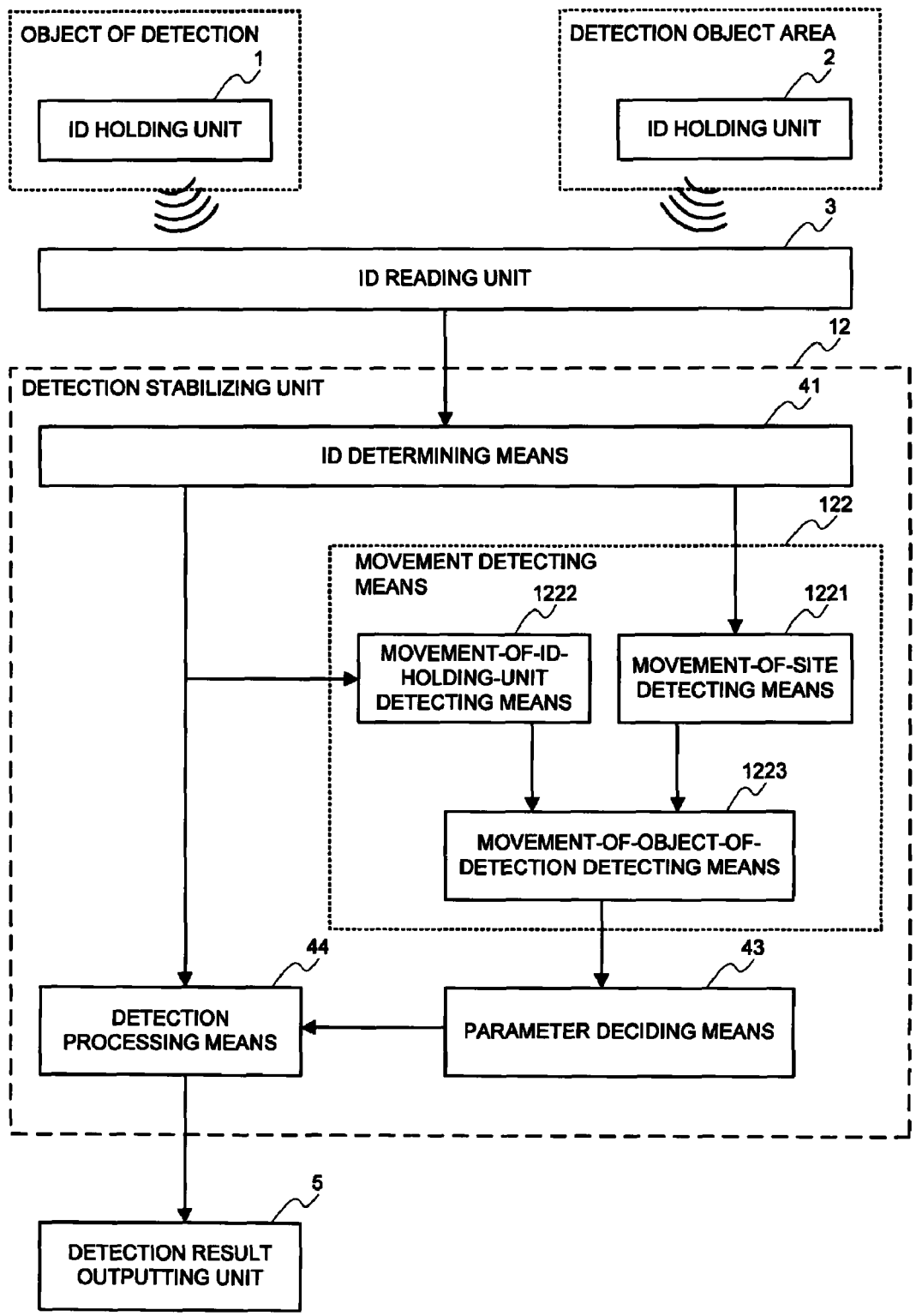
FIG. 29 is a block diagram illustrating a configuration of an example 8 of the present invention.

Upon making a reference to FIG. 29, this example differs in a point that a detection stabilizing unit 12 includes a movement detecting means 122 for detecting the movement quantity of the object of detection from the read results of the detection-object ID holding unit 1 and the detection-area ID holding unit 2 instead of the movement detecting means 42 in the configuration of the detection stabilizing unit 4 in the example 1 to the example 7 as compared with the example 1 to the example 7 of the present invention.

The movement detecting means 122 in this example includes a movement-of-site detecting means 1221 for detecting the movement quantities (hereinafter, referred to as a movement of the site) of the human and the matter within the detection area from the read result of the detection-area ID holding unit 2 similarly to the movement detecting means 42 in the example 1, a movement-of-ID-holding-unit detecting means 1222 for, from the read result of the detection-object ID holding unit 1, detecting the movement of the corresponding detection-object ID holding unit 1, and a movement-of-object-of-detection detecting means 1223 for detecting the movement quantity of the object of detection by combining the movement of the site detected by the movement-of-site detecting means 1221, and the movement of the detection-object ID holding unit 1 detected by the movement-of-ID-holding-unit detecting means 1222.

An operation of the movement-of-site detecting means 1221 in this example is identical to that of the movement detecting means 42 of the example 1 of the present invention, so its explanation is omitted.

A fluctuation in the reception intensity due to the movement of the detection-object ID holding unit 1 is included in the history of the result obtained by reading the detection-object ID holding unit 1 with the ID reading unit 3. Making a reference to FIG. 30, the movement-of-ID-holding-unit detecting means 1222 is configured of a history storing means 12221 for preserving the read result of the detection-object ID holding unit 1 as a history by making up one set of the time, the read-off ID of the ID holding unit, and the reception intensity, a history extracting means 12222 for extracting the latest constant-time portion (for example, the latest five-second portion) from the history of the read result of the detection-object ID holding unit 1 that is preserved by the history storing means 12221, and a variance value computing means 12223 for calculating a variance value with the electric field strength values in the history extracted by the history extracting means 12222 regarded as a numerical value row.

Figure 30:
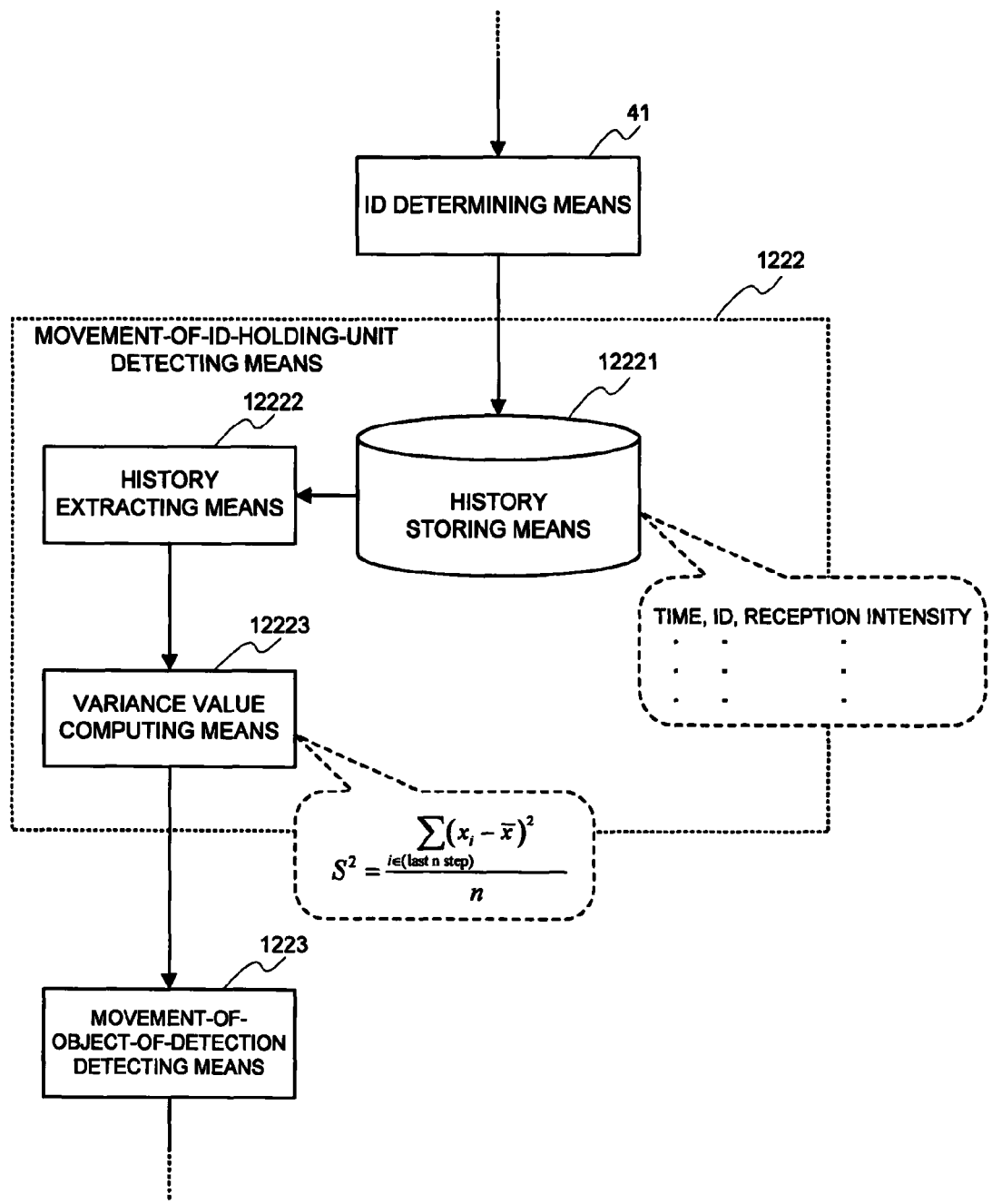
FIG. 30 is a block diagram illustrating a configuration of a means for detecting the movement of the ID holding unit in the example 8 of the present invention.

As apparent from a computation equation shown in FIG. 30, the variance value of the electric field intensity values is obtained by computing the average of the square of difference values, which are obtained by subtracting an average value of the electric field intensity values in all steps from the extracted electric field intensity value in each step of the history. The variance value calculated by the variance value computing means 12223 signifies a degree of the fluctuation in the extracted reception intensity over a constant time in the history, whereby this very variance value is defined to be a value indicating the movement quantity of the detection-object ID holding unit 1.

Figure 31:
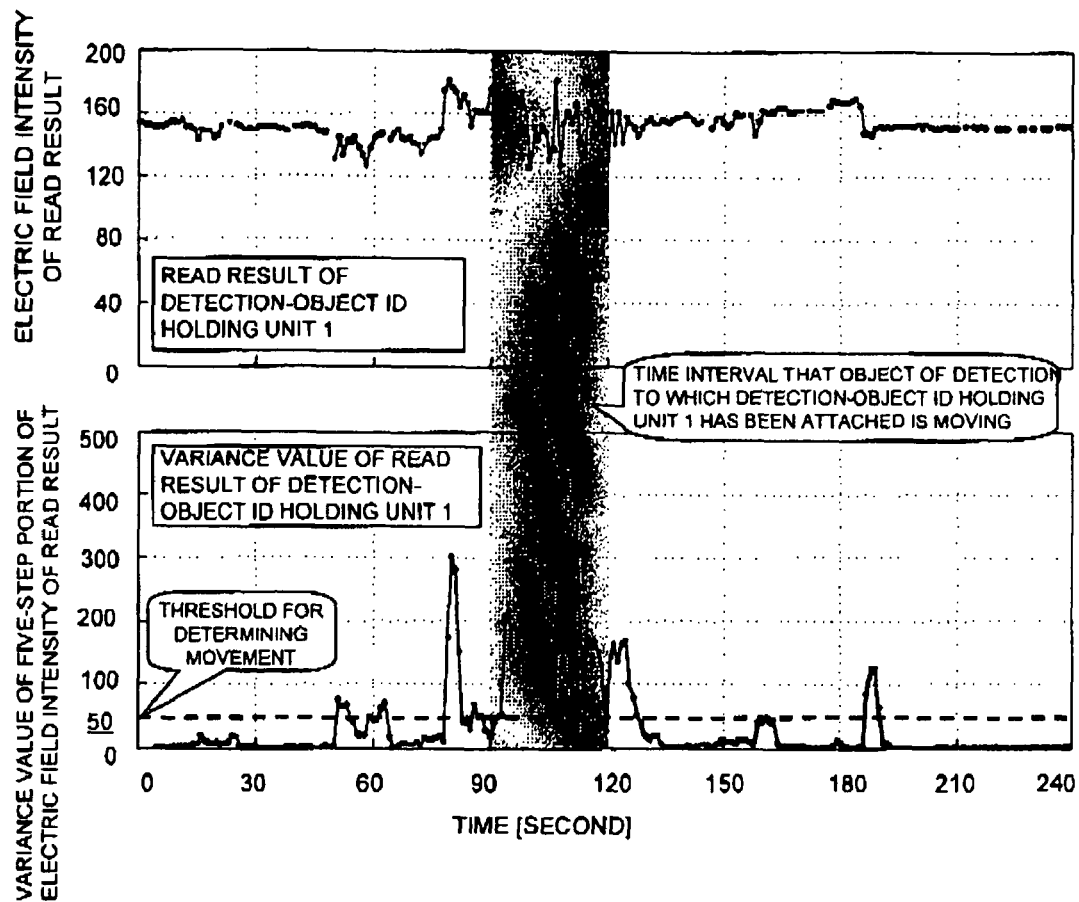
FIG. 31 is a graph illustrating a method of detecting the movement of the ID holding unit in the example 8 of the present invention.

For example, upon making a reference to FIG. 31, with the variance value of the electric field intensity of the read result over a constant time (the case of five seconds was shown in FIG. 31) computed by the variance value computing means 12223, shown in the lower-side graph, the fluctuation in the reception intensity in a time zone that the object of detection to which the corresponding detection-object ID holding unit 1 has been attached is moving, which can be viewed in the read result of the detection-object ID holding unit 1 shown in the upper-side graph, can be clearly determined. With the case of the example shown in FIG. 31, setting 50 as a threshold for determining whether the movement quantity is much or few makes it possible to detect the movement of the detection-object ID holding unit 1. As a method of deciding the threshold, the method can be employed of performing interior division of the average value over five seconds of the foregoing electric field intensity variance values in the case that the detection-object ID holding unit 1 has not moved at all, and the average value over one minute of the foregoing electric field intensity variance values in the case that the detection-object ID holding unit 1 is moving by a one-to-one ratio.

Figure 32:
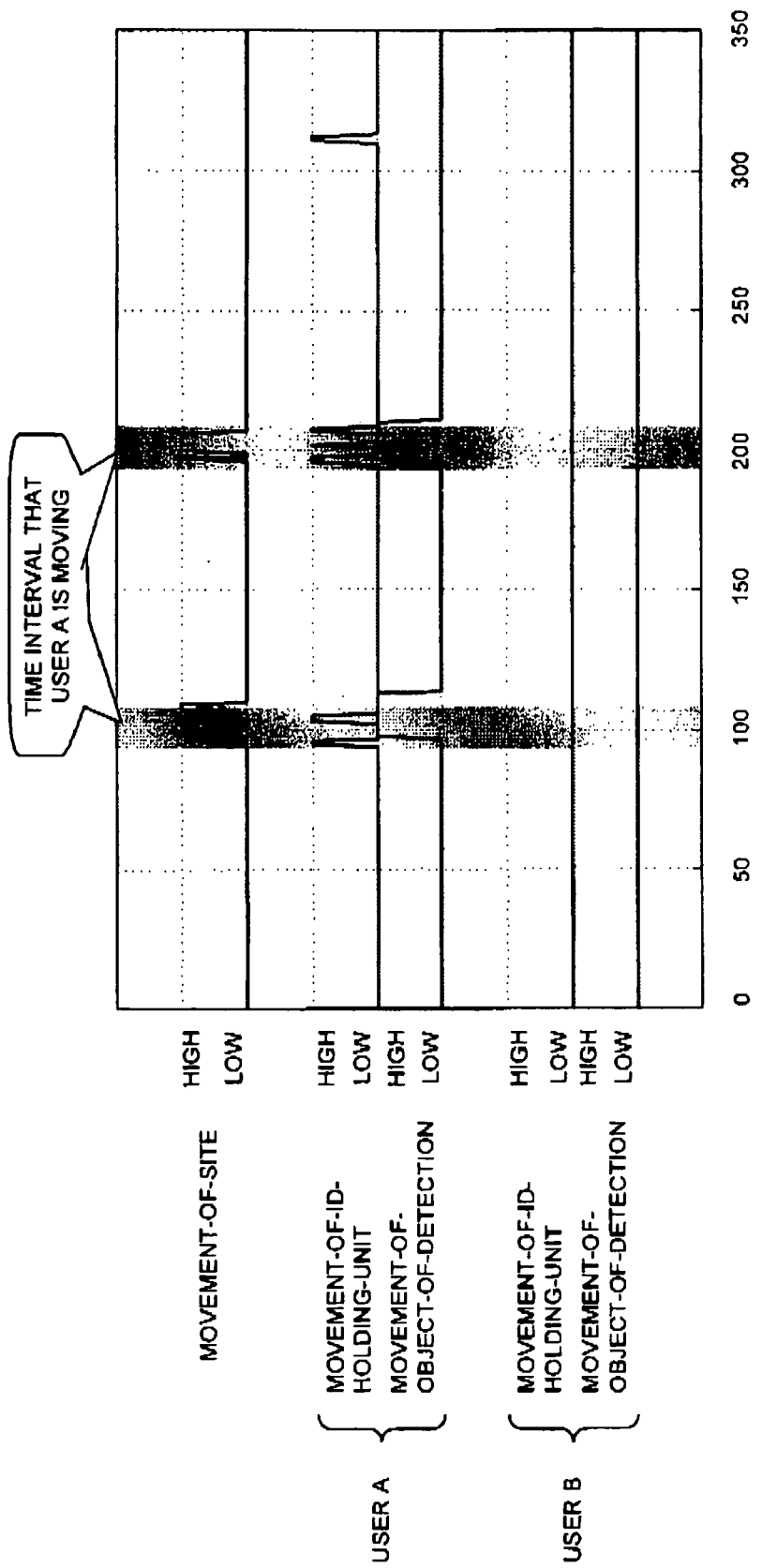
FIG. 32 is a graph illustrating a method of detecting the movement of the object of detection in the example 8 of the present invention.

The movement-of-object-of-detection detecting means 1223 determines that the movement of the object of detection is much only in a case where both of the movement of the site detected by the movement-of-site detecting means 1221 and the movement of the detection-object ID holding unit 1 detected by the movement-of-ID-holding-unit detecting means 1222 are much, and detects the movement of the object of detection to which the corresponding detection-object ID holding unit 1 has been attached. For example, the movement at the time that two humans (user A and user B) exist in the identical detection area and only the user A has actually moved within the detection area, which has been detected by the movement-of-site detecting means 1221, the movement-of-ID-holding-unit detecting means 1222, and the movement-of-object-of-detection detecting means 1223, is shown in FIG. 32. In this example, after each of the movement-of-site detecting means 1221 and the movement-of-ID-holding-unit detecting means 1222 performed a five-second time-out process, it performed a movement detecting process of the object of detection. Combining the movement of the site and the movement of the ID holding unit as shown in FIG. 32 makes it possible to correctly detect the movement of the object of detection.

In this example, even in a case where a plurality of the humans and the matter exist in the detection area, detecting the movement of the object of detection and deciding an appropriate parameter make it possible to realize an effect similar to that of the example 1 to the example 7.

Example 9

Next, an example 9 of the present invention will be explained by making a reference to the accompanied drawings. Such an example 9 corresponds to the best mode for carrying out the sixth invention of the present invention.

Figure 33:
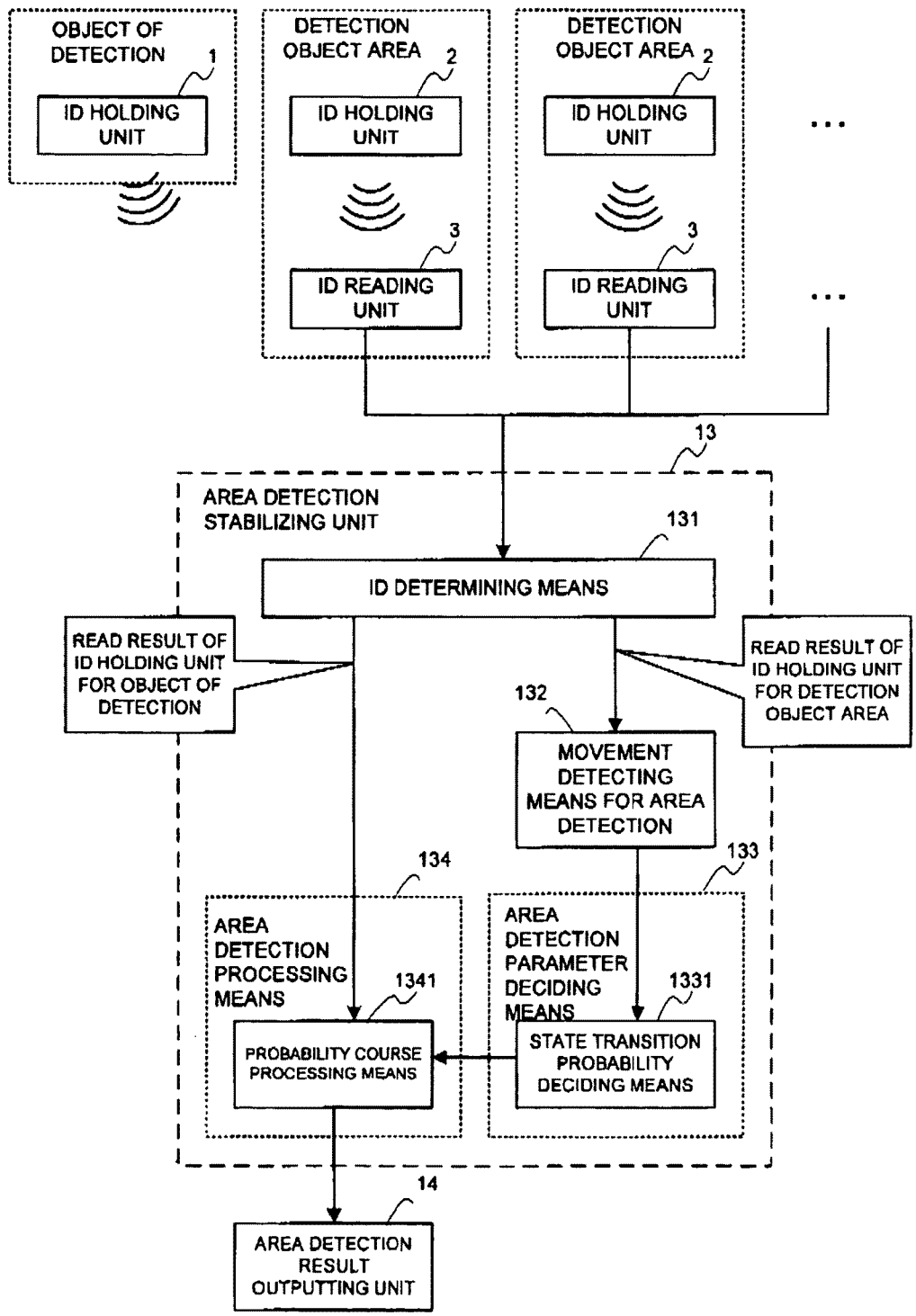
FIG. 33 is a block diagram illustrating a configuration of an example 9 of the present invention.

Upon making a reference to FIG. 33, this example differs in a point that a plurality of the detection areas exist, and the detection-area ID holding unit 2 and the ID reading units 3 are arranged singularly or in plural in each detection area, respectively, and in a point of including an area detection stabilizing unit 13 for detecting the area in which the object of detection exists by employing the read results of the detection-object ID holding unit 1 obtained by the ID reading unit 3 arranged in each detection area and the detection-area ID holding unit 2 arranged in each detection area, and an area detection result outputting unit 14 for outputting the detection result instead of the detection stabilizing unit 4 and the detection result outputting unit 5 in the example 1 of the present invention shown in FIG. 8 as compared with the example 1 of the present invention.

The area detection stabilizing unit 13 in this example includes an ID determining means 131 for determining whether the read result of the ID holding unit read off by the ID reading unit 3 arranged in each detection area is the read result by the detection-object ID holding unit 1 or the read result by the detection-area ID holding units 2, an area-detection movement detecting means 132 for detecting the movement qualities of the human and the matter within each detection area from the read result of the detection-area ID holding units 2 arranged in each detection area similarly to the movement detecting means 42 in the example 1, an area detection parameter deciding means 133 for receiving the movement quantity detected by the area detection movement detecting means 132, deciding a state transition probability, which is utilized for the probability course process as a parameter, and delivering it to an area detection processing means 134, and the area detection processing means 134 for receiving the parameter decided by the area detection parameter deciding means 133 and the read result of the detection-object ID holding unit 1, detecting the area in which the object of detection exists, and delivering a detection result to the area detection result outputting unit 14.

An operation of the ID determining means 131 in this example, and the area-detection movement detecting means 132 is identical to that of the means 41 and 42 of the example 1 of the present invention, respectively, so its explanation is omitted.

The area detection parameter deciding means 133, which includes a state transition probability deciding means 1331 for deciding a state transition probability, which is utilized for the probability course process, from the movement quantity received from the area detection movement detecting means 132, delivers the state transition probability as a parameter to the area detection processing means 134. The state transition probability, which is decided by the state transition probability deciding means 1331, will be explained later together with a probability course processing means 1341.

The area detecting processing means 134, which includes the probability course processing means 1341 for performing a probability course process of the read result of the detection-object ID holding unit 1 by employing the state transition probability received the area detection parameter deciding means 133, and detecting the area in which the object of detection exists, delivers a detection result to the area detection result processing unit 14.

Figure 35:
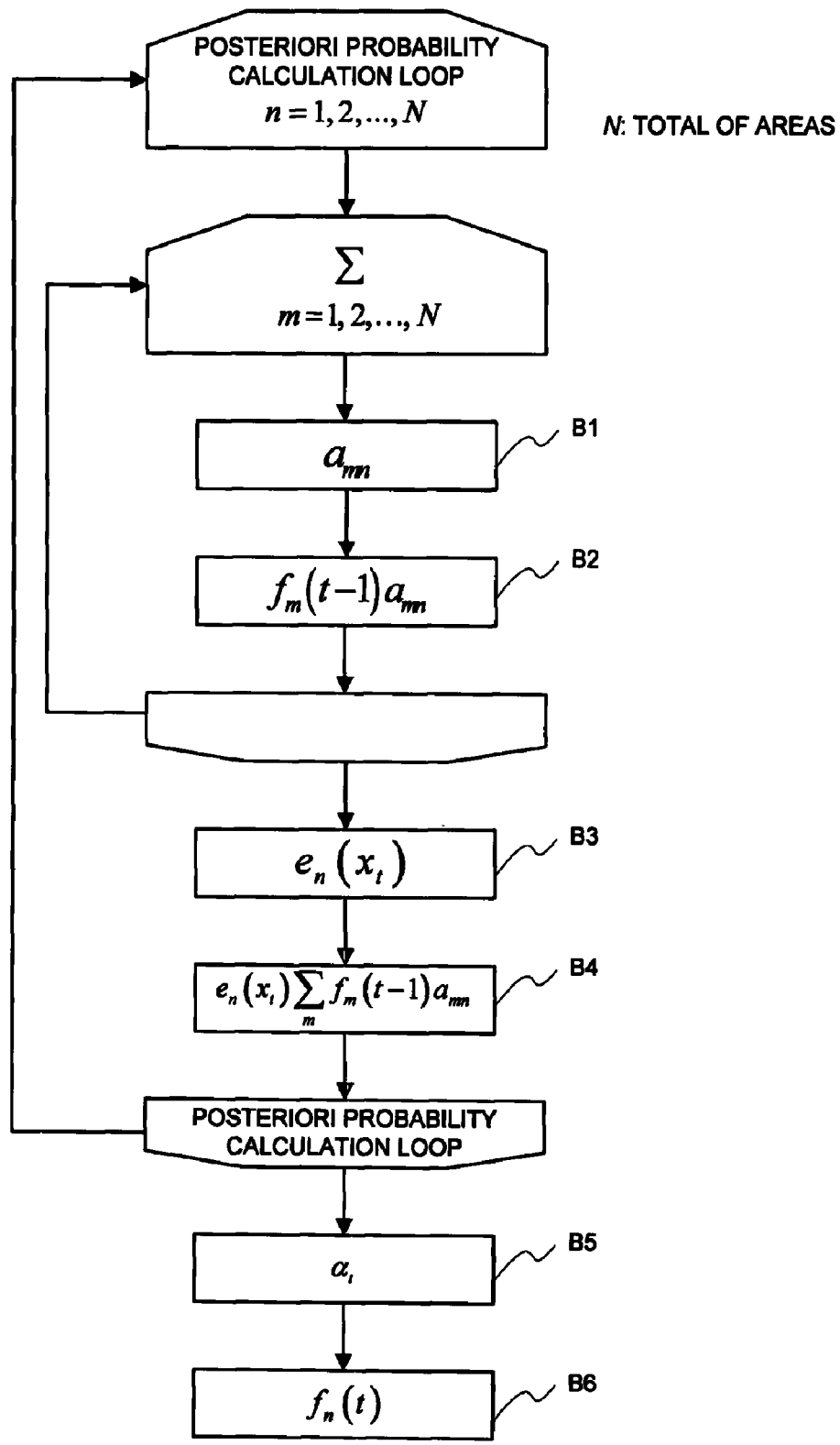
FIG. 35 is a flowchart illustrating a method of computing the posteriori probability in the example 9 of the present invention.

The method of calculating the detecting process in the probability course processing means 1341 is shown in FIG. 34, and an operation thereof is shown in FIG. 35. The probability course processing means 1341 sequentially computes a probability (posteriori probability) that, with respect to each area, the object of detection exists in its area, and outputs the area such that the calculated posteriori probability is maximized as an area detection result.

The state transition probability deciding means 1331 employs, for example, a calculation equation shown in FIG. 36, decides a state transition probability responding to the movement quantity detected by the movement detecting means 132, and utilizes it for computation in the probability course processing means 1341 (step B1). The state transition probability decided like this has a tendency to hamper the detection in such a manner that it is easy for the object of detection to frequent the area in which the movement has been detected by the area-detection movement detecting means 132, and it is hard to frequent the area in which the movement has not been detected. Magnitude of the state transition probability responding to existence of the movement as shown in FIG. 36 is pre-decided responding to easiness of the migration between the areas, or an application.

By calculating a product of the state transition probability calculated in the step B1 and the posteriori probability ahead of one unit time (step B2), and then computing the sum thereof with respect to the areas each of which is an object of computation, the sum of probabilities that the object of detection migrates from each area to the area, being an object of computation, can be obtained.

Next, A priori probability is calculated from the read result of the detection-object ID holding unit 1 by employing the computation equation shown in FIG. 37 (step B3). The priori probability obtained in such a manner signifies a probability that, at the time that the read result of a certain detection-object ID holding unit 1 has been obtained, the object of detection exists in each area. The output probability in FIG. 37 is decided by acquiring the read result of the detection-object ID holding unit 1 obtained by each ID reading unit 3 at the time of having caused the detection-object ID holding unit 1 to exist at each area for a constant time (for example, one minute) in a preliminary experiment that is made in advance, and calculating a probability that the detection-object ID holding unit 1 has been read off actually with respect to each read result.

By calculating a product of the calculated priori probability and the sum already calculated in a loop of the step B1 and the step B2 (step B4), then computing and normalizing the sum thereof (step B5), a probability (posteriori probability) that the detection-object ID holding unit 1 exists in each area can be obtained (step B6).

The posteriori probability calculated with respect to each area is compared, and the area such that its probability value is maximized is delivered to the area detection result outputting unit 14 as an area detection result.

The detection result indicating the area in which the detection-object ID holding unit 1 exists, which has been processed by the area detection processing means 134, is output by the area detection result outputting unit 14.

In this example, even when the detection area exists in plural, and the detection-area ID holding unit 2 and the ID reading unit 3 exist singularly or in plural in each detection area, respectively, detecting the movement of the human and the matter in each area, and setting an appropriate parameter make it possible to realize an effect similar to that of the example 1 of the present invention.

Example 10

Next, an example 10 of the present invention will be explained by making a reference to the accompanied drawings. Such an example 10 corresponds to the best mode for carrying out the seventh invention of the present invention.

Figure 38:
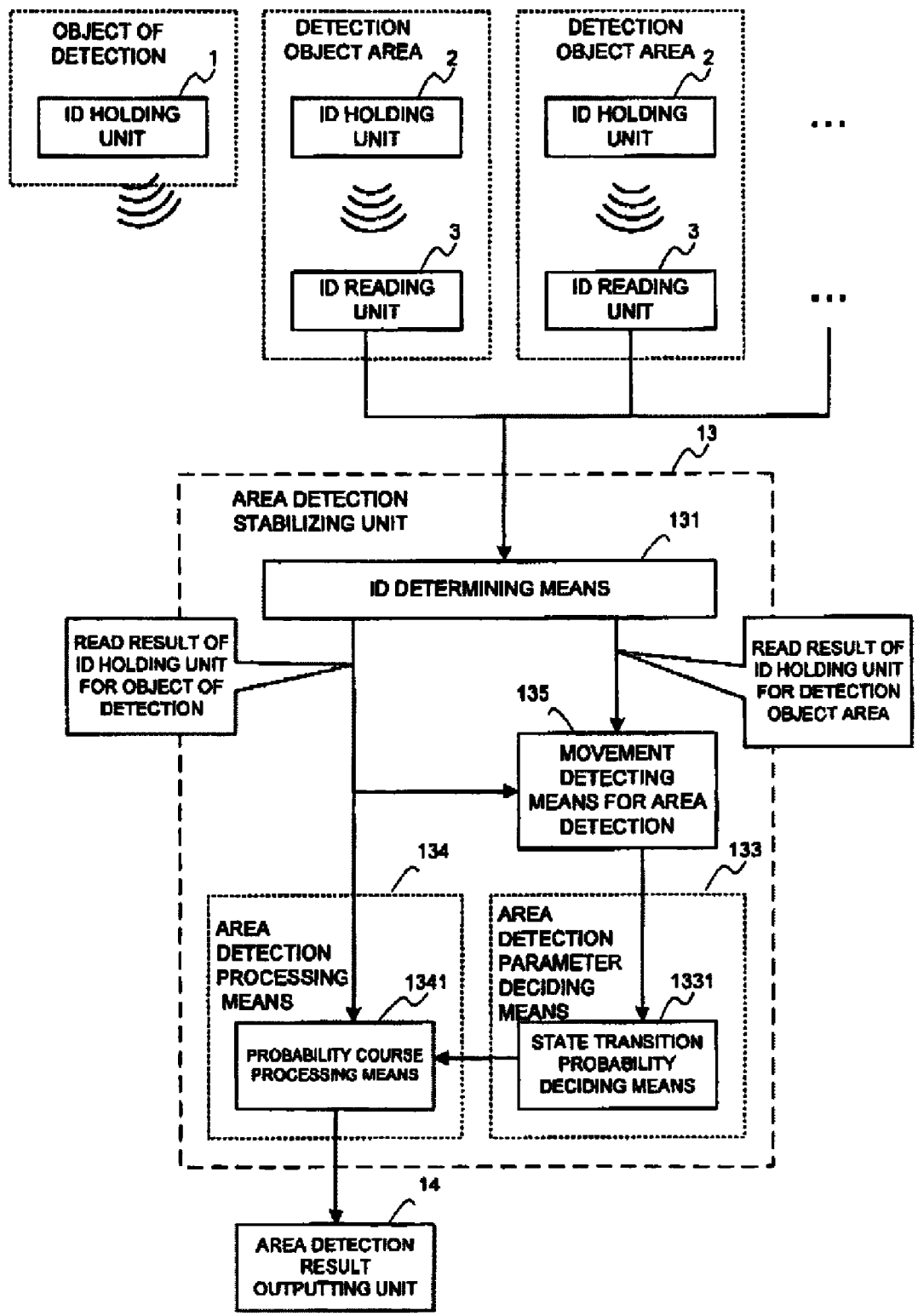
FIG. 38 is a block diagram illustrating a configuration of an example 10 of the present invention.

Upon making a reference to FIG. 38, this example differs in a point that an area detection stabilizer unit 13 includes an area-detection movement detecting means 135 for detecting the movement quantity of the object of detection from the read results of the detection-object ID holding unit 1 and the detection-area ID holding unit 2 arranged in each detection area instead of the area-detection movement detecting means 132 in the configuration of the detection stabilizing unit 13 in the example 9 as compared with the example 9 of the present invention.

An operation of the movement detecting means 135 in this example is identical to that of the movement detecting means 122 of the example 8 in the present invention, so its explanation is omitted.

In this example, even when the detection area exists in plural, and the detection-area ID holding unit 2 and the ID reading unit 3 exist singularly or in plural in each detection area, respectively, and yet even in a case where a plurality of human bodies and non-human objects exist in the detection area, detecting the movement of the human bodies and the non-human objects in each area and setting an appropriate parameter make it possible to realize an effect similar to that of the example 8 and the example 10 of the present invention.

HOW THE INVENTION IS CAPABLE OF INDUSTRIAL EXPLOITATION

The present invention is applicable to applications such as acquisition of information as to where human bodies and non-human objects are positioned, or whether they exist, employing the RFID system, and a program for causing a computer to realize acquisition of information as to where human bodies and non-human objects are positioned, or whether they exist, employing the RFID.

The invention claimed is:

1. A detection stabilizing apparatus for an RFID system, comprising:
    a detecting means for detecting a movement quantity of an object to be detected within a detection area; and
    a detection stabilization processing means for, based upon said detected movement quantity of the object to be detected within the detection area, stabilizing a detection result of information output by an ID holding unit that holds and outputs ID information of the object to be detected, in which said ID holding unit is attached to or held by the object to be detected.

2. The detection stabilizing apparatus for an RFID system according to claim 1, wherein said detecting means is a movement detecting means for detecting a movement quantity of the object to be detected within the detection area based upon said detecting means determining position information of the object to be detected based on a signal received from said ID holding unit when arranged in the detection area.

3. The detection stabilizing apparatus for an RFID system according to claim 2, wherein said detection stabilization processing means comprises:
    a parameter deciding means for deciding a parameter for use in detecting the object to be detected, from the movement quantity obtained by said movement detecting means; and
    a detection processing means for stabilizing a detection result of the ID information held and output by the ID holding unit for the object to be detected based upon the parameter decided by said parameter deciding means.

4. The detection stabilizing apparatus for an RFID system according to claim 3, wherein:
    said parameter deciding means comprises a time-out time deciding means for deciding a time-out time for a time-out process from the movement quantity obtained by said movement detecting means; and
    said apparatus further comprises a time-out processing means for performing a time-out process for a read result of the ID information held and output by the ID holding unit for the object to be detected based upon the time-out time decided by said time-out time deciding means.

5. The detection stabilizing apparatus for an RFID system according to claim 3, wherein:
    said parameter deciding means comprises a threshold deciding means for deciding a threshold for a threshold process from the movement quantity obtained by said movement detecting means; and
    said apparatus further comprises a threshold processing means for performing a threshold process for a read result of the ID information output by the ID holding unit for the object to be detected based upon the threshold decided by said threshold deciding means.

6. The detection stabilizing apparatus for an RFID system according to claim 3, wherein:
    said parameter deciding means comprises:
    an average value computation time length deciding means for deciding an average value computation time length for an average value computing process from the movement quantity obtained by said movement detecting means; and
    a threshold deciding means for deciding a threshold for a threshold process from the movement quantity obtained by said movement detecting means; and
    said apparatus further comprises:
    an average value computation processing means for performing an average value computing process for a read result of the ID information held and output by the ID holding unit for the object to be detected based upon the average value computation time length decided by said average value computation time length deciding means; and
    a threshold processing means for performing a threshold process for an output of said average value computation processing means based upon the threshold decided by said threshold deciding means.

7. The detection stabilizing apparatus for an RFID system according to claim 3, wherein:
    said parameter deciding means comprises:
    a threshold deciding means for deciding a threshold for a threshold process from the movement quantity obtained by said movement detecting means; and a time-out time deciding means for deciding a time-out time for a time-out time process from the movement quantity obtained by said movement detecting means; and said apparatus further comprises:

a threshold processing means for performing a threshold process for a read result of the ID information held and output by the ID holding unit for said object to be detected based upon the threshold decided by said threshold deciding means; and a time-out processing means for performing a time-out process for an output of said threshold processing means based upon the time-out time decided by said time-out time deciding means.

8. The detection stabilizing apparatus for an RFID system according to claim 3, wherein:

said parameter deciding means comprises:

an average value computation time length deciding means for deciding an average value computation time length for an average value computing process from the movement quantity obtained by said movement detecting means;

a threshold deciding means for deciding a threshold for a threshold process from the movement quantity obtained by said movement detecting means; and a time-out time deciding means for deciding a time-out time for a time-out process from the movement quantity obtained by said movement detecting means; and said apparatus further comprises:

an average value computation processing means for performing an average value computing process for a read result of the ID information held by the ID holding unit for the object to be detected based upon the average value computation time length decided by said average value computation time length deciding means;

a threshold processing means for performing a threshold process for an output of said average value computation processing means based upon the threshold decided by said threshold deciding means; and a time-out processing means for performing a time-out process for an output of said threshold processing means based upon the time-out time decided by said time-out time deciding means.

9. The detection stabilizing apparatus for an RFID system according to claim 1, wherein said detecting means is a movement detecting means for detecting a movement quantity of the object to be detected in the detection area based upon information received by a sensor arranged in the detection area.

10. The detection stabilizing apparatus for an RFID system according to claim 1, further comprising:

a service level storing means for storing a detection stabilizing process level; and a detection processing means for instructing the detection stabilization processing means to perform a particular detection stabilization procedure based on the detection stabilizing process level stored by said service level storing means.

11. The detection stabilizing apparatus for an RFID system according to claim 1, further comprising:

a service level setting means for setting a detection stabilization process level; and a detection processing means for instructing the detection stabilization processing means to perform a particular detection stabilization procedure based on the detection stabilization process level set by said service level setting means.

12. The detection stabilizing apparatus for an RFID system according to claim 1, further comprising:

a service level setting means for setting a detection stabilization process level;

a service level storing means for storing the detection stabilization process level set by said service level setting means; and a detection processing means for instructing the detection stabilization processing means to perform a particular detection stabilization procedure based on the detection stabilization process level set by said service level setting means.

13. A detection stabilizing apparatus for an RFID system, comprising:

an ID holding unit arranged in a detection area, said ID holding unit configured to hold ID information of an object to be detected within the detection area;

a movement detecting means for, based upon a read result of ID information held and output by said ID holding unit, detecting a movement quantity of the object to be detected within the detection area; and a detection stabilization processing means for, based upon said detected movement quantity, stabilizing a detection result of the object to be detected that is obtained from the ID information held and output by said ID holding unit of the object to be detected, in which said ID holding unit is attached to or held by the object to be detected.

14. A detection stabilizing apparatus for an RFID system, comprising:

a sensor;

a movement detecting means for, based upon information received by said sensor, detecting a movement quantity of an object to be detected within a detection area; and a detection stabilization processing means for, based upon said detected movement quantity, stabilizing a detection result of the object to be detected, the detection result indicating that the object to be detected has been detected, the detection result being obtained from ID information of the object to be detected within the detection area which is held by an ID holding unit and in which the ID holding unit is attached to or held by the object to be detected.

15. A detection stabilizing method for an RFID system, comprising:

a detecting process of detecting a movement quantity of an object to be detected within a detection area; and a detection stabilization process of, based upon said detected movement quantity of the object to be detected within the detection area, stabilizing a detection result of the object to be detected, the detection result indicating that the object to be detected has been detected, the detection result being obtained from ID information of the object to be detected within the detection area which is held and output by an ID holding unit and in which the ID holding unit is attached to or held by the object to be detected.

16. A detection stabilizing method for an RFID system according to claim 15, wherein said detecting process is a process of detecting a movement quantity of the object to be detected within the detection area based upon said detecting process detecting the ID information held and output by the ID holding unit arranged in the detection area.

17. A detection stabilizing method for an RFID system according to claim 15, wherein said detecting process is a process of detecting a movement quantity of the object to be detected in the detection area based upon information received by a sensor arranged in the detection area.

18. A detection stabilizing method for an RFID system according to claim 15, wherein said detection stabilizing process comprises:
a parameter deciding process of deciding a parameter, which is utilized for the detecting process for detecting the object to be detected, from the detected movement quantity; and
a stabilizing process of stabilizing a detection result of the ID information held and output by the ID holding unit for the object to be detected based upon said decided parameter.

19. A detection stabilizing method for an RFID system according to claim 18, further comprising:
in deciding said parameter, deciding a time-out time for a time-out process from the detected movement quantity; and
in stabilizing said detection result, performing a time-out process based on the ID information held and output by the ID holding unit for the object to be detected based upon the decided time-out time.

20. A detection stabilizing method for an RFID system according to claim 18, further comprising:
in deciding said parameter, deciding a threshold for a threshold process from the detected movement quantity; and
in stabilizing said detection result, performing a threshold process based on the ID information held and output by the ID holding unit for the object to be detected based upon the decided threshold.

21. A detection stabilizing method for an RFID system according to claim 18, further comprising:
in deciding said parameter, deciding an average value computation time length for an average value computing process and a threshold for a threshold process, respectively, from the detected movement quantity; and
in stabilizing said detection result, after performing an average value computing process based on the ID information held and output by the ID holding unit for the object to be detected based upon the decided average value computation time length, performing a threshold process based upon the decided threshold.

22. A detection stabilizing method for an RFID system according to claim 18, further comprising:
in deciding said parameter, deciding a threshold for a threshold process and a time-out time for a time-out process, respectively, from the detected movement quantity; and
in stabilizing said detection result, after performing a threshold process based on the ID information held and output by the ID holding unit for the object to be detected based upon the decided threshold, performing a time-out process based upon the decided time-out time.

23. A detection stabilizing method for an RFID system according to claim 18, further comprising:
in deciding said parameter, deciding an average value computation time length for an average value computing process, a threshold for a threshold process and a time-out time for a time-out process, respectively, from the detected movement quantity; and
in stabilizing said detection result, after performing an average value computing process based on the ID information held and output by the ID holding unit for the object to be detected based upon the decided average value computation time length, performing a threshold process based upon the decided threshold, and further, thereafter performing a time-out process based upon the decided time-out time.

24. A detection stabilizing method for an RFID system according to claim 15 further comprising:
storing a detection stabilization process level, and
instructing the detection stabilization process to perform a particular detection stabilization procedure in response to the stored detection stabilization process level.

25. A detection stabilizing method for an RFID system according to claim 15, further comprising:
setting a detection stabilization process level, and instructing the detection stabilization process to perform a particular detection stabilization procedure in response to the set detection stabilization process level.

26. A detection stabilizing method for an RFID system according to claim 15, further comprising:
setting a detection stabilization process level,
storing the set detection stabilization process level, and
instructing the detection stabilization process to perform a particular detection stabilization procedure in response to the detection stabilization process level.

27. A non-transitory computer readable medium storing a detection stabilization program for an RFID system, the program, when executed by an information processing unit, causing said information processing unit to function as:
a detecting means for detecting a movement quantity of an object to be detected within a detection area; and
a detection stabilization processing means for, based upon said detected movement quantity of the object to be detected within the detection area, stabilizing a detection result of ID information output by an ID holding unit that holds and outputs ID information of the object to be detected, in which the ID holding unit is attached to or held by the object to be detected.

28. The non-transitory computer readable medium according to claim 27, the program further causing said information processing unit to function as:
a movement detecting means for detecting a movement quantity of the object to be detected within the detection area based upon said movement detecting means detecting the ID information held and output by the ID holding unit arranged in the detection area.

29. The non-transitory computer readable medium according to claim 27, the program further causing said information processing unit to function as:
a movement detecting means for detecting a movement quantity of the object to be detected in the detection area based upon information received by a sensor arranged in the detection area.

30. The non-transitory computer readable medium according to claim 29, the program further causing said detection stabilization processing means to function as:
a parameter deciding means for deciding a parameter for use in detecting the object to be detected, from the movement quantity obtained by said movement detecting means; and
a detection processing means for stabilizing the detection result of the ID holding unit for the object to be detected based upon the parameter decided by said parameter deciding means.

31. The non-transitory computer readable medium according to claim 30, the program further causing said parameter deciding means to function as:
an average value computation time length deciding means for deciding an average value computation time length for an average value computing process from the movement quantity obtained by said movement detecting means; and a threshold deciding means for deciding a threshold for a threshold process from the movement quantity obtained by said movement detecting means; and said detection processing means to function as:

an average value computation processing means for performing an average value computing process based on the ID information held by the ID holding unit for the object to be detected based upon the average value computation time length decided by said average value computation time length deciding means; and a threshold processing means for performing a threshold process for an output of said average value computation processing means based upon the threshold decided by said threshold deciding means.

32. The non-transitory computer readable medium according to claim 30, the program further causing said parameter deciding means to function as:

a threshold deciding means for deciding a threshold for a threshold process from the movement quantity obtained by said movement detecting means; and a time-out time deciding means for deciding a time-out time for a time-out process from the movement quantity obtained by said movement detecting means; and said detection processing means to function as:

a threshold processing means for performing a threshold process based on the ID information held by the ID holding unit for the object to be detected based upon the threshold decided by said threshold deciding means; and a time-out processing means for performing a time-out process for an output of said threshold processing means based upon the time-out time decided by said time-out time deciding means.

33. The non-transitory computer readable medium according to claim 30, the program further causing said parameter deciding means to function as:

an average value computation time length deciding means for deciding an average value computation time length for an average value computing process from the movement quantity obtained by said movement detecting means;

a threshold deciding means for deciding a threshold for a threshold process from the movement quantity obtained by said movement detecting means; and a time-out time deciding means for deciding a time-out time for a time-out process from the movement quantity obtained by said movement detecting means; and said detection processing means to function as:

an average value computation processing means for performing an average value computing process based on the ID information held by the ID holding unit for the object to be detected based upon the average value computation time length decided by said average value computation time length deciding means;

a threshold processing means for performing a threshold process for an output of said average value computation processing means based upon the threshold decided by said threshold deciding means; and a time-out processing means for performing a time-out process for an output of said average value computation processing means based upon the time-out time decided by said time-out time deciding means.

34. The non-transitory computer readable medium according to claim 29, the program further causing said information processing unit to function as:

a time-out time deciding means for deciding a time-out time for a time-out process from the movement quantity obtained by said movement detecting means; and a time-out processing means for performing a time-out process based on the ID information held by the ID holding unit for the object to be detected based upon the time-out time decided by said time-out time deciding means.

35. The non-transitory computer readable medium according to claim 29, the program further causing said information processing unit to function as:

a threshold deciding means for deciding a threshold for a threshold process from the movement quantity obtained by said movement detecting means; and a threshold processing means for performing a threshold process based on the ID information held by the ID holding unit for the object to be detected based upon the threshold time decided by said threshold deciding means.

36. The non-transitory computer readable medium according to claim 27, the program further causing said information processing unit to function as a detection processing means for instructing the detection stabilization processing means to perform a particular detection stabilization procedure in response to a detection stabilization process level stored by a service level storing means.

37. The non-transitory computer readable medium according to claim 27, the program further causing said information processing unit to function as:

a service level setting means for setting a detection stabilization process level; and a detection processing means for instructing the detection stabilization processing means to perform a particular detection stabilization procedure in response to the detection stabilization process level set by said service level setting means.

38. The non-transitory computer readable medium according to claim 27, the program further causing said information processing unit to function as:

a service level setting means for setting a detection stabilizing process level, and storing the detection stabilizing process level in a service level storing means; and a detection processing means for instructing the detection stabilization processing means to perform a particular detection stabilization procedure in response to the detection stabilizing process level stored by said service level storing means.

39. The non-transitory computer readable medium according to claim 27, the program further causing the information processing unit to function as a movement detecting means for detecting a movement quantity of the object to be detected within a detection area by detecting the ID information held and output by the ID holding unit arranged in the detection area.

40. A detection stabilizing apparatus for an RFID system, comprising:

an ID holding unit arranged in a detection area and configured to hold ID information of an object to be detected;

a movement detecting means for detecting a movement quantity of an object to be detected within the detection area based upon said movement detecting means detecting the ID information held and output by said ID holding unit, and based on said movement detecting means detecting ID information held and output by another ID holding unit attached to the object to be detected;

a parameter deciding means for deciding a parameter for use in detecting the object to be detected, from the movement quantity obtained by said movement detecting means; and a detection processing means for, based upon the parameter by decided by said parameter deciding means, stabilizing a detection result of the ID information output by the another ID holding unit for the object to be detected, the detection result corresponding to a detection of the another ID holding unit within the detection area.

41. The detection stabilizing apparatus for an RFID system according to claim 40, further comprising:
a service level setting means for setting a detection stabilization process level; and
a detection processing means for performing a particular detection stabilization procedure used to stabilize the detection result, in response to the detection stabilization process level set by said service level setting means.

42. The detection stabilizing apparatus for an RFID system according to claim 40, further comprising:
a service level setting means for setting a detection stabilization process level;
a service level storing means for storing the detection stabilization process level set by said service level setting means; and
a detection processing means for performing a particular detection stabilization procedure used to stabilize the detection result, in response to the detection stabilizing stabilization level stored by said service level storing means.

43. A detection stabilizing apparatus for an RFID system, comprising:
a sensor arranged in a detection area;
a movement detecting means for detecting a movement quantity of an object to be detected within the detection area based upon information received by said sensor, and a based on said movement detecting means detecting information held and output by an ID holding unit attached to the object to be detected;
a parameter deciding means for deciding a parameter for use in detecting the object to be detected, from the movement quantity obtained by said movement detecting means; and
a detection processing means for, based upon the parameter decided by said parameter deciding means, stabilizing a detection result of an ID holding unit for the object to be detected, the detection result corresponding to a detection of another ID holding unit within the detection area.

44. The detection stabilizing apparatus for an RFID system according to claim 43, wherein:
said parameter deciding means comprises a time-out time deciding means for deciding a time-out time for a time-out process from the movement quantity obtained by said movement detecting means; and
said detection processing means comprises a time-out processing means for performing a time-out process based on the ID information held and output by the ID holding unit for the object to be detected based upon the time-out time decided by said time-out time deciding means.

45. The detection stabilizing apparatus for an RFID system according to claim 43, wherein:
said parameter deciding means comprises a threshold deciding means for deciding a threshold for a threshold process from the movement quantity obtained by said movement detecting means; and
said detection processing means comprises a threshold processing means for performing a threshold process based on the ID information held and output by the ID holding unit for the object to be detected based upon the threshold decided by said threshold deciding means.

46. The detection stabilizing apparatus for an RFID system according to claim 43, wherein:
said parameter deciding means comprises an average value computation time length deciding means for deciding an average value computation time length for an average value computing process from the movement quantity obtained by said movement detecting means; and
said detection processing means comprises an average value computation processing means for performing an average value computing process based on the ID information held by the ID holding unit for the object to be detected based upon the average value computation time length decided by said average value computation time length deciding means.

47. A detection stabilizing method for an RFID system, comprising:
a movement detecting process for detecting a movement quantity of an object to be detected within a detection area based upon said movement detecting process detecting ID information held and output by an ID holding unit arranged in the detection area, and based on said movement detecting process detecting ID information held and output by another ID holding unit attached to the object to be detected and which holds and outputs ID information of the object to be detected;
a parameter deciding process for deciding a parameter, which is utilized for a detecting process for detecting the object to be detected within the detection area, from the movement quantity obtained in said movement detecting process; and
the detecting process for stabilizing a detection result of the ID information output by the another ID holding unit for the object to be detected, based upon the parameter by decided in said parameter deciding process, the detection result corresponding to a detection of the another ID holding unit within the detection area.

48. The detection stabilizing method for an RFID system according to claim 47, further comprising:
setting a detection stabilization process level; and
changing a detection stabilization process used by the detecting process for stabilizing a detection result of the object to be detected, in response to the set detection stabilization process level.

49. The detection stabilizing method for an RFID system according to claim 47, further comprising:
setting a detection stabilization process level;
storing the set detection stabilization process level; and
changing a detection stabilization process used by the detecting process for stabilizing a detection result of the object to be detected, in response to the stored detection stabilization process level.

50. A detection stabilizing method for an RFID system, comprising:
a movement detecting process of detecting a movement quantity of an object to be detected within a detection area based upon information received by a sensor arranged in the detection area, and based on said movement detecting process detecting ID information held and output by an ID holding unit attached to the object to be detected and which holds and outputs ID information of the object to be detected;
a parameter deciding process of deciding a parameter, which is utilized for a detecting process for detecting the object to be detected within the detection area, from the movement quantity obtained in said movement detecting process; and the detecting process of, based upon the parameter decided in said parameter deciding process, stabilizing a detection result of the ID information output by the ID holding unit for the object to be detected, the detection result corresponding to a detection of the another ID holding unit within the detection area.

51. The detection stabilizing method for an RFID system according to claim 50, further comprising:
in said parameter deciding process, deciding a time-out time for a time-out process from the movement quantity obtained in said movement detecting process; and
in said detecting process, performing a time-out process based on the ID information held and output by the ID holding unit for the object to be detected based upon the decided time-out time.

52. The detection stabilizing method for an RFID system according to claim 50, further comprising:
in said parameter deciding process, deciding a threshold for a threshold process from the movement quantity obtained in said movement detecting process; and
in said detecting process, performing a threshold process based on the ID information held and output by the ID holding unit for the object to be detected based upon the decided threshold.

53. The detection stabilizing method for an RFID system according to claim 50, further comprising:
in said parameter deciding process, deciding an average value computation time length for an average value computing process from the movement quantity obtained in said movement detecting process; and
in said detecting process, performing an average value computing process based on the ID information held and output by the ID holding unit for the object to be detected based upon the decided average value computation time length.

54. A detection stabilization non-transitory computer readable medium storing a program for a Radio Frequency Identification (RFID) system, the program, when executed, causing an information processing unit to function as:
a movement detecting means for detecting a movement quantity of an object to be detected within a detection area based upon said movement detecting means detecting ID information held and output by an ID holding unit arranged in the detection area, and based upon said movement detecting means detecting ID information held and output by another ID holding unit attached to the object to be detected and configured to hold and output ID information of the object to be detected;
a parameter deciding means for deciding a parameter, which is utilized for a detecting process for detecting the object to be detected within the detection area, and the detecting process being performed by execution of the program, from the movement quantity obtained by said movement detecting means; and
a detection stabilizing means for, based upon the parameter decided by said parameter deciding means, stabilizing a detection result of the ID information output by the another ID holding unit for the object to be detected, the detection result corresponding to a detection of the another ID holding unit within the detection area.

55. The non-transitory computer readable medium for use in an RFID system according to claim 54, further comprising:
causing said parameter deciding means to function as a time-out time deciding means for deciding a time-out time for a time-out process from the movement quantity obtained by said movement detecting means; and
performing a time-out process based on the ID information held by the ID holding unit for the object to be detected based upon the time-out time decided by said time-out time deciding means.

56. The non-transitory computer readable medium for use in an RFID system according to claim 54, further comprising:
causing said parameter deciding means to function as a threshold deciding means for deciding a threshold for a threshold process from the movement quantity obtained by said movement detecting means; and
performing a threshold process based on the ID information held by ID holding unit for the object to be detected based upon the threshold decided by said threshold deciding means.

57. The non-transitory computer readable medium for use in an RFID system according to claim 54, further comprising:
causing said parameter deciding means to function as an average value computation time length deciding means for deciding an average value computation time length for an average value computing process from the movement quantity obtained by said movement detecting means; and
performing an average value computing process based on the ID information held by ID holding unit for the object to be detected based upon the average value computation time length decided by said average value computation time length deciding means.

58. The non-transitory computer readable medium for use in an RFID system according to claim 54, further comprising causing the information processing unit to function as:
a service level setting means for setting a detection stabilization process level; and
a detection processing means for performing a particular detection stabilization procedure used to stabilize the detection result, in response to the detection stabilization process level set by said service level setting means.

59. The non-transitory computer readable medium for use in an RFID system according to claim 54, further comprising causing the information processing unit to function as:
a service level setting means for setting a detection stabilization process level and storing the detection stabilization process level in a service level storing means; and
a detection processing means for performing a particular detection stabilizing procedure used to stabilize the detection result, in response to the detection stabilization process level stored by said service level storing means.

60. A non-transitory computer readable medium storing a program for use in a Radio Frequency Identification (RFID) system, the program, when executed, causing an information processing unit to function as:
a movement detecting means for detecting a movement quantity of an object to be detected within a detection area based upon information received by a sensor arranged in the detection area and provided to said movement detecting means, and based upon said movement detecting means detecting ID information held and output by an ID holding unit attached to the object to be detected and configured to hold and output ID information of the object to be detected;
a parameter deciding means for deciding a parameter, which is utilized for a detecting process for detecting the object to be detected within the detection area, and the detecting process being performed by execution of the program, from the movement quantity obtained by said movement detecting means; and
a detection stabilizing means for, based upon the parameter decided by said parameter deciding means, stabilizing a detection result of the ID information output by the ID holding unit for the object to be detected, the detection result corresponding to a detection of the ID holding unit within the detection area.

61. A detection stabilizing apparatus for a Radio Frequency Identification (RFID) system, comprising:
ID holding units arranged in a plurality of detection areas, said ID holding units configured to hold ID information;
a movement detecting means for detecting a movement quantity of an object to be detected within each detection area based upon said movement detecting means determining position information of the object to be detected based on signals received from said ID holding units;
a parameter deciding means for deciding a parameter, which is utilized for a detecting process for detecting the object to be detected, from the movement quantity obtained by said movement detecting means; and
an area detection processing means for, based upon the parameter decided by said parameter deciding means, performing the detecting process and stabilizing an area detection result that is obtained from the ID information held and output by said ID holding units for the object to be detected.

62. The detection stabilizing apparatus for an RFID system according to claim 61, wherein:
said parameter deciding means comprises a state transition probability deciding means for deciding a state transition probability for a probability course process corresponding to estimated movement of the object to be detected, from the movement quantity obtained by said movement detecting means, the state transition probability being a value set based on a probability of an amount of movement; and
said area detection processing means comprises a probability course processing means for performing a probability course process for a read result of the ID information held and output by the ID holding unit for the object to be detected based upon the state transition probability decided by said state transition probability deciding means.

63. A detection stabilizing apparatus for a Radio Frequency Identification (RFID) system, comprising:
ID holding units arranged in a plurality of detection areas, said ID holding units configured to hold and output ID information;
a movement detecting means for detecting a movement quantity of an object to be detected within each detection area based upon said movement detecting means determining position information of said object to be detected based on signals received from said ID holding units, and based on said movement detecting means detecting ID information held and output by another ID holding unit attached to the object to be detected;
a parameter deciding means for deciding a parameter, which is utilized for an area detecting process for detecting an area in which the object to be detected is located, from the movement quantity obtained by said movement detecting means; and
an area detection processing means for, based upon the parameter decided by said parameter deciding means, performing the area detecting process and stabilizing an area detection result that is obtained from the ID information held and output by said ID holding unit for the object to be detected.

64. A detection stabilizing apparatus for a Radio Frequency Identification (RFID) system, comprising:
sensors arranged in a plurality of detection areas;
a movement detecting means for detecting a movement quantity of an object to be detected within each detection area based upon information received by said sensors;
a parameter deciding means for deciding a parameter, which is utilized for an area detecting process for detecting an area in which the object to be detected is located, from the movement quantity obtained by said movement detecting means; and
an area detection processing means for, based upon the parameter decided by said parameter deciding means, performing the area detecting process and stabilizing an area detection result that is obtained from ID information held and output by an ID holding unit for the object to be detected, the ID holding unit configured to hold and output the ID information of the object to be detected.

65. A detection stabilizing apparatus for a Radio Frequency Identification (RFID) system, comprising:
sensors arranged in a plurality of detection areas;
a movement detecting means for detecting a movement quantity of an object to be detected within each detection area based upon information received by said sensors and provided to said movement detecting means, and based on said movement detecting means detecting ID information held and output by an ID holding unit attached to the object to be detected;
a parameter deciding means for deciding a parameter, which is utilized for an area detecting process for detecting an area in which the object to be detected is located, from the movement quantity obtained by said movement detecting means; and
an area detection processing means for, based upon the parameter decided by said parameter deciding means, performing the area detecting process and stabilizing an area detection result that is obtained from the ID information held and output by the ID holding unit for the object to be detected.

66. A detection stabilizing method for a Radio Frequency Identification (RFID) system, comprising:
a movement detecting process for detecting a movement quantity of an object to be detected within a plurality of detection areas based upon the movement detecting process detecting the ID information held and output by a plurality of ID holding units arranged in the plurality of the detection areas and configured to receive and output ID information;
a parameter deciding process for deciding a parameter, which is utilized for an area detecting process for detecting an area in which the object to be detected is located, from the movement quantity obtained in said movement detecting process; and
the area detecting process for, based upon the parameter decided in said parameter deciding process, performing the area detecting process and stabilizing an area detection result that indicates detection of the ID holding units for the object to be detected.

67. The detection stabilizing method for an RFID system according to claim 66, wherein:
said parameter deciding process comprises a state transition probability deciding process of deciding a state transition probability for a probability course corresponding to estimated movement of the object to be detected, from the movement quantity obtained by said movement detecting means, the state transition probability being a value set based on a probability of an amount of movement; and said area detecting process comprises a probability course process for performing a process of a probability course based on the ID information held and output by the ID holding unit for the object to be detected and based upon the state transition probability decided in said state transition probability deciding process.

68. A detection stabilizing method for a Radio Frequency Identification (RFID) system, comprising:
   a movement detecting process for detecting a movement quantity of an object to be detected within a plurality of detection areas based upon a read result of ID information held and output by ID holding units arranged in the plurality of the detection areas, and a read result of ID information held and output by another ID holding unit attached to the object to be detected and configured to hold and output ID information of the object to be detected;
   a parameter deciding process for deciding a parameter, which is utilized for an area detecting process, from the movement quantity obtained in said movement detecting process; and
   the area detecting process for, based upon the parameter decided in said parameter deciding process, performing the area detecting process for detecting an area in which the object to be detected is located, and stabilizing an area detection result that indicates detection of the another ID holding unit for the object to be detected.

69. A detection stabilizing method for a Radio Frequency Identification (RFID) system, comprising:
   a movement detecting process for detecting a movement quantity of an object to be detected within a plurality of detection areas based upon information obtained by sensors arranged in the plurality of the detection areas;
   a parameter deciding process for deciding a parameter, which is utilized for an area detecting process, from the movement quantity obtained in said movement detecting process; and
   the area detecting process for, based upon the parameter decided in said parameter deciding process, performing the area detecting process for detecting an area in which the object to be detected is located, and stabilizing an area detection result that indicates detection of an ID holding unit for an object to be detected within one of the plurality of detection areas.

70. A detection stabilizing method for a Radio Frequency Identification (RFID) system, comprising:
   a movement detecting process for detecting a movement quantity of an object to be detected within a plurality of detection areas based upon information received by sensors arranged in the plurality of the detection areas, and based on said movement detecting process detecting ID information held and output by an ID holding unit attached to the object to be detected;
   a parameter deciding process for deciding a parameter, which is utilized for an area detecting process for detecting an area in which the object to be detected is located, from the movement quantity obtained in said movement detecting process; and
   the area detecting process for, based upon the parameter decided in said parameter deciding process, performing the area detecting process for detecting the area in which the object to be detected is located, and stabilizing an area detection result that indicates detection of the ID holding unit for the object to be detected within one of the plurality of detection areas.

71. A non-transitory computer readable medium storing a detection stabilization program for use in an RFID system, wherein, when executed, the program causing an information processing unit to function as:
   a movement detecting means for detecting a movement quantity of an object to be detected within a plurality of detection areas based upon said movement detecting means detecting ID information held by ID holding units arranged in the plurality of the detection areas;
   a parameter deciding means for deciding a parameter, which is utilized for an area detecting process for detecting an area in which the object to be detected is located, from the movement quantity obtained by said movement detecting means; and
   an area detection processing means for, based upon the parameter decided by said parameter deciding means, performing the area detecting process for determining the area in which the object to be detected is located, and stabilizing an area detection result that indicates detection of another ID holding unit for the object to be detected.

72. The non-transitory computer readable medium for use in an RFID system according to claim 71, further comprising:
   causing said parameter deciding means to function as a state transition probability deciding means for deciding a state transition probability for a probability course corresponding to estimated movement of the object to be detected from the movement quantity obtained by said movement detecting means, the state transition probability being a value set based on a probability of an amount of movement; and
   causing said area detection processing means to function as a probability course processing means for performing a process of a probability course for the read result of the ID information held and output by the another ID holding unit, based upon the state transition probability decided by said state transition probability deciding means.

73. A non-transitory computer readable medium storing a detection stabilization program for use in a Radio Frequency Identification (RFID) system, wherein, when executed, the program causing an information processing unit to function as:
   a movement detecting means for detecting a movement quantity of an object to be detected within a plurality of detection areas based upon said movement detecting means detecting ID information held and output by ID holding units arranged in the plurality of detection areas, and based upon said movement detecting means detecting ID information held and output by another ID holding unit attached to the object to be detected and which holds and outputs ID information of the object to be detected;
   a parameter deciding means for deciding a parameter, which is utilized for an area detecting process for detecting an area in which the object to be detected is located, from the movement quantity obtained by said movement detecting means; and
   an area detection processing means for, based upon the parameter decided by said parameter deciding means, performing the area detecting process for determining the area in which the object to be detected is located and stabilizing an area detection result that indicates detection of another ID holding unit for the object to be detected.

74. A non-transitory computer readable medium storing a detection stabilization program for use in an RFID system, wherein, when executed, the program causing an information processing unit to function as:
- a movement detecting means for detecting a movement quantity of an object to be detected within a plurality of detection areas based upon information received by sensors arranged in the plurality of the detection areas;
- a parameter deciding means for deciding a parameter, which is utilized for an area detecting process for determining an area in which the object to be detected is located, from the movement quantity obtained by said movement detecting means; and
- an area detection processing means for, based upon the parameter decided by said parameter deciding means, performing the area detecting process for determining the area in which the object to be detected is located and stabilizing an area detection result that indicates detection of an ID holding unit for an object to be detected.

75. A non-transitory computer readable medium storing a detection stabilization program for use in an RFID system, wherein, when executed, the program causing an information processing unit to function as:
- a movement detecting means for detecting a movement quantity of an object to be detected within a plurality of detection areas based upon information received by sensors arranged in the plurality of the detection areas, and based on said movement detecting means detecting ID information held and output by an ID holding unit attached to the object to be detected;
- a parameter deciding means for deciding a parameter, which is utilized for an area detecting process for detecting an area in which the object to be detected is located, from the movement quantity obtained by said movement detecting means; and
- an area detection processing means for, based upon the parameter decided by said parameter deciding means, performing the area detecting process for determining the area in which the object to be detected is located and stabilizing an area detection result that indicates detection of the ID holding unit for the object to be detected.

* * * * *